United States Patent
Ahn et al.

(10) Patent No.: US 12,445,275 B2
(45) Date of Patent: Oct. 14, 2025

(54) METHOD AND DEVICE FOR ESTIMATING QUANTUM BIT ERROR RATE ON BASIS OF MAXIMUM BIT GROUP AND TWO-DIMENSIONAL PARITY

(71) Applicant: LG ELECTRONICS INC., Seoul (KR)

(72) Inventors: Byungkyu Ahn, Seoul (KR); Sangrim Lee, Seoul (KR); Hojae Lee, Seoul (KR); JaYeong Kim, Seoul (KR); Sungjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 247 days.

(21) Appl. No.: 18/023,281

(22) PCT Filed: Aug. 24, 2020

(86) PCT No.: PCT/KR2020/011256
§ 371 (c)(1),
(2) Date: Feb. 24, 2023

(87) PCT Pub. No.: WO2022/045378
PCT Pub. Date: Mar. 3, 2022

(65) Prior Publication Data
US 2023/0299950 A1   Sep. 21, 2023

(51) Int. Cl.
*H04L 9/08* (2006.01)
*G06N 3/084* (2023.01)
(Continued)

(52) U.S. Cl.
CPC ........... *H04L 9/0852* (2013.01); *G06N 3/084* (2013.01); *H03M 13/11* (2013.01); *H04L 1/203* (2013.01)

(58) Field of Classification Search
CPC combination set(s) only.
See application file for complete search history.

(56) References Cited

U.S. PATENT DOCUMENTS 7,515,716 B1 * 4/2009 Elliott ................... H04L 9/0858
380/278
7,627,126 B1 * 12/2009 Pikalo ................... H04L 9/0858
713/168
(Continued)

FOREIGN PATENT DOCUMENTS

EP         3416332       4/2020
KR      20080083176       9/2008
(Continued)

OTHER PUBLICATIONS

PCT International Application No. PCT/KR2020/011256, International Search Report dated Apr. 20, 2021, 6 pages.
(Continued)

*Primary Examiner* — Hadi S Armouche
(74) *Attorney, Agent, or Firm* — LEE, HONG, DEGERMAN, KANG & WAIMEY

(57) ABSTRACT

The present specification provides a method for estimating a quantum bit error rate (QBER) for key information, performed by a device in a quantum cryptography communication system, the method and device being characterized by: receiving a random access (RA) preamble from another device; transmitting a random access response (RAR) to the other device, in response to the RA preamble, performing a radio resource control (RRC) connection process with the other device; receiving data from the other device; and decoding the data on the basis of the key information, wherein the key information is determined on the basis of estimation of the QBER, and the device estimates the QBER (Continued)

on the basis of first two-dimensional parity information received from the other device through a public channel.

8 Claims, 51 Drawing Sheets

(51) Int. Cl.
*H03M 13/11* (2006.01)
*H04L 1/20* (2006.01)

(56) References Cited

U.S. PATENT DOCUMENTS

| | | | | |
|---|---|---|---|---|
| 8,180,056 B2* | 5/2012 | Kuang | ................ | H04L 9/0855 380/263 |
| 2002/0053062 A1* | 5/2002 | Szymanski | ....... | H03M 13/6575 714/801 |
| 2002/0147954 A1* | 10/2002 | Shea | ................ | H03M 13/11 714/755 |
| 2004/0109564 A1* | 6/2004 | Cerf | ................ | H04L 9/0858 380/256 |
| 2007/0094582 A1* | 4/2007 | Noda | ................ | H03M 13/116 714/801 |
| 2008/0031456 A1* | 2/2008 | Harrison | ............... | H04L 9/0852 380/278 |
| 2010/0257434 A1* | 10/2010 | Harrison | ........... | H03M 13/3738 714/781 |
| 2011/0167299 A1* | 7/2011 | Tanaka | ................ | H04L 1/242 714/E11.143 |
| 2013/0097470 A1* | 4/2013 | Hwang | ................ | H03M 13/35 714/E11.032 |
| 2014/0143867 A1* | 5/2014 | Tanizawa | ............ | H04L 9/0855 726/22 |
| 2015/0193306 A1* | 7/2015 | Doi | ................ | H04L 9/0858 714/746 |
| 2015/0195087 A1* | 7/2015 | Doi | ................ | H04L 9/0852 380/278 |
| 2015/0214978 A1* | 7/2015 | Yoon | ................ | H04L 9/0852 714/776 |
| 2015/0312035 A1* | 10/2015 | Choi | ................ | H04L 9/0858 380/278 |
| 2016/0197723 A1* | 7/2016 | Takahashi | ........... | G06F 11/0709 380/255 |
| 2017/0062692 A1* | 3/2017 | Dial | ................ | H10N 60/0912 |
| 2017/0214525 A1* | 7/2017 | Zhao | ................ | H04W 12/0431 |
| 2017/0264434 A1* | 9/2017 | Takahashi | ............ | H04L 9/0858 |
| 2018/0309571 A1* | 10/2018 | Arora | ................ | H04L 63/0435 |
| 2020/0136649 A1* | 4/2020 | Heo | ................ | H03M 13/1174 |
| 2020/0389187 A1* | 12/2020 | Peng | ................ | H03M 13/1111 |
| 2022/0014362 A1* | 1/2022 | Djordjevic | ............. | H04B 10/70 |

FOREIGN PATENT DOCUMENTS

| | | |
|---|---|---|
| KR | 20150088490 | 8/2015 |
| KR | 20200022627 | 3/2020 |
| KR | 20200074093 | 6/2020 |

OTHER PUBLICATIONS

E.O. Kiktenko et al., "Error Estimation at the Information Reconciliation Stage of Quantum Key Distribution", Journal of Russian Laser Research, vol. 39, No. 6, Section 1-4, Nov. 2018, 11 pages.

* cited by examiner

METHOD AND DEVICE FOR ESTIMATING QUANTUM BIT ERROR RATE ON BASIS OF MAXIMUM BIT GROUP AND TWO-DIMENSIONAL PARITY

CROSS-REFERENCE TO RELATED APPLICATIONS

This application is the National Stage filing under 35 U.S.C. 371 of International Application No. PCT/KR2020/011256, filed on Aug. 24, 2020, the contents of which are all incorporated by reference herein in their entirety.

TECHNICAL FIELD

The present disclosure relates to quantum communication systems.

BACKGROUND

Due to the advent of quantum computers, it has become possible to hack existing cryptographic systems based on mathematical complexity (e.g., RSA, AES, etc.). To prevent hacking, quantum cryptographic communication is proposed.

On the other hand, in the existing parity-based QBER estimation method, there is a problem in that QBER estimation accuracy rapidly deteriorates as the error rate increases. Accordingly, the present disclosure intends to provide a method for improving problems occurring in the QBER estimation method and a device using the same.

SUMMARY

According to one embodiment of the present disclosure, there is provided a method and device for estimating a quantum bit error rate (QBER) for key information, performed by a device, characterized in that the method comprises receiving a first two-dimensional parity information from another device over a public channel, performing an estimation of the QBER based on the first two-dimensional parity information, and determining the key information based on the estimation of the QBER.

According to the present disclosure, first, a method is presented for optimizing the size of the group that determines the performance of a parity-based technique so that the amount of leaked information can be minimized while ensuring the accuracy of QBER estimation. Furthermore, the problem that parity-based methods fail to identify the presence of errors when an even number of errors are contained within the group can be improved.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

In the present disclosure, "A or B" may mean "only A", "only B" or "both A and B". When expressed separately, "A or B" may be interpreted as "A and/or B" in the present disclosure. For example, in the present disclosure, "A, B or C" may mean "only A", "only B", "only C", or "any combination of A, B and C".

A slash (/) or a comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B" or "both A and B". Also, in the present disclosure, the expression "at least one of A or B" or "at least one of A and/or B" may be interpreted the same as "at least one of A and B".

Also, in the present disclosure, "at least one of A, B and C" may mean "only A", "only B", "only C", or "any combination of A, B and C". Also, "at least one of A, B or C" or "at least one of A, B and/or C" may mean "at least one of A, B and C".

In addition, parentheses used in the present disclosure may mean "for example". Specifically, when "control information (PDCCH)" is indicated, "PDCCH" may be proposed as an example of "control information". When separately expressed, "control information" in the present disclosure may be not limited to "intra prediction", and "PDCCH" may be proposed as an example of "control information". Further, when "control information (i.e., PDCCH)" is indicated, "PDCCH" may be proposed as an example of "control information".

Technical features that are individually described in one drawing in this specification may be implemented individually or simultaneously.

Hereinafter, new radio access technology (new RAT, NR) will be described.

As more and more communication devices require greater communication capacity, a need for improved mobile broadband communication compared to conventional radio access technology (RAT) has emerged. In addition, massive machine type communications (MTC), which provides various services anytime and anywhere by connecting multiple devices and objects, is also one of the major issues to be considered in next-generation communication. In addition, communication system design considering reliability and latency-sensitive services/terminals is being discussed. The introduction of next-generation wireless access technologies in consideration of such expanded mobile broadband communication, massive MTC, URLLC (Ultra-Reliable and Low Latency Communication) is being discussed, in this specification, for convenience, the corresponding technology is referred to as new RAT or NR.

Figure 1:
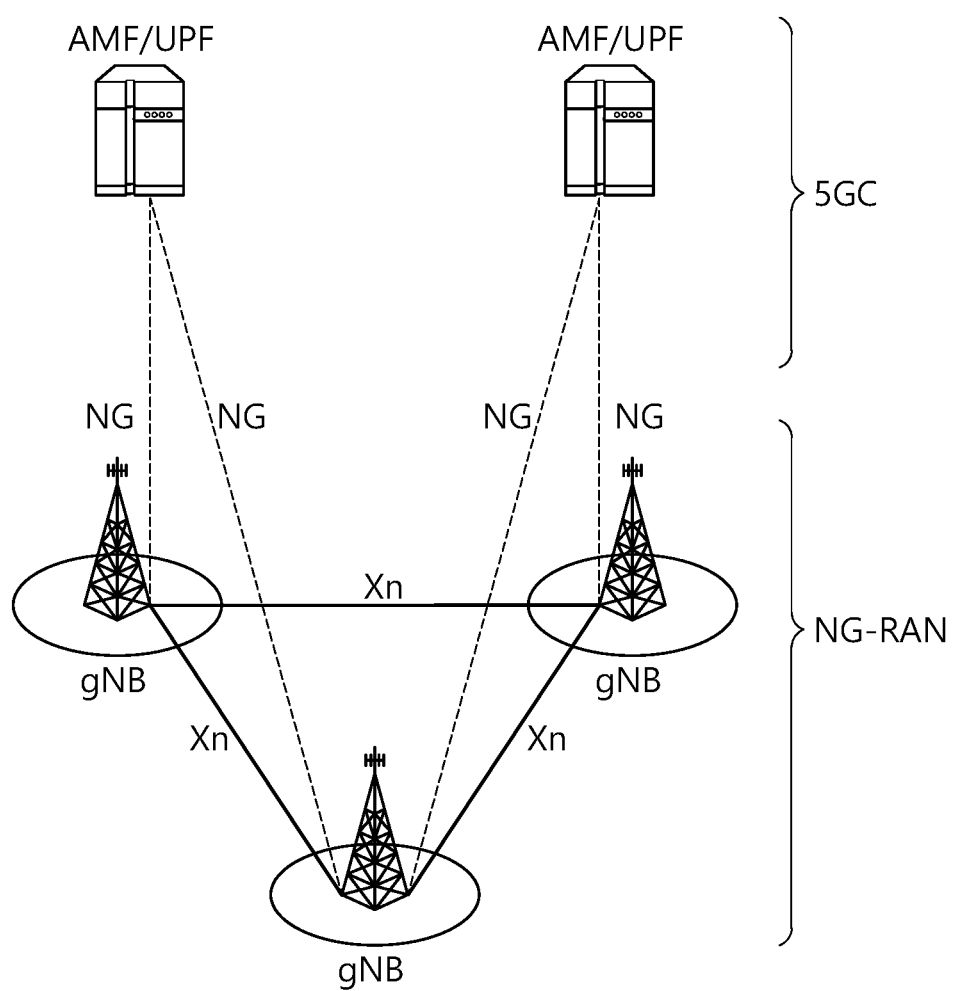
FIG. 1 illustrates a system structure of a New Generation Radio Access Network (NG-RAN) to which NR is applied.

FIG. 1 illustrates a system structure of a New Generation Radio Access Network (NG-RAN) to which NR is applied.

Referring to FIG. 1, a Next Generation-Radio Access Network (NG-RAN) may include a next generation-Node B (gNB) and/or eNB providing a user plane and control plane protocol termination to a user. FIG. 1 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 2:
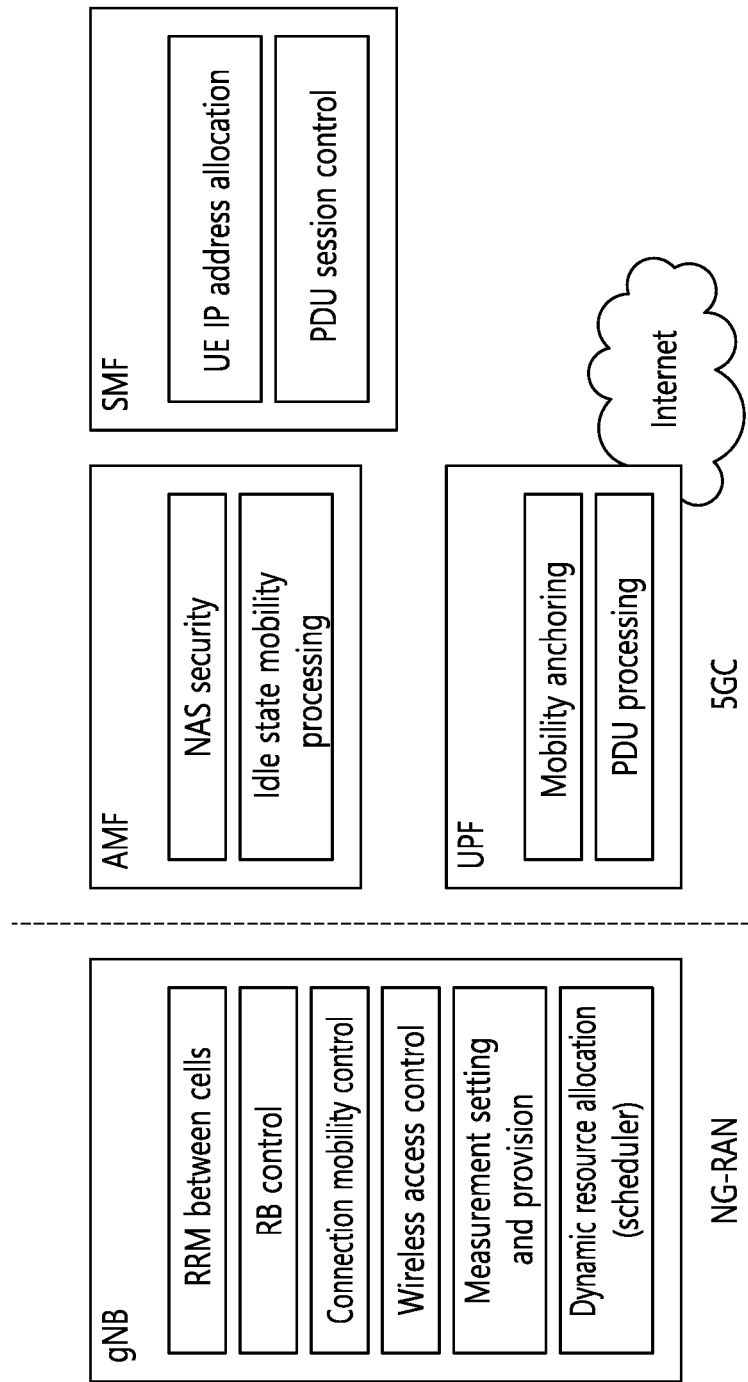
FIG. 2 illustrates the functional split between NG-RAN and 5GC.

FIG. 2 illustrates the functional split between NG-RAN and 5GC.

Referring to FIG. 2, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non-Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Figure 3:
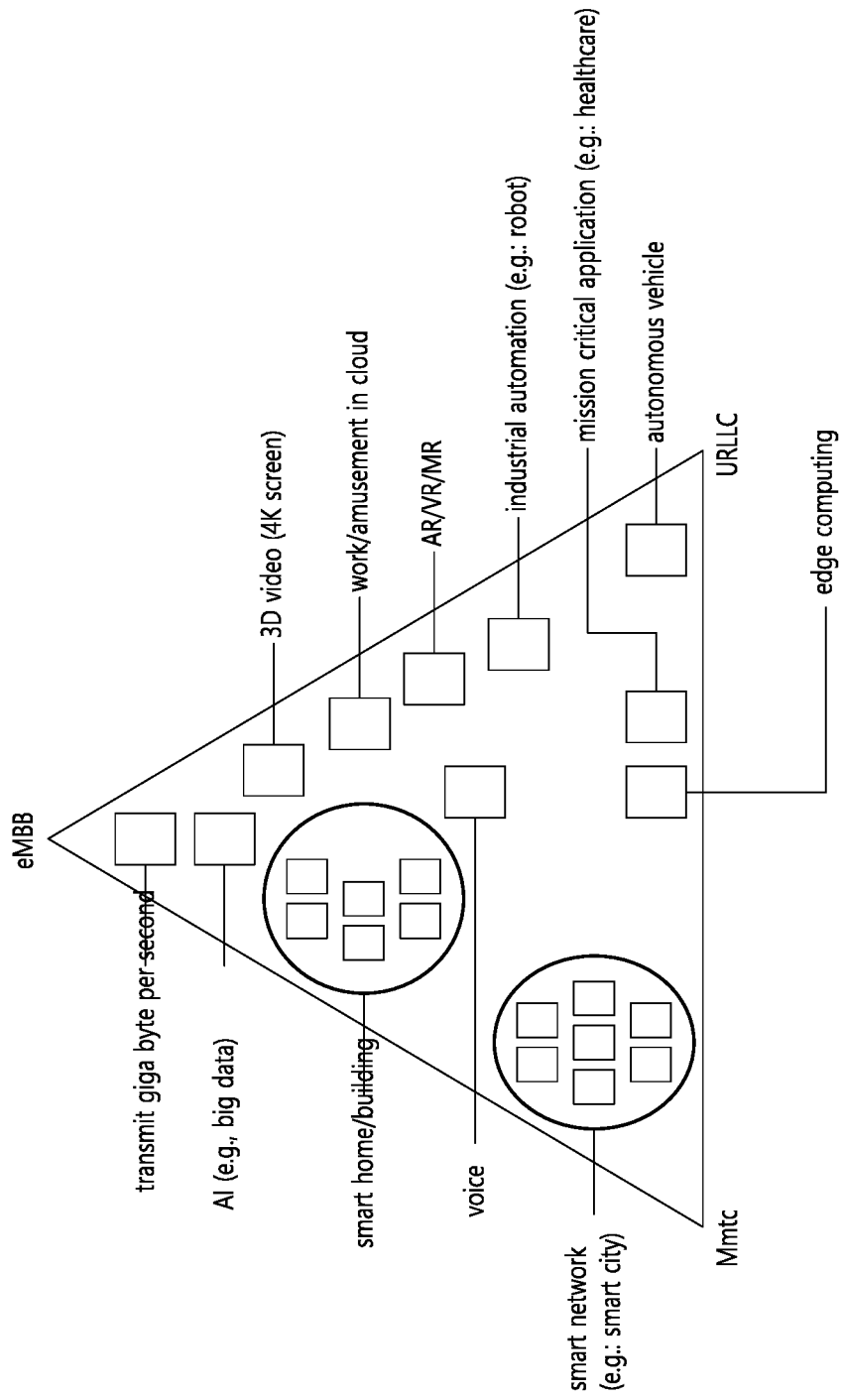
FIG. 3 shows examples of 5G usage scenarios to which the technical features of the present specification can be applied.

FIG. 3 shows examples of 5G usage scenarios to which the technical features of the present specification can be applied. The 5G usage scenarios shown in FIG. 3 are only exemplary, and the technical features of the present specification can be applied to other 5G usage scenarios which are not shown in FIG. 3.

Referring to FIG. 3, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km$^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drone control and coordination.

Next, a plurality of use cases included in the triangle of FIG. 3 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location-based information systems. Use cases of logistics and freight tracking typically require low data rates, but require a large range and reliable location information.

Hereinafter, examples of next-generation communication (e.g., 6G) that can be applied to the embodiments of the present specification will be described.

<6G System General>

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 1 below. That is, Table 1 shows the requirements of the 6G system.

TABLE 1

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

Figure 4:
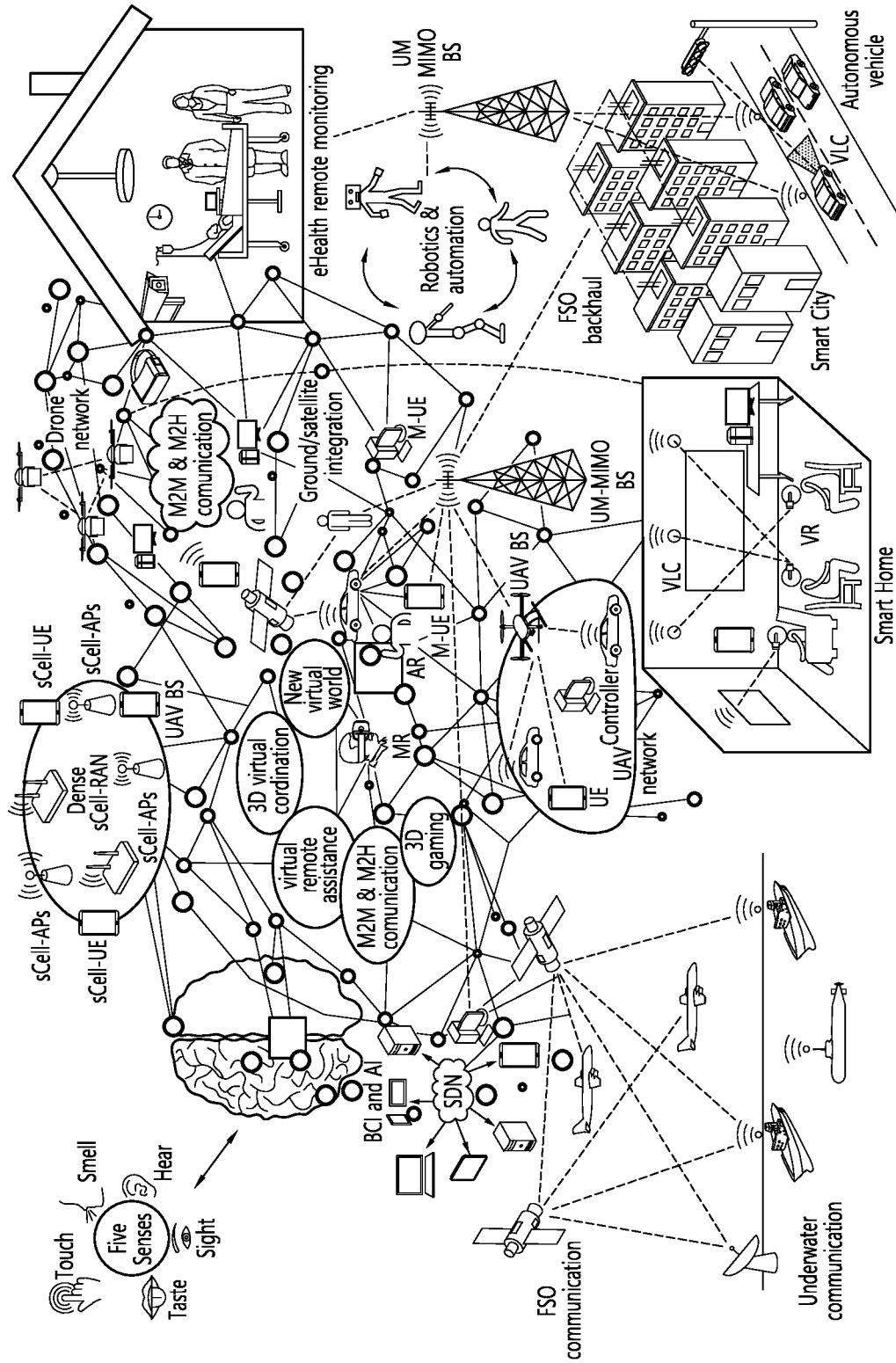
FIG. 4 is a diagram showing an example of a communication structure that can be provided in a 6G system.

The 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security. FIG. 4 is a diagram showing an example of a communication structure that can be provided in a 6G system.

The 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimension connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduces costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

Core Implementation Technology of 6G System

Artificial Intelligence

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G.

When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmann machine (RNN) method. Such a learning model is applicable.

An artificial neural network is an example of connecting several perceptrons.

Figure 5:
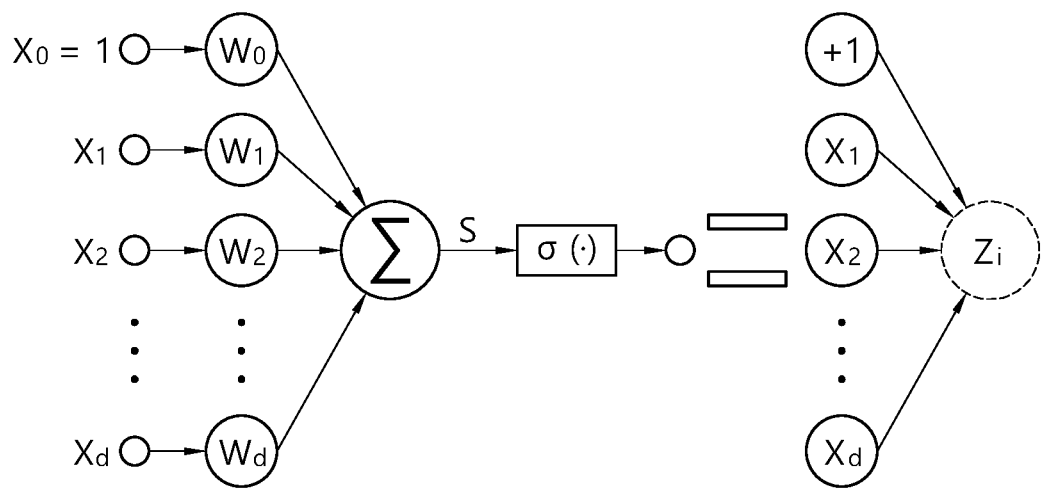
FIG. 5 schematically illustrates an example of a perceptron structure.

FIG. 5 schematically illustrates an example of a perceptron structure.

Referring to FIG. 5, if the input vector $x=(x1, x2 \ldots, xd)$ is input, each component is multiplied by the weight (W1, W2 ..., Wd), after summing up all the results, applying the activation function $\sigma(\cdot)$, the entire process above is called a perceptron. The huge artificial neural network structure may extend the simplified perceptron structure shown in FIG. 5 and apply input vectors to different multi-dimensional perceptrons. For convenience of description, an input value or an output value is referred to as a node.

Meanwhile, the perceptron structure shown in FIG. 5 can be described as being composed of a total of three layers based on input values and output values. An artificial neural network in which H number of (d+1) dimensional perceptrons exist between the 1st layer and the 2nd layer and K number of (H+1) dimensional perceptrons between the 2nd layer and the 3rd layer can be expressed as shown in FIG. 6.

Figure 6:
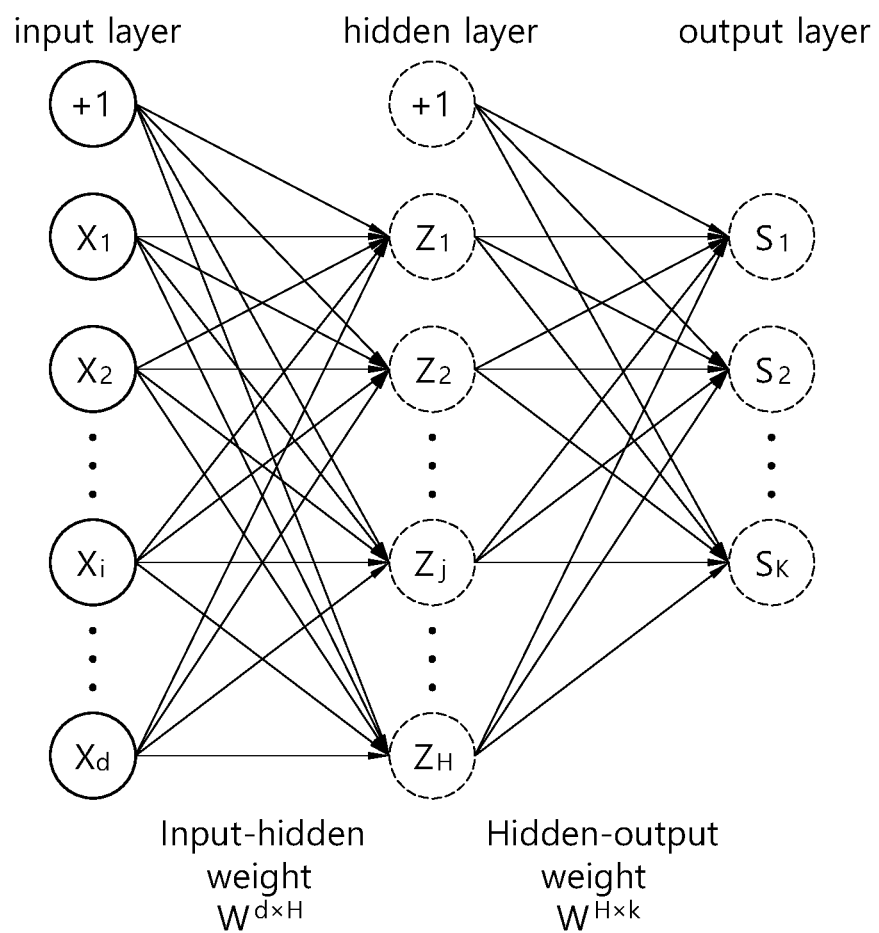
FIG. 6 schematically illustrates an example of a multilayer perceptron structure.

FIG. 6 schematically illustrates an example of a multi-layer perceptron structure.

The layer where the input vector is located is called the input layer, the layer where the final output value is located is called the output layer, and all the layers located between the input layer and the output layer are called hidden layers. In the example of FIG. 6, three layers are disclosed, but when counting the number of layers of an actual artificial neural network, since the count excludes the input layer, it can be regarded as a total of two layers. The artificial neural network is composed of two-dimensionally connected perceptrons of basic blocks.

The above-described input layer, hidden layer, and output layer can be jointly applied to various artificial neural network structures such as CNN and RNN, which will be described later, as well as multi-layer perceptrons. As the number of hidden layers increases, the artificial neural network becomes deeper, and a machine learning paradigm that uses a sufficiently deep artificial neural network as a learning model is called deep learning. In addition, the artificial neural network used for deep learning is called a deep neural network (DNN).

Figure 7:
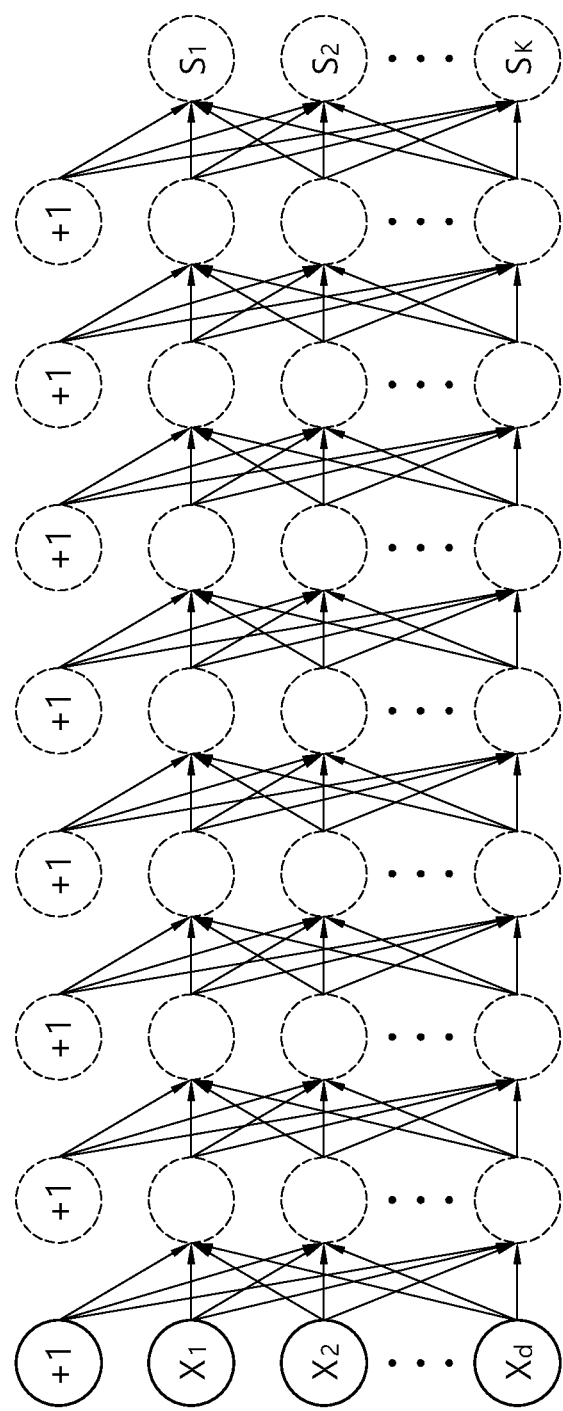
FIG. 7 schematically illustrates a deep neural network example.

FIG. 7 schematically illustrates a deep neural network example.

The deep neural network shown in FIG. 7 is a multi-layer perceptron consisting of 8 hidden layers+8 output layers. The multilayer perceptron structure is expressed as a fully-connected neural network. In a fully-connected neural network, there is no connection relationship between nodes located on the same layer, and there is a connection relationship only between nodes located on adjacent layers. DNN has a fully connected neural network structure and is composed of a combination of multiple hidden layers and activation functions, so it can be usefully applied to identify the correlation characteristics between inputs and outputs. Here, the correlation characteristic may mean a joint probability of input and output.

On the other hand, depending on how a plurality of perceptrons are connected to each other, various artificial neural network structures different from the aforementioned DNN can be formed.

Figure 8:
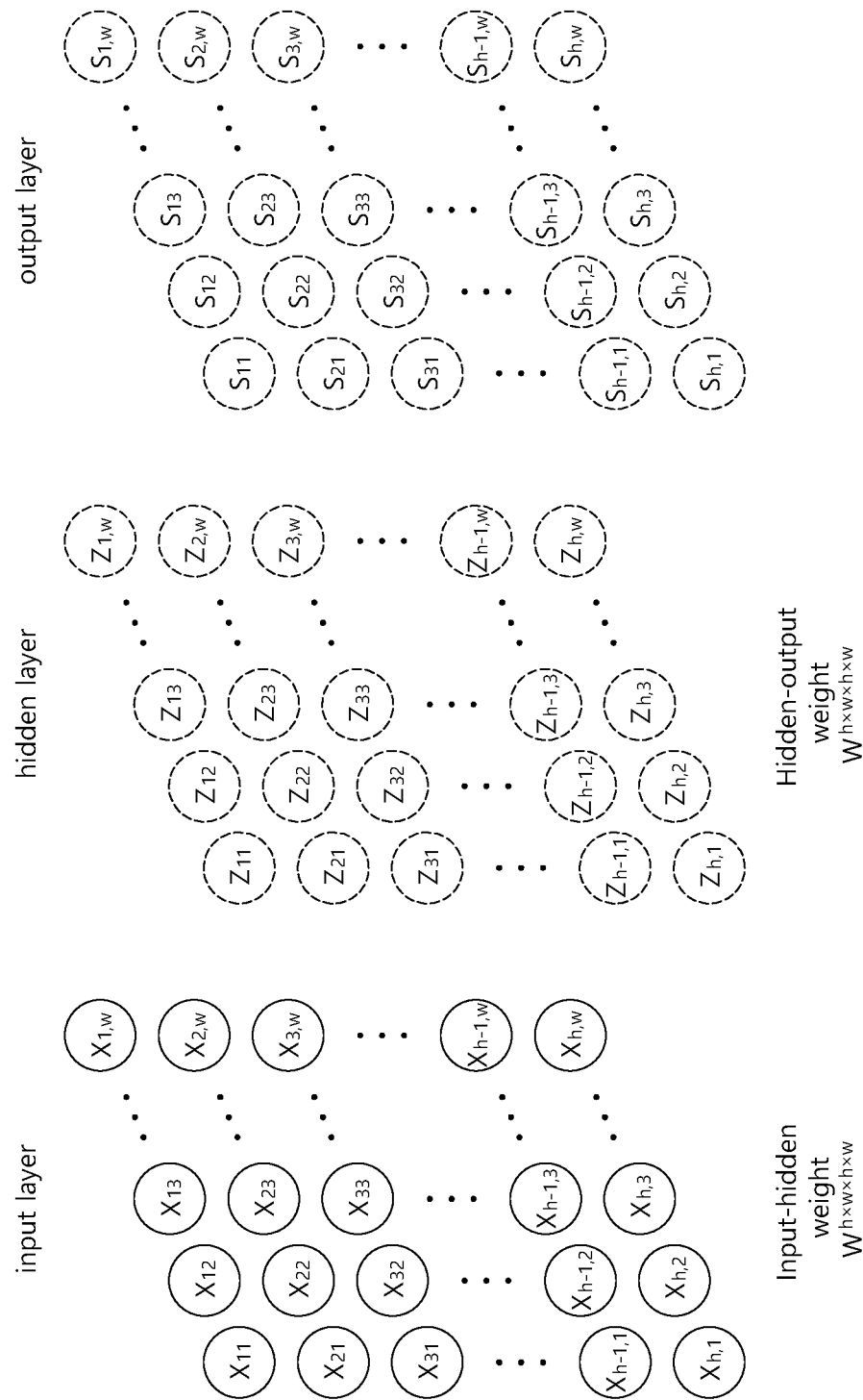
FIG. 8 schematically illustrates an example of a convolutional neural network.

FIG. 8 schematically illustrates an example of a convolutional neural network.

In DNN, nodes located inside one layer are arranged in a one-dimensional vertical direction. However, in FIG. 8, it can be assumed that the nodes are two-dimensionally arranged with w nodes horizontally and h nodes vertically (convolutional neural network structure of FIG. 8). In this case, since a weight is added for each connection in the connection process from one input node to the hidden layer, a total of h×w weights must be considered. Since there are h×w nodes in the input layer, a total of h2w2 weights are required between two adjacent layers.

Figure 9:
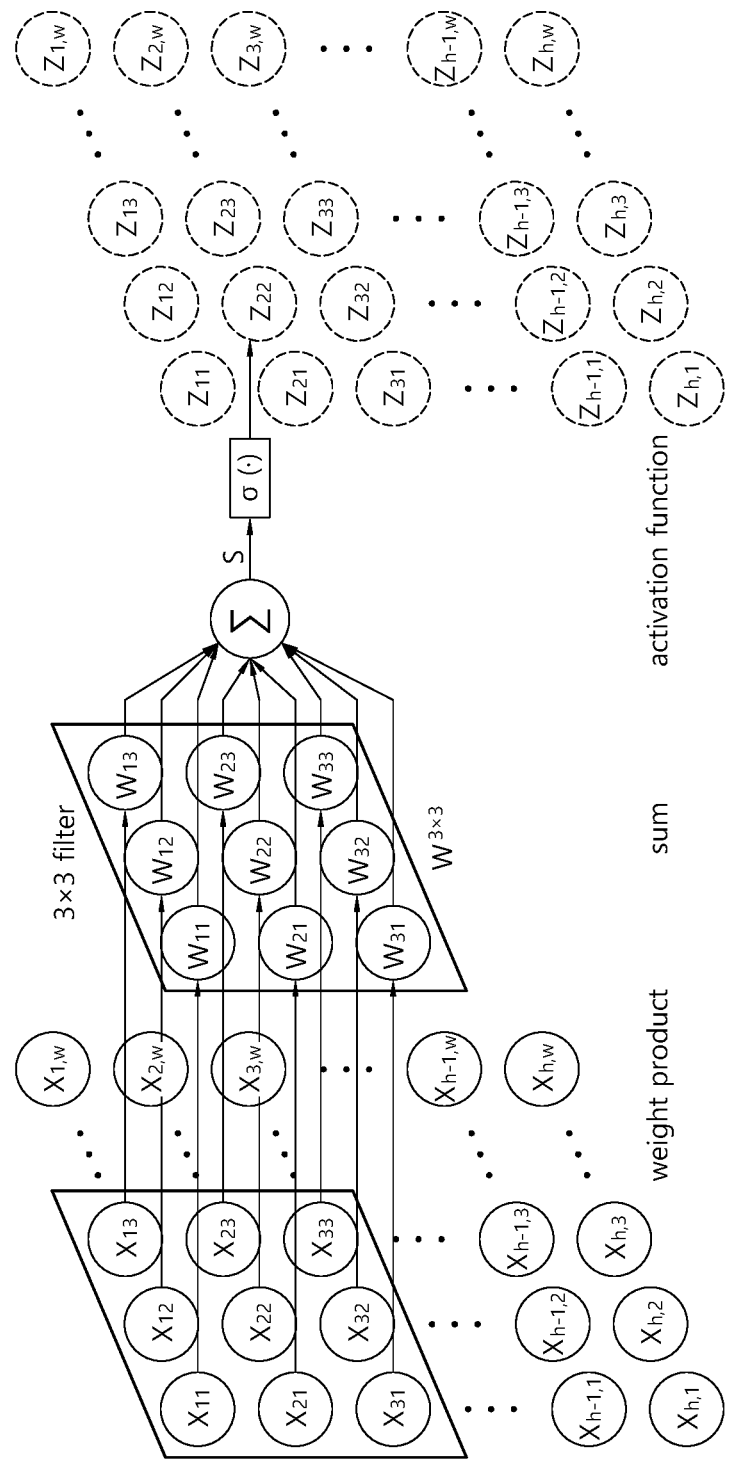
FIG. 9 schematically illustrates an example of a filter operation in a convolutional neural network.

The convolutional neural network of FIG. 8 has a problem that the number of weights increases exponentially according to the number of connections, so instead of considering all mode connections between adjacent layers, assuming that a filter having a small size exists, as shown in FIG. 9, a weighted sum and an activation function operation are performed on a portion where the filters overlap.

FIG. 9 schematically illustrates an example of a filter operation in a convolutional neural network.

One filter has weights corresponding to the number of filters, and learning of weights can be performed so that a specific feature on an image can be extracted as a factor and output. In FIG. 9, a 3×3 size filter is applied to the 3×3 area at the top left of the input layer, and the weighted sum and activation function calculations are performed on the corresponding node, and the resulting output value is stored in z22.

The filter scans the input layer while moving horizontally and vertically at regular intervals, performs weighted sum and activation function calculations, and places the output value at the position of the current filter. This operation method is similar to the convolution operation for images in the field of computer vision, so the deep neural network of this structure is called a convolutional neural network (CNN), a hidden layer generated as a result of the convolution operation is called a convolutional layer. Also, a neural network having a plurality of convolutional layers is referred to as a deep convolutional neural network (DCNN).

In the convolution layer, the number of weights may be reduced by calculating a weighted sum by including only nodes located in a region covered by the filter in the node where the current filter is located. This allows one filter to be used to focus on features for a local area. Accordingly, CNN can be effectively applied to image data processing in which a physical distance in a 2D area is an important criterion. Meanwhile, in the CNN, a plurality of filters may be applied immediately before the convolution layer, and a plurality of output results may be generated through a convolution operation of each filter.

Meanwhile, there may be data whose sequence characteristics are important according to data attributes. Considering the length variability and precedence relationship of these sequence data, input one element on the data sequence at each time step, a structure in which an output vector (hidden vector) of a hidden layer output at a specific point in time is input together with the next element in a sequence to an artificial neural network is called a recurrent neural network structure.

Figure 10:
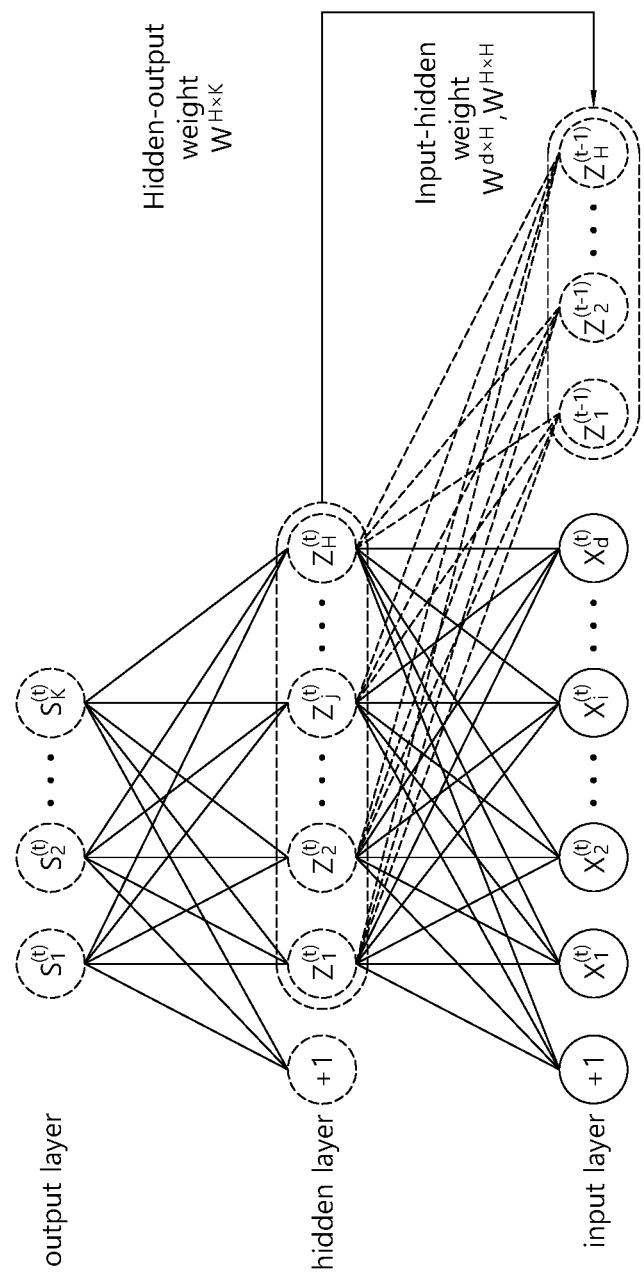
FIG. 10 schematically illustrates an example of a neural network structure in which a cyclic loop exists.

FIG. 10 schematically illustrates an example of a neural network structure in which a cyclic loop exists.

Referring to FIG. 10, a recurrent neural network (RNN) is a structure that applies a weighted sum and an activation function in the process of inputting an element (x1($t$), x2($t$) . . . , xd(t)) of any gaze t on the data sequence to the fully connected neural network, by entering together the hidden vector (z1($t$-1), z2($t$-1) . . . , zH(t-1)) of the immediately preceding time point t-1. The reason why the hidden vector is transmitted to the next time point in this way is that information in the input vector at previous time points is regarded as being accumulated in the hidden vector of the current time point.

Figure 11:
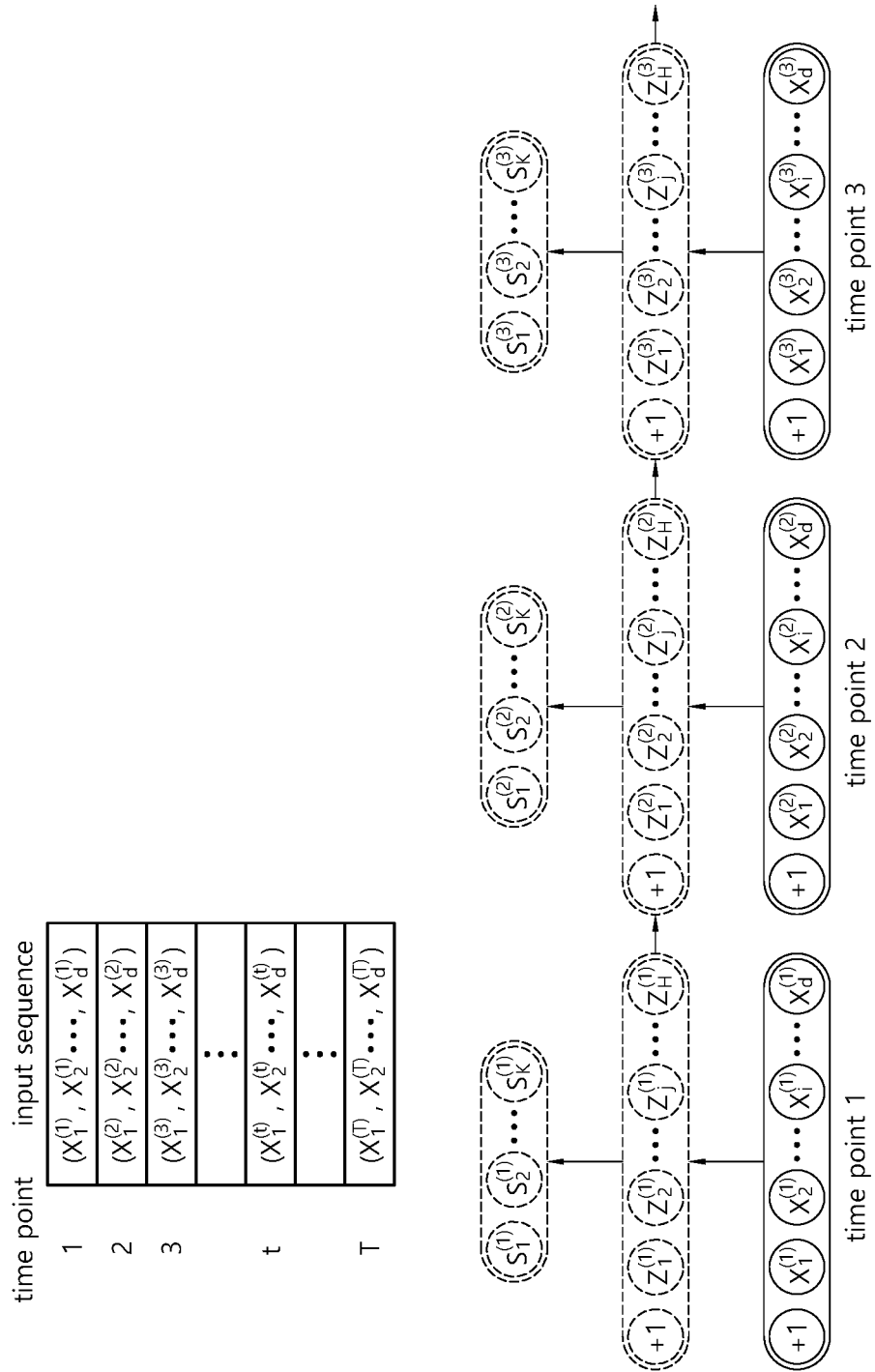
FIG. 11 schematically illustrates an example of an operating structure of a recurrent neural network.

FIG. 11 schematically illustrates an example of an operating structure of a recurrent neural network.

Referring to FIG. 11, the recurrent neural network operates in a sequence of predetermined views with respect to an input data sequence.

The hidden vectors (z1(1), z2(1) . . . , zH(1)) when the input vectors (x1($t$), x2($t$) . . . , xd(t)) at time point 1 are input to the recurrent neural network is input together with the input vector (x1(2), x2(2) . . . , xd(2)) of time point 2, the vector (z1(2), z2(2) . . . , zH(2)) of the hidden layer is determined through the weighted sum and activation function. This process is repeatedly performed until time point 2, time point 3 . . . , time point T.

Meanwhile, when a plurality of hidden layers is arranged in a recurrent neural network, it is referred to as a deep recurrent neural network (DRNN). Recurrent neural networks are designed to be usefully applied to sequence data (e.g., natural language processing).

As a neural network core used as a learning method, in addition to DNN, CNN, and RNN, various deep learning techniques such as Restricted Boltzmann Machine (RBM), deep belief networks (DBN), and deep Q-Network may be included. It can be applied to fields such as computer vision, voice recognition, natural language processing, and voice/signal processing.

Recently, there have been attempts to integrate AI with wireless communication systems, but these have been focused on the application layer and network layer, especially deep learning in the field of wireless resource management and allocation. However, these studies are gradually developing into the MAC layer and the physical layer, in particular, attempts are being made to combine deep learning with wireless transmission in the physical layer. AI-based physical layer transmission means applying a signal processing and communication mechanism based on an AI driver rather than a traditional communication framework in fundamental signal processing and communication mechanisms. For example, deep learning-based channel coding and decoding, deep learning-based signal estimation and detection, deep learning-based MIMO mechanism, AI-based resource scheduling and may include allocations, etc.

THz(Terahertz) Communication

A data rate may increase by increasing bandwidth. This may be performed by using sub-TH communication with wide bandwidth and applying advanced massive MIMO technology. THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

Figure 12:
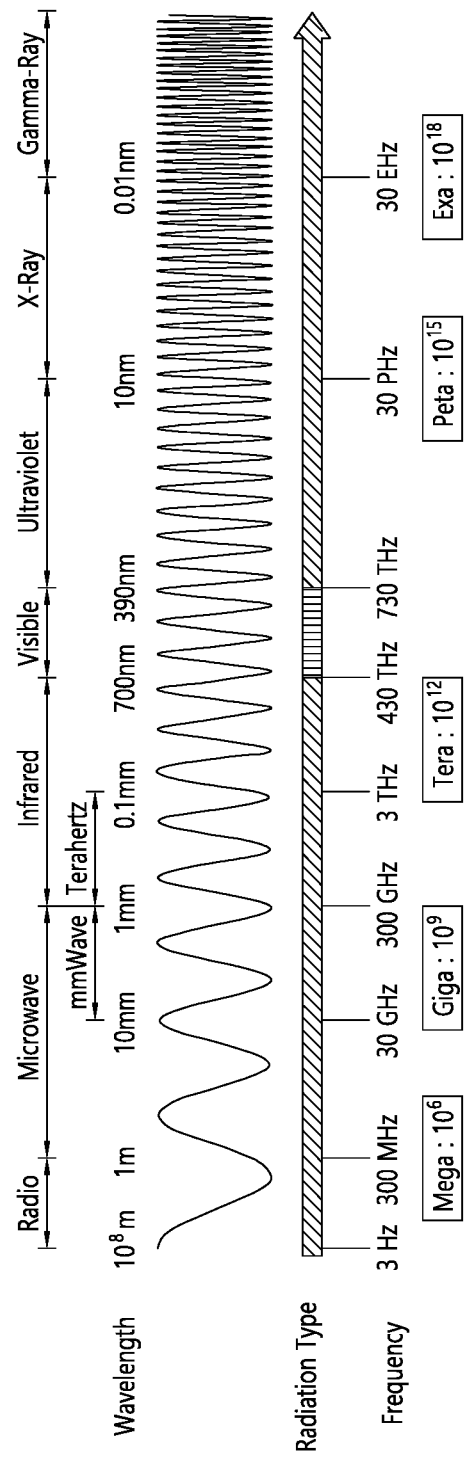
FIG. 12 shows an example of an electromagnetic spectrum.

FIG. 12 shows an example of an electromagnetic spectrum.

The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Optical Wireless Technology

Optical wireless communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as light fidelity/visible light communication, optical camera communication and free space optical (FSO) communication based on wide band are well-known technologies. Communication based on optical wireless technology may provide a very high data rate, low latency and safe communication. Light detection and ranging (LiDAR) may also be used for ultra high resolution 3D mapping in 6G communication based on wide band.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Massive MIMO Technology

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Blockchain

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a peer-to-peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

3D Networking

The 6G system integrates terrestrial and public networks to support vertical expansion of user communication. A 3D BS will be provided through low-orbit satellites and UAVs. Adding new dimensions in terms of altitude and related degrees of freedom makes 3D connections significantly different from existing 2D networks.

Quantum Communication

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Unmanned Aerial Vehicle

An unmanned aerial vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-Free Communication

The tight integration of multiple frequencies and heterogeneous communication technologies is very important in the 6G system. As a result, a user can seamlessly move from network to network without having to make any manual configuration in the device. The best network is automatically selected from the available communication technologies. This will break the limitations of the cell concept in wireless communication. Currently, user movement from one cell to another cell causes too many handovers in a high-density network, and causes handover failure, handover delay, data loss and ping-pong effects. 6G cell-free communication will overcome all of them and provide better QoS. Cell-free communication will be achieved through multi-connectivity and multi-tier hybrid technologies and different heterogeneous radios in the device.

Integration of Wireless Information and Energy Transfer

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Integration of Sensing and Communication

An autonomous wireless network is a function for continuously detecting a dynamically changing environment state and exchanging information between different nodes. In 6G, sensing will be tightly integrated with communication to support autonomous systems.

Integration of Access Backhaul Network

In 6G, the density of access networks will be enormous. Each access network is connected by optical fiber and backhaul connection such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram beamforming (HBF) is a new beamforming method that differs significantly from MIMO systems because this uses a software-defined antenna. HBF will be a very effective approach for efficient and flexible transmission and reception of signals in multi-antenna communication devices in 6G.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Large Intelligent Surface (LIS)

In the case of the THz band signal, since the straightness is strong, there may be many shaded areas due to obstacles. By installing the LIS near these shaded areas, LIS technology that expands a communication area, enhances communication stability, and enables additional optional services becomes important. The LIS is an artificial surface made of electromagnetic materials, and can change propagation of incoming and outgoing radio waves. The LIS can be viewed as an extension of massive MIMO, but differs from the massive MIMO in array structures and operating mechanisms. In addition, the LIS has an advantage such as low power consumption, because this operates as a reconfigurable reflector with passive elements, that is, signals are only passively reflected without using active RF chains. In addition, since each of the passive reflectors of the LIS must independently adjust the phase shift of an incident signal, this may be advantageous for wireless communication channels. By properly adjusting the phase shift through an LIS controller, the reflected signal can be collected at a target receiver to boost the received signal power.

<General Terahertz (THz) Wireless Communication>

THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence. In addition, the photon energy of the THz wave is only a few meV and thus is harmless to the human body. A frequency band which will be used for THz wireless communication may be a D-band (110 GHz to 170 GHz) or a H-band (220 GHz to 325 GHz) band with low propagation loss due to molecular absorption in air. Standardization discussion on THz wireless communication is being discussed mainly in IEEE 802.15 THz working group (WG), in addition to 3GPP, and standard documents issued by a task group (TG) of IEEE 802.15 (e.g., TG3d, TG3e) specify and supplement the description of this disclosure. The THz wireless communication may be applied to wireless cognition, sensing, imaging, wireless communication, and THz navigation.

Figure 13:
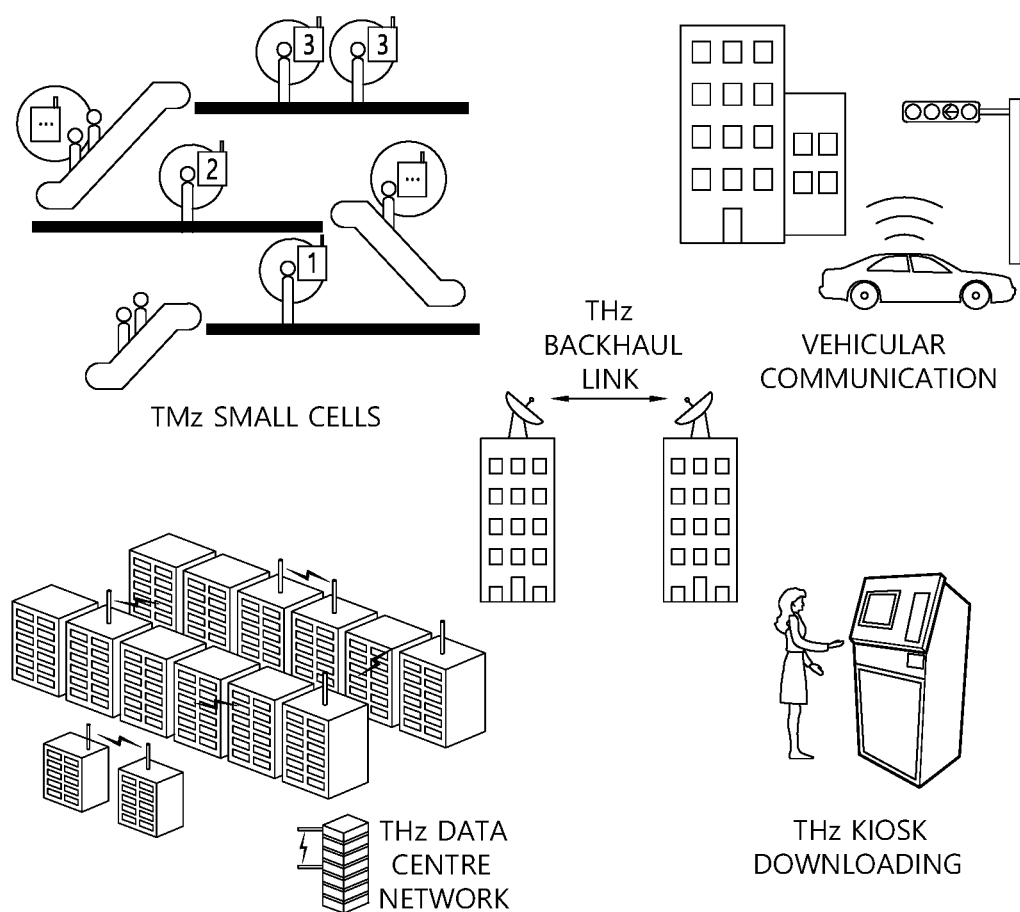
FIG. 13 is a diagram showing an example of a THz communication application.

FIG. 13 is a diagram showing an example of a THz communication application.

As shown in FIG. 13, a THz wireless communication scenario may be classified into a macro network, a micro network, and a nanoscale network. In the macro network, THz wireless communication may be applied to vehicle-to-vehicle (V2V) connection and backhaul/fronthaul connection. In the micro network, THz wireless communication may be applied to near-field communication such as indoor small cells, fixed point-to-point or multi-point connection such as wireless connection in a data center or kiosk downloading.

Table 2 below is a table showing an example of a technology that can be used in a THz wave.

TABLE 2

| | |
|---|---|
| Transceivers Device | Available immature: UTC-PD, RTD and SBD |
| Modulation and coding | Low order modulation techniques (OOK, QPSK), LDPC, Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

Figure 14:
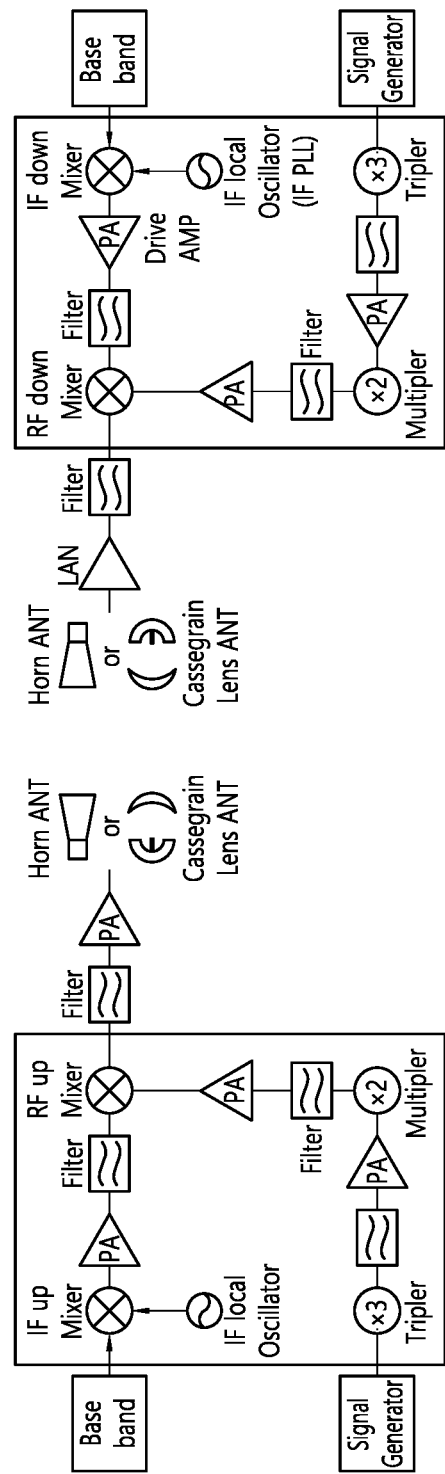
FIG. 14 is a diagram showing an example of an electronic element-based THz wireless communication transceiver.

THz wireless communication can be classified based on the method for generating and receiving THz. The THz generation method can be classified as an optical device or an electronic device-based technology. FIG. 14 is a diagram showing an example of an electronic element-based THz wireless communication transceiver.

The method of generating THz using an electronic device includes a method using a semiconductor device such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 14, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 14. In FIG. 14, IF represents an intermediate frequency, a tripler and a multiplier represents a multiplier, PA represents a power amplifier, and LNA represents a low noise amplifier, and PLL represents a phase-locked loop.

Figure 15:
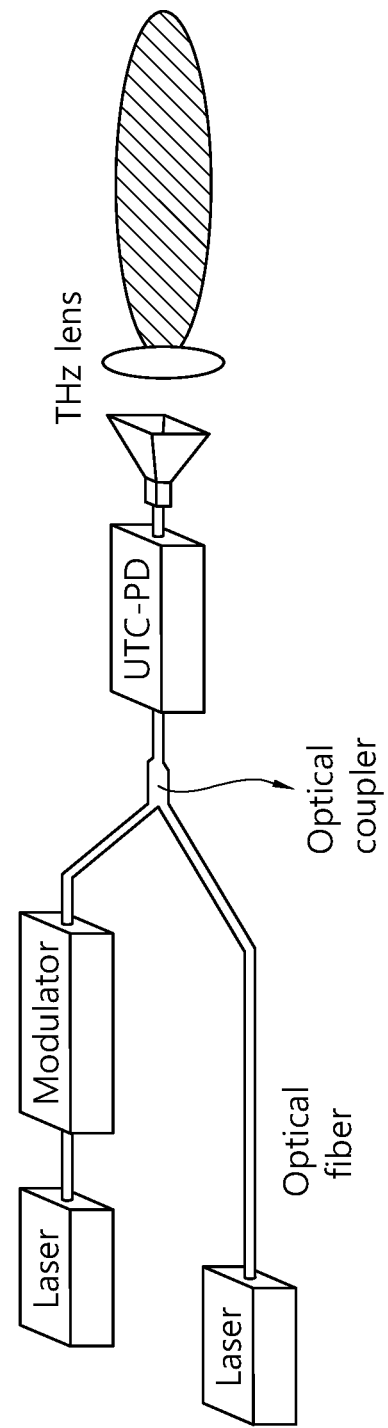
FIG. 15 is a diagram illustrating an example of a method for generating a THz signal based on an optical device.
Figure 16:
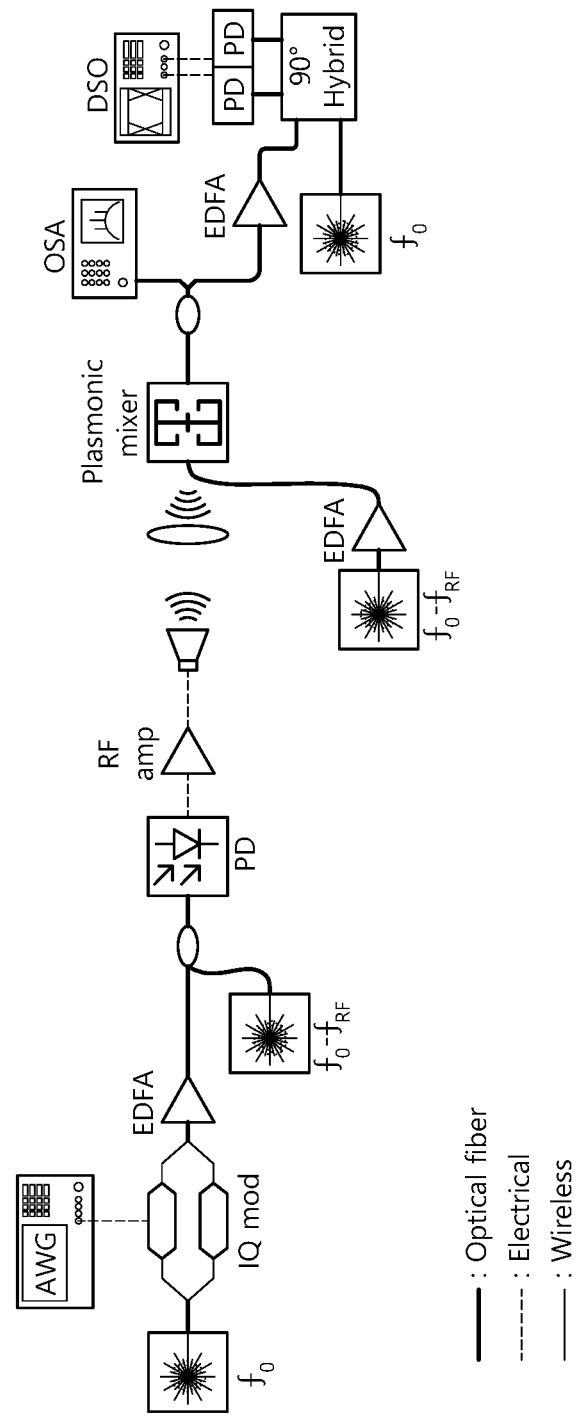
FIG. 16 is a diagram illustrating an example of a THz wireless communication transceiver based on an optical device.

FIG. 15 is a diagram illustrating an example of a method for generating a THz signal based on an optical device, and FIG. 16 is a diagram illustrating an example of a THz wireless communication transceiver based on an optical device.

The optical device-based THz wireless communication technology means a method of generating and modulating a THz signal using an optical device. The optical device-based THz signal generation technology refers to a technology that generates an ultrahigh-speed optical signal using a laser and an optical modulator, and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the THz signal based on the optical device, as shown in FIG. 15, a laser diode, a broadband optical modulator, and an ultrahigh-speed photodetector are required. In the case of FIG. 15, the light signals of two lasers having different wavelengths are combined to generate a THz signal corresponding to a wavelength difference between the lasers. In FIG. 15, an optical coupler refers to a semiconductor device that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 16, an erbium-doped fiber amplifier (EDFA) represents an optical fiber amplifier to which erbium is added, a photo detector (PD) represents a semiconductor device capable of converting an optical signal into an electrical signal, and OSA represents an optical sub assembly in which various optical communication functions (e.g., photoelectric conversion, electrophonic conversion, etc.) are modularized as one component, and DSO represents a digital storage oscilloscope.

Figure 17:
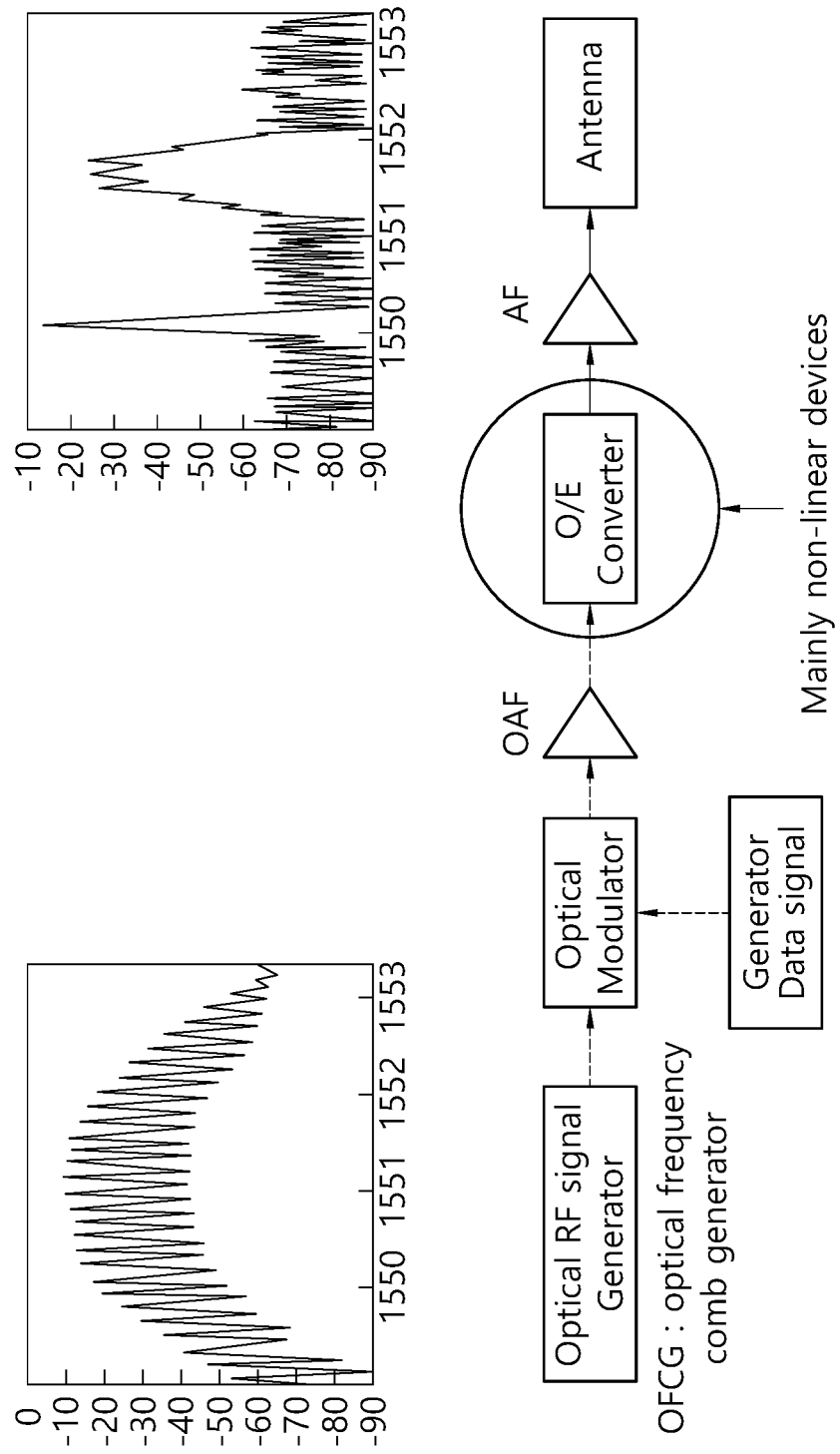
FIG. 17 illustrates a structure of a transmitter based on a photonic source.
Figure 18:
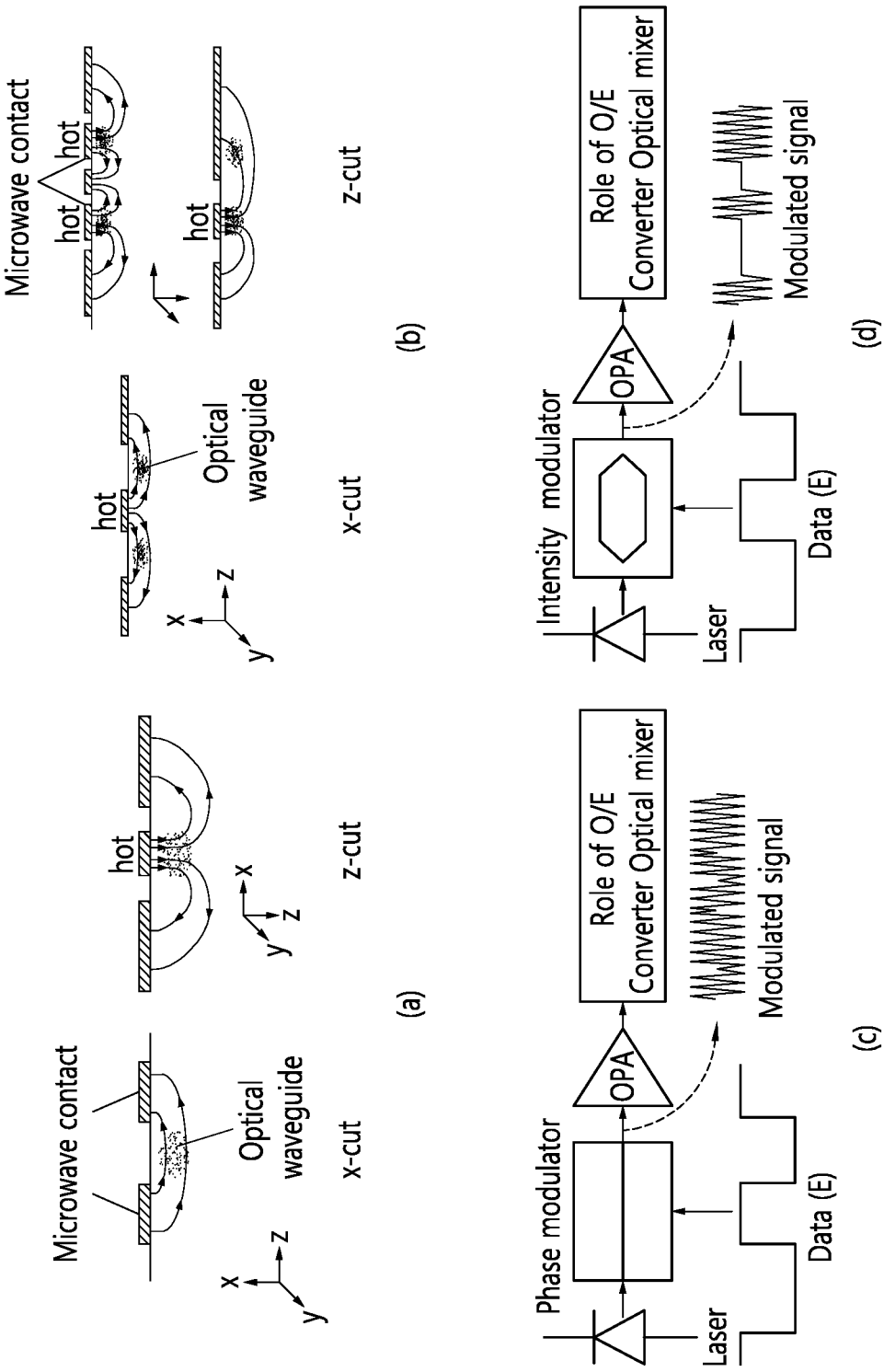
FIG. 18 illustrates a structure of an optical modulator.

The structure of the photoelectric converter (or photoelectric converter) will be described with reference to FIGS. 17 and 18. FIG. 17 illustrates a structure of a transmitter based on a photonic source, and FIG. 18 illustrates a structure of an optical modulator.

Generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (O/E converter) may generate THz pulses according to optical rectification operation by a nonlinear crystal, photoelectric conversion (O/E conversion) by a photoconductive antenna, and emission from a bunch of relativistic electrons. The terahertz pulse (THz pulse) generated in the above manner may have a length of a unit from femto second to pico second. The photoelectric converter (O/E converter) performs down conversion using non-linearity of the device.

Given THz spectrum usage, multiple contiguous GHz bands are likely to be used as fixed or mobile service usage for the terahertz system. According to the outdoor scenario criteria, available bandwidth may be classified based on oxygen attenuation 10^2 dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal non-linearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the photoelectric converter may be transmitted in a specific resource region (e.g., a specific frame).

The frequency domain of the specific resource region may include a plurality of chunks. Each chunk may be composed of at least one component carrier (CC).

<Quantum Cryptographic Communication>

Quantum Key Distribution (QKD) technology is a technology that generates secret symmetric key information required for encryption and decryption of transmitted data, as described in the drawings below. To achieve this, quantum cryptographic communication technology first transmits quantum key information from the transmitter to the receiver through a quantum channel to share key information. However, in this process, the shared key information between the transmitter and receiver cannot be perfectly matched due to the presence of an eavesdropper, imperfections in the components and quantum channel, etc. Therefore, a post-processing process is performed to compensate for this, and additional information required for the post-processing process is exchanged through a public channel, and then the key information of the transmitter and receiver is matched based on this information and used as the final secret symmetric key.

Figure 19:
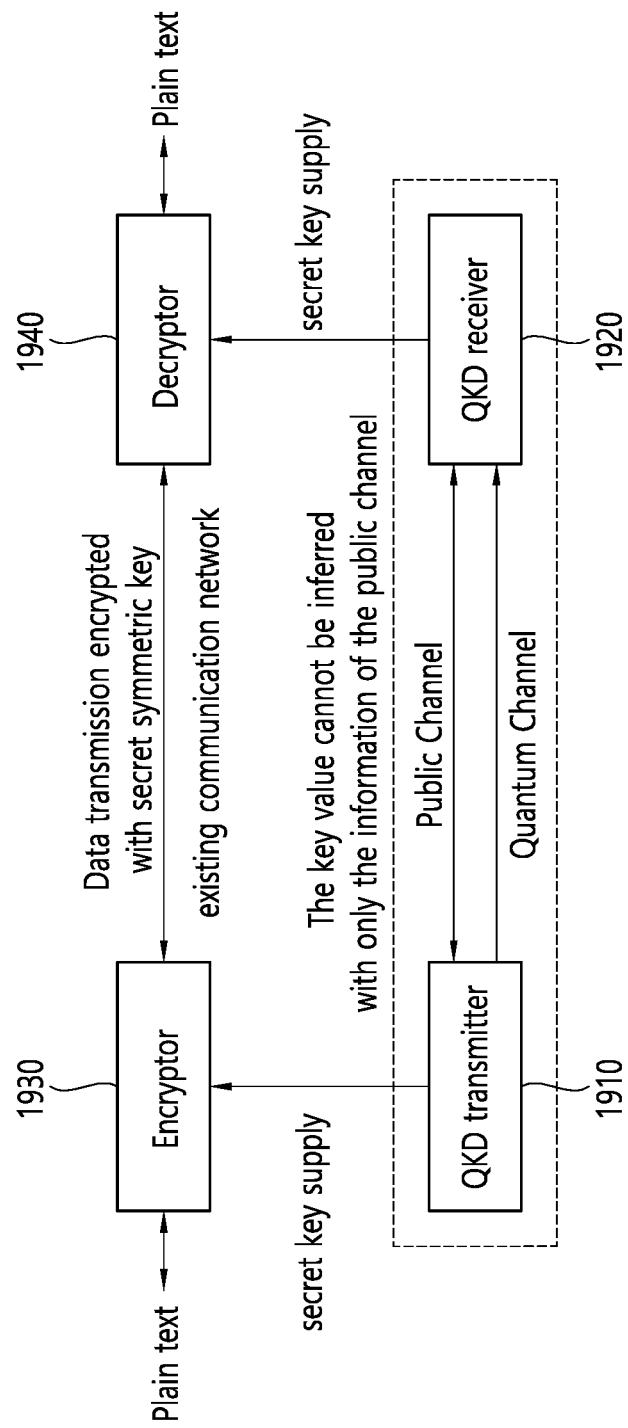
FIG. 19 schematically illustrates an example of quantum cryptographic communication.

FIG. 19 schematically illustrates an example of quantum cryptographic communication.

According to FIG. 19, a quantum key distribution (QKD) transmitter 1910 may be connected to a QKD receiver 1920 over a public channel and a quantum channel to perform communication.

The QKD transmitter 1910 may provide a secret key to an encryptor 1930, and the QKD receiver 1920 may also provide a secret key to the decryptor 1940. Here, the encryptor 1930 may have plaintext input/output, and the encryptor 1930 may transmit data encrypted with the secret symmetric key to the decryptor 1940 (over an existing communication network). In addition, plaintext may be input to and output from the decryptor 1940.

More specifically, quantum cryptographic communication is described below.

Unlike conventional communication methods that communicate by wavelength or amplitude, quantum cryptographic communication systems use a single photon, the smallest unit of light, to carry signals. While conventional cryptographic systems are mostly guaranteed by the complexity of mathematical algorithms, quantum cryptographic communication is based on the unique properties of quanta, so its stability is guaranteed as long as the physical laws of quantum mechanics are not broken.

For example, the BB84 protocol carries information in the state of photons such as polarization, phase, etc., and using the properties of quanta, it is theoretically possible to divide the secret key (sift key) in an absolutely safe manner.

Below is an example of a BB84 protocol that generates a secret key by embedding information in the polarization state between Alice on the transmitter side and Bob on the receiver side, and the overall flow of the BB84 protocol is as follows.

(1) Alice randomly generates bits.

(2) She randomly selects a transmit polarizer to determine which polarization the bit information will be carried in.

(3) She generates polarization signals corresponding to the randomly generated bits in (1) and the randomly selected polarizers in (2) and transmits them in the quantum channel.

(4) Bob randomly selects a measurement polarizer to measure the polarization signal transmitted by Alice.

(5) He measures the polarization signal transmitted by Alice with the selected polarizer and store it.

(6) Alice and Bob share which polarizer they used over the classical channel.

(7) They obtain the secret key by keeping the bits with the same polarizer and removing the bits with different polarizers.

TABLE 3

| Bits generated by Alice | | | | | | | | |
|---|---|---|---|---|---|---|---|---|
| Transmit polarizer selected by Alice | + | + | x | + | x | x | x | + |
| Polarization signal transmitted by Alice | ↑ | → | ▨ | ↑ | ▨ | ▨ | ▨ | → |
| Measurement polarizer selected by Bob | + | x | x | x | + | x | + | x |
| Polarization signal measured by Bob | ↑ | ▨ | ▨ | ▨ | → | ▨ | → | → |
| Verify whether the transmitter polarizer and the measurement polarizer match | | | | Data exchange over a classical channel | | | | |
| Finally generated secret key | 0 | | | 1 | | | 0 | 1 |

While these BB84 protocols provide absolute security in theory, there are flaws in actual hardware implementations, most notably polarization distortion due to birefringence in optical fibers. Birefringence is the phenomenon that when light passes through a non-isotropic medium, the polarization component perpendicular to the optical axis of the medium and the polarization component horizontal to it experience different time delays. This different time delay causes a phase difference between the two components, and the phase difference between the two components means that the polarization is distorted. On the other hand, the post-processing process of quantum cryptographic communication technology consists of three steps: an error rate estimation step of quantum key information, a quantum key error recovery step, and a secrecy amplification step. The present disclosure deals with the first of these steps, the error rate estimation step of quantum key information, in which the existence of an eavesdropper is determined by estimating the QBER, and if the estimated QBER value is below the value that serves as a criterion for determining the existence of an eavesdropper, the process of quantum cryptographic communication through shared key information is continued; otherwise, the key information is discarded and the key sharing process is stopped. Since the QBER estimation process is the process of judging the presence or absence of eavesdropping on shared key information in quantum cryptographic communication techniques, the reliability of the QBER, which is the standard, should be guaranteed. However, in order to obtain higher accuracy, more key-related information should be shared through public channels, which increases the amount of leaked information. Therefore, there is a trade-off between accuracy and amount of leaked information in the QBER estimation stage, so a method is needed to secure high QBER estimation accuracy while reducing the amount of leaked information as much as possible.

Figure 20:
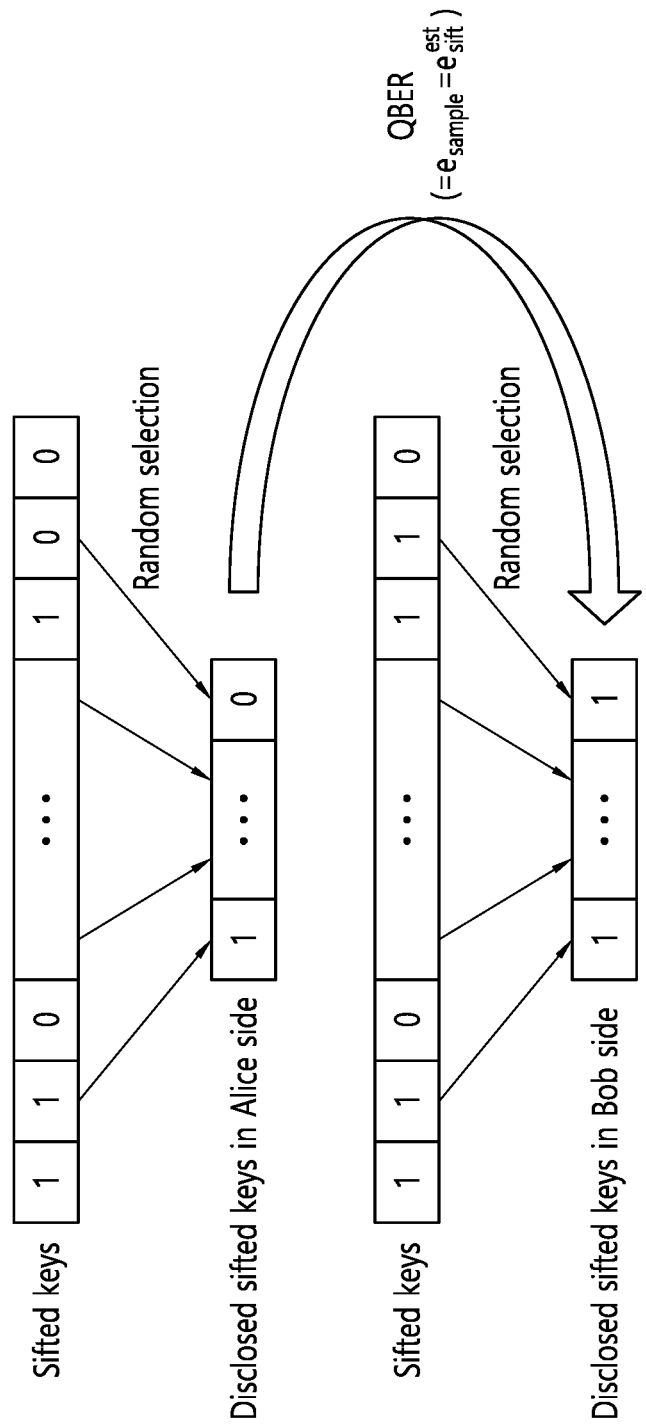
FIG. 20 schematically illustrates an example of a random sampling method (RSM).

FIG. 20 schematically illustrates an example of a random sampling method (RSM).

An example of a QBER estimation technique is random sampling (RS) technique. As shown in FIG. 20, the RS method randomly selects a certain percentage (10-20%) of the sifted key(s) generated only by the key information of the basis matching position among the key information shared by the transmitter (Alice side) and the receiver (Bob side) through the quantum channel, and then compares the selected transmitted and received sifted key information to estimate the QBER.

The detailed process of RS technique is as follows.

(1) Randomly select 10-20% of the sifted key information from the transmitter (Alice side).

(2) The transmitter transmits the selected key information and location information to the receiver (Bob side) through a public channel.

(3) The receiver compares the key information and the location information received from the transmitter with the key information of the transmitter to get the QBER, which is expressed as follows.

QBER=e_sift^est=(number of mismatches among the key information of the same location selected in the RS of the transmitter and receiver)/(total number of key information selected in the RS)

(4) Since the sifted key information used to measure QBER has been exposed to a third party through an open channel, it is discarded to ensure the safety of the key information, and the remaining sifted key information is used for the remaining post-processing.

As such, the RS method discloses and discards some of the key information shared through the actual quantum channel, resulting in a large waste of key information. In addition, more accurate QBER estimation requires sacrificing more key information.

Therefore, when RS technique is used as a QBER estimation technique in a QKD system, typically 10-20% of the total sifted keys are discarded in the process, resulting in a low key rate. Another problem is that accurate QBER estimation is not easy when the length of the sifted key is not long. However, if the key length is long, it has the advantage of being able to estimate a nearly accurate QBER regardless of the variation in the error rate of the actual system.

Figure 21:
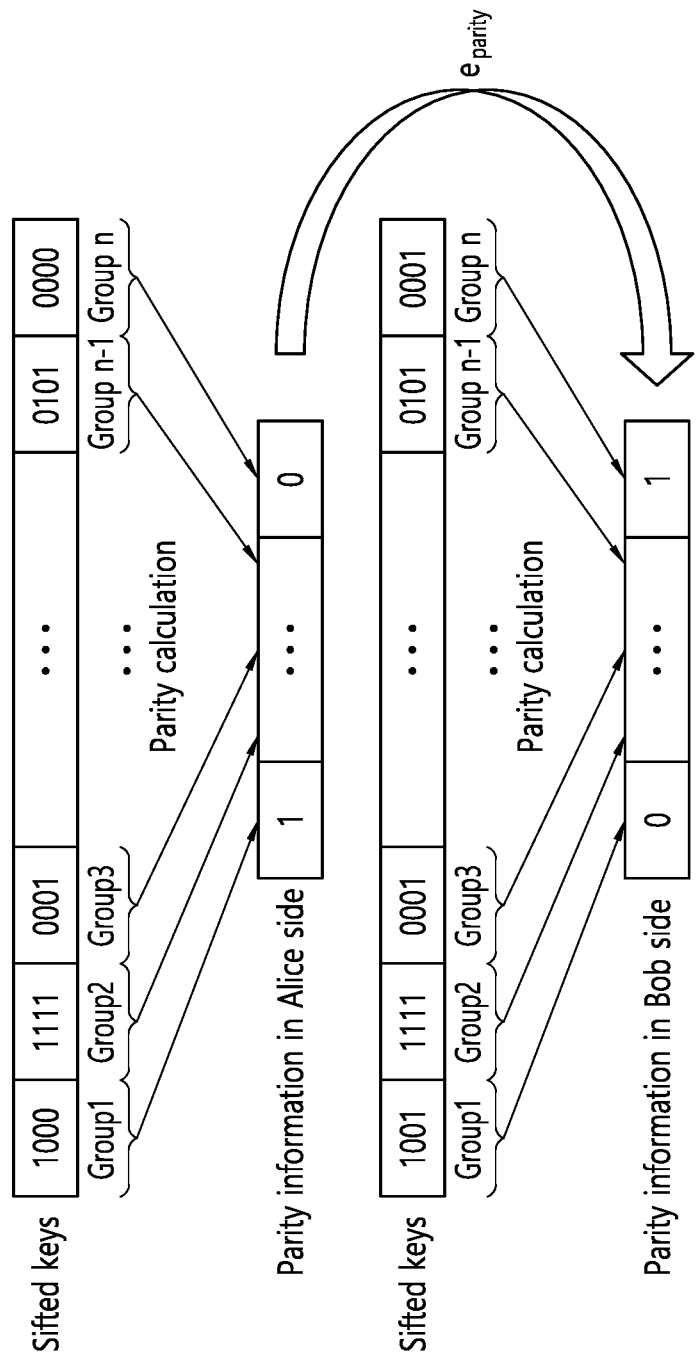
FIG. 21 schematically illustrates an example of a parity comparison method (PCM).

FIG. 21 schematically illustrates an example of a parity comparison method (PCM).

Considering that the error rate of a QKD system without an eavesdropper is typically low, in the range of 3-7%, the RS technique may use too many resources to estimate the QBER in a QKD system that is primarily used in a low QBER environment. From this perspective, the parity comparison technique has emerged as a technique for estimating QBER with minimal resource usage. The parity comparison technique creates a group of L key information among the sifted keys as shown in FIG. 21, compares the parity value of 1 bit of the transmitter and receiver obtained by the modulo 2 sum of each group, and estimates the QBER based on this value.

The detailed QBER estimation process of PCM is as follows.

(1) L sifted keys of the transmitter are grouped together to obtain n parity values, and the value of one parity bit is obtained through the following equation.

$$b_{parity}^{Alice} = \left(\sum_{i \in group} b_i^{Alice}\right) \bmod 2, \text{ where } b_i^{Alice}, b_{parity}^{Alice} \in \{0,1\}$$

(2) At the receiver, use the same process as at the transmitter to obtain n parity bit values.

(3) After transmitting the transmitter's n parity information to the receiver through an open channel, compare the parity values at the same location in the shared parity information of the transmitter and the receiver to get the parity error probability, e_parity^est.

e_parity^est=(number of mismatches in the parity information of the transmitter and receiver)/n (4) Derive QBER from the statistical parity error probability e_parity^est and the length L of the group QBER=e_sift=(1−(1−2e_parity^est)^(1/L))/2 with statistical e_parity^est and preset L The proof of the above process can be summarized as follows.

The probability of a group (consisting of L sifted keys) having different parity values is equal to the probability of an odd number of errors in parity. Thus, the parity error probability e_parity^est may be defined as follows.

$$e_{parity}^{est} = p_{odd} = \sum_{i=odd}^{L} \binom{L}{i} e_{sift}^i (1-e_{sift})^{L-i} = \frac{1-(1-2e_{sift})^L}{2}$$

The process of proving that the left-hand side $$\sum_{i=odd}^{L} \binom{L}{i} e_{sift}^i (1-e_{sift})^{L-i}$$

is equivalent to the right-hand side $(1-(1-2e\_sift)^L)/2$ is as follows.

Substituting y=e_sift, x=1−e_sift, and using $$(x+y)^L = \sum_{i=0}^{L} \binom{L}{i} x^{L-i} y^i,$$

$$(x-y)^L = \sum_{i=0}^{L} \binom{L}{i} x^{L-i} (-y)^i,$$

we get the following.

$$e_{parity}^{est} =$$

$$\frac{1-(1-2e_{sift})^L}{2} = \frac{(1-e_{sift}+e_{sift})^L - (1-2e_{sift})^L}{2} = \frac{(x+y)^L - (x-y)^L}{2} =$$

$$\frac{2\sum_{i=odd}^{L} \binom{L}{i} e_{sift}^i (1-e_{sift})^{L-i}}{2} = \sum_{i=odd}^{L} \binom{L}{i} e_{sift}^i (1-e_{sift})^{L-i}$$

Re-writing e_parity^est=(1−(1−2e_sift)^L)/2 with respect to e_sift, we get e_sift=(1−(1−2*e_parity^est)^(1/L))/2.

On the other hand, the PCM technique estimates the QBER based on the parity information obtained from a set of a certain number of sifted keys rather than the sifted keys of the transmitter and receiver, so the amount of information leaked through the public channel is small compared to the RS technique, and it has the advantage that the loss of key information can be greatly reduced from 10 to 20% of the total key information to the number of groups by disclosing only the parity information of the group instead of disclosing the sifted key information through the public channel.

However, the PCM technique has a large variation in QBER estimation accuracy depending on the set value of the length L of the group. The lower the error rate a QKD system contains, the lower the percentage of errors in a group, even if the group length L is long, so parity comparisons are sufficient to detect errors. However, if the error rate is high, it is difficult to estimate the error rate with sufficient accuracy by parity comparisons alone, because as L increases, the likelihood of having many errors in a group increases. In particular, PCM does not know if an error exists if there is an even number of errors in a group, so the accuracy decreases as the error rate in a QKD system is larger.

Figure 22:
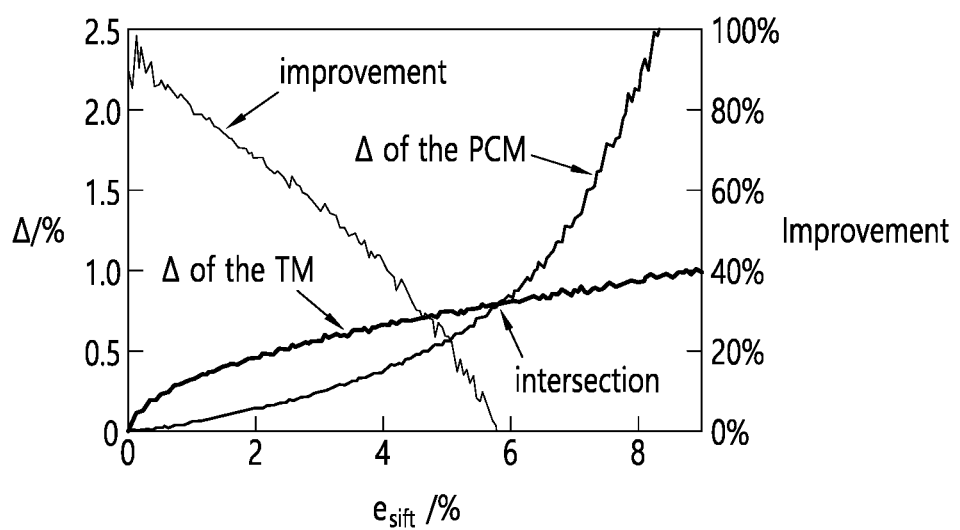
FIG. 22 schematically illustrates a comparison of QBER estimation accuracy based on the actual QBER of random sampling (TM) and PCM.

FIG. 22 schematically illustrates a comparison of QBER estimation accuracy based on the actual QBER of random sampling (TM) and PCM.

FIG. 22 shows the QBER estimation accuracy of the two techniques as a function of the error rate of the sifted key when the length of the sifted key shared over a quantum channel in a quantum cryptographic system is 5000 bit(s), the rate of random sampling is 10% of the total sifted key, and the group length of PCM is L=15.

The estimation accuracy is given by $\Delta=|e\_sift\hat{}est-e\_sift|$, which is the difference between the estimated error rate $e\_sift\hat{}est$ and the actual error rate $e\_sift$ for each technique. For PCM techniques, accuracy is better than random sampling for error rates below 6%, and worse for error rates above 6%. For error rates above 6%, the probability of multi-error increases, which is caused by an increasing number of undetected errors in the parity comparison process of PCM. However, in terms of the amount of leaked information, the PCM technique uses only 333 bits of parity information as leaked information, which gives it an advantage over RS, which uses 500 bits of key information as leaked information.

Figure 23:
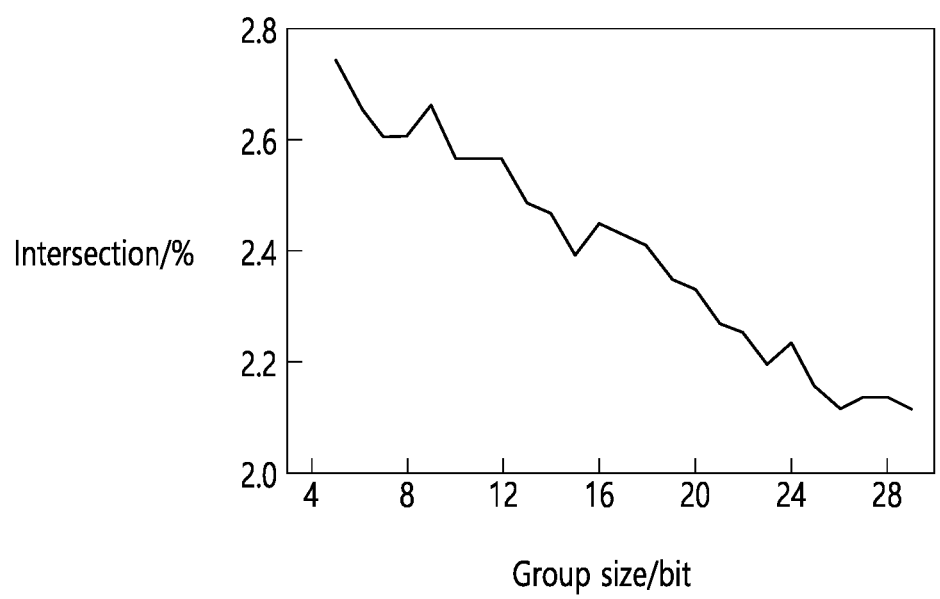
FIG. 23 schematically illustrates an example of the maximum QBER for which PCM is more accurate than RX as the group size varies.

FIG. 23 schematically illustrates an example of the maximum QBER for which PCM is more accurate than RX as the group size varies.

For a sifted key length of 1M bits and a random sampling rate of 10% of the total sifted key, FIG. 23 shows the maximum error rate as group size L increases for which PCM has good QBER estimation accuracy compared to random sampling. It can be seen that as the group size increases, the QBER estimation accuracy of PCM degrades more and more because the group is more likely to contain more errors.

The following describes the present disclosure in more detail.

The present disclosure relates to a method for improving the accuracy of a QBER estimation technique during a post-processing process (comprising a quantum bit error rate (=QBER) estimation, error restoration, and secrecy amplification process of a quantum key) performed after exchanging a quantum key in a quantum secure communication system. More specifically, the present disclosure relates to a parity-based QBER estimation technique and device that can improve the accuracy of QBER estimation compared to other QBER estimation techniques while minimizing the amount of information leaked through a public channel during the QBER estimation process of estimating a mismatch ratio of key information for determining whether quantum cryptographic key information shared over a quantum channel in a QKD system is hacked.

The present disclosure addresses improvements to two problems encountered in parity-based QBER estimation methods that estimate the error rate of quantum key information shared over a quantum channel in the above quantum cryptographic communication techniques without direct loss of sifted key information.

First, one-dimensional parity-based QBER estimation techniques may estimate the presence of errors through parity comparisons only if the group contains an odd number of errors. However, the one-dimensional parity-based QBER estimation technique cannot identify the presence of errors when the group contains an even number of errors because the parity bits of the transmitter and receiver have the same value. Therefore, as the error rate of the sifted key increases, the probability of the occurrence of an even number of errors that cannot be estimated as errors also increases, and the one-dimensional parity-based QBER estimation technique suffers from increasingly poor accuracy. To solve this problem, the present disclosure proposes a method that can maximize the estimation of the number of even errors by using two-dimensional parity information.

Next, parity-based QBER estimation has a large variation in error estimation accuracy depending on the group size for parity operation and the error rate contained in the sifted key, and in general, as the error rate contained in the sifted key increases, a smaller group size can ensure good performance. However, parity-based QBER estimation suffers from the problem that the smaller the group size, the more parity information is released into the public channel, resulting in a large amount of leaked information. Therefore, the present disclosure proposes a method to minimize the amount of leaked information by modeling the maximum length that can guarantee the accuracy of QBER estimation based on the error rate contained in the sifted key.

Hereinafter, for a better understanding of the examples of the present disclosure, the disclosure will be described with reference to the drawings. The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 24:
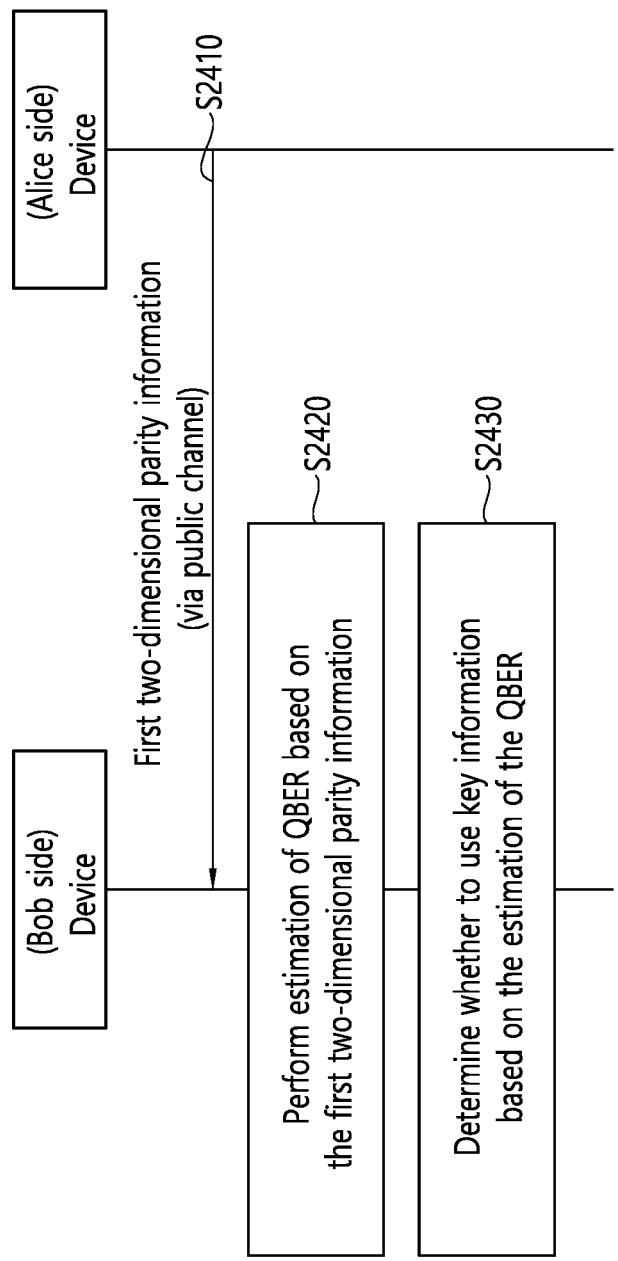
FIG. 24 is a flowchart of a method for estimating a QBER, according to one embodiment of the present disclosure.

FIG. 24 is a flowchart of a method for estimating a QBER, according to one embodiment of the present disclosure.

According to FIG. 24, a device may receive first two-dimensional parity information from another device over a public channel (S2410).

The device may perform an estimation of the QBER based on the first two-dimensional parity information (S2420).

The device may determine the key information based on the estimation of the QBER (S2430).

In one example, the device may receive the sifted key information from another device via a quantum channel. As more specific details thereof are described above and/or hereinafter, repetitive descriptions will be omitted for ease of explanation.

In one example, the sifted key information may comprise a plurality of bits, and the plurality of bits may be grouped into a plurality of first bit groups. As more specific details thereof are described above and/or hereinafter, repetitive descriptions will be omitted for ease of explanation.

In one example, the device may obtain second two-dimensional parity information from the sifted key information, and the device may perform an estimation of the QBER based on the first two-dimensional parity information and the second two-dimensional parity information. As more specific details thereof are described above and/or hereinafter, repetitive descriptions will be omitted for ease of explanation.

In one example, the plurality of first bit groups is arranged in a two-dimensional form, and the device may obtain the second two-dimensional parity information based on parity information for rows of the two-dimensional form and parity information for columns of the two-dimensional form. As more specific details thereof are described above and/or hereinafter, repetitive descriptions will be omitted for ease of explanation.

In one example, information of the length for each of the plurality of first bit groups may be shared between the device and another device. As more specific details thereof are described above and/or hereinafter, repetitive descriptions will be omitted for ease of explanation.

In one example, the length for each of the plurality of first bit groups may be determined based on an estimate of the preceding QBER. As more specific details thereof are described above and/or hereinafter, repetitive descriptions will be omitted for ease of explanation.

In one example, the device may determine a length for each of the plurality of second bit groups to be included in the next sifted key information based on an estimate of the QBER. As more specific details thereof are described above and/or hereinafter, repetitive descriptions will be omitted for ease of explanation.

In one example, information of the length for each of the plurality of second bit groups may be shared between the device and another device. As more specific details thereof are described above and/or hereinafter, repetitive descriptions will be omitted for ease of explanation.

The another device described above may also be a device that includes, for example, a QKD transmitter (i.e., Alice side) and an encryptor (and/or decryptor). The device may also be a device that includes, for example, a QKD receiver (i.e., Bob side) and a decryptor (and/or encryptor).

Examples of the device and another device may be illustrated by way of drawings.

Figure 25:
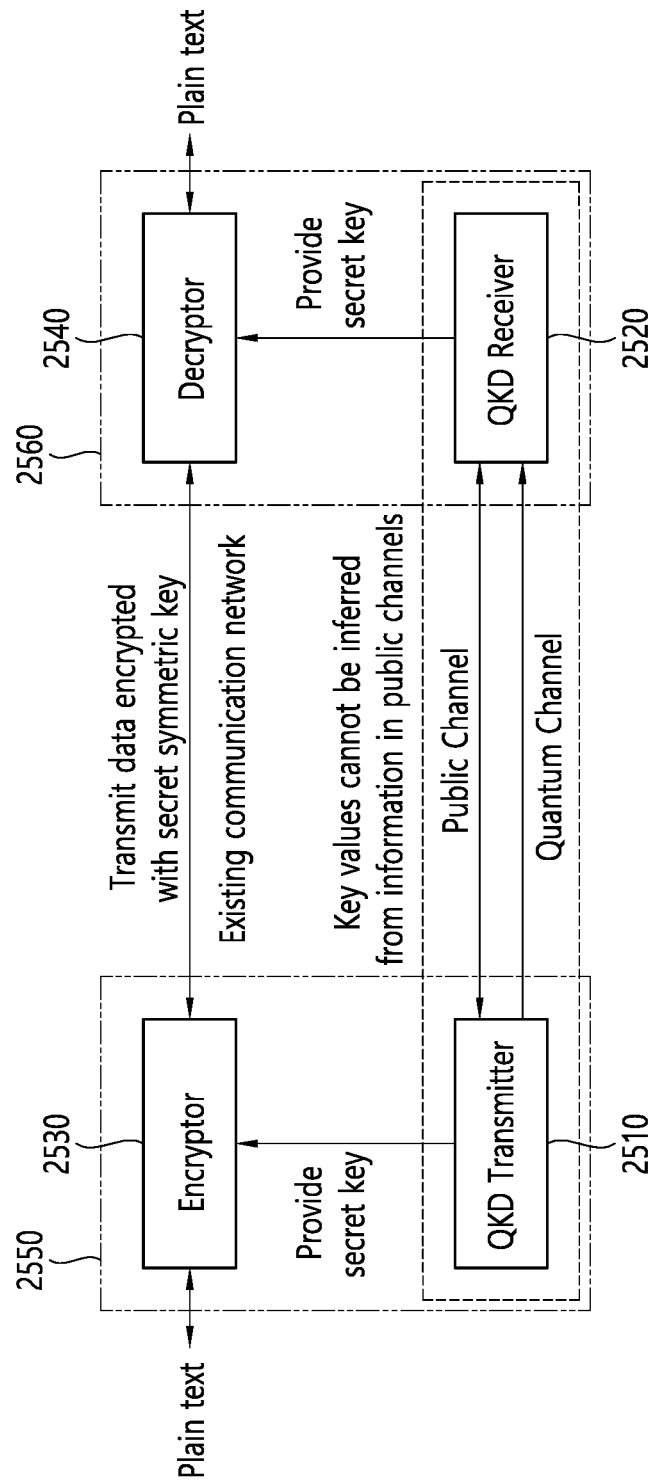
FIG. 25 schematically illustrates an example of a device according to one embodiment of the present disclosure.

FIG. 25 schematically illustrates an example of a device according to one embodiment of the present disclosure.

According to FIG. 25, a quantum key distribution (QKD) transmitter 2510 may be connected to a QKD receiver 2520 over a public channel and a quantum channel to perform communication.

The QKD transmitter 2510 may provide a secret key to an encryptor 2530, and the QKD receiver 2520 may also provide a secret key to a decryptor 2540. Here, the encryptor 2530 may have plaintext input/output, and the encryptor 2530 may transmit data encrypted with the secret symmetric key to the decryptor 2540 (over an existing communication network). Additionally, plaintext may be input to and output from the decryptor 2540.

Here, the encryptor and decryptor may transmit/receive data over a communication network as described above, where the communication network may refer to, for example, a communication network in the 3GPP family (e.g., a communication network based on LTE/LTE-A/NR), a communication network in the IEEE family, and the like.

The encryptor 2530 and the QKD transmitter 2510 may be included in a single device 2550, and the decryptor 2540 and the QKD receiver 2520 may also be included in a single device 2560.

Note that, for ease of explanation, the drawings depict a configuration in which the single device 2550 includes only the encryptor 2530 and the QKD transmitter 2510, but the single device 2550 may also include a separate decryptor in addition to the QKD transmitter 2510 and the encryptor 2530. Similarly, the single device 2560 may include a separate encryptor as well as the decryptor 2540 and the QKD receiver 2520.

Based on the foregoing description, one embodiment of the communication method will now be described schematically with reference to the drawings.

Figure 26:
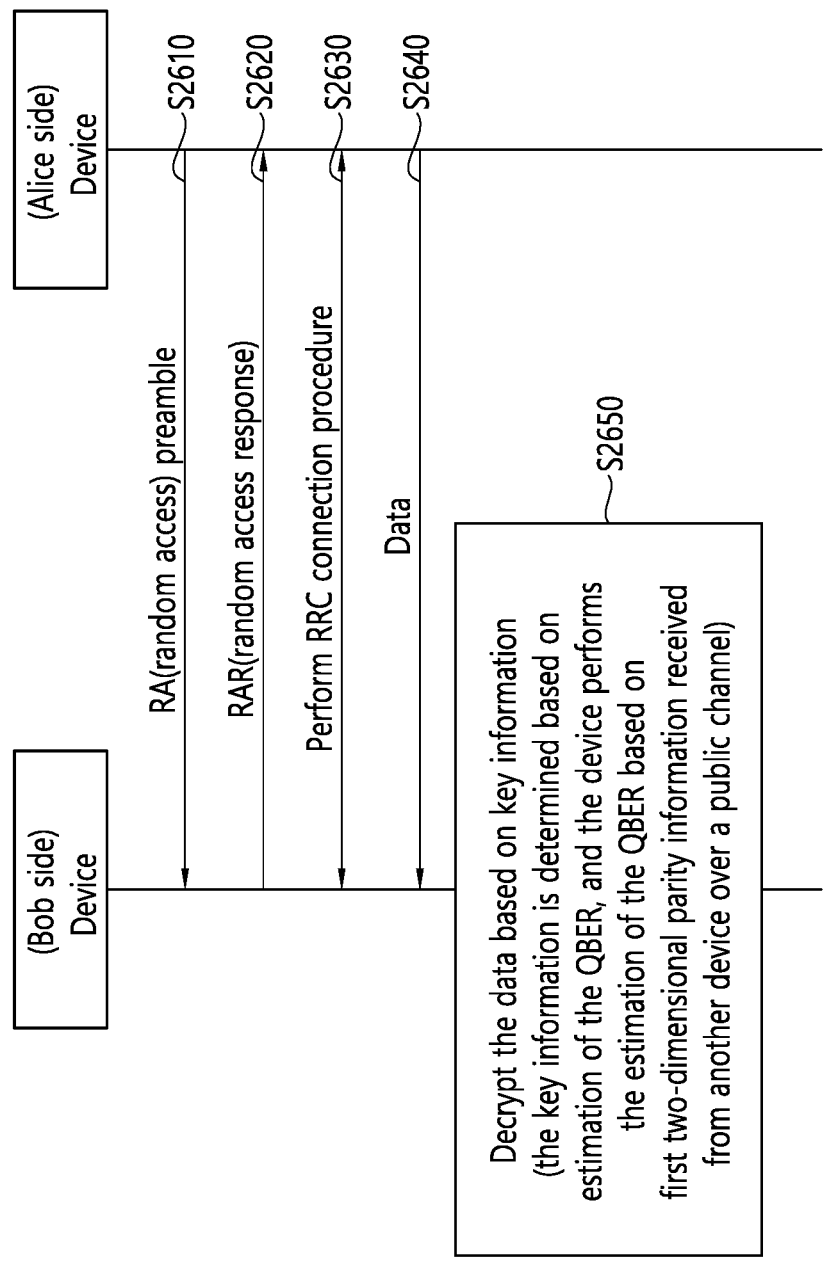
FIG. 26 is a flowchart of a method for estimating a QBER, according to another embodiment of the present disclosure.

FIG. 26 is a flowchart of a method for estimating a QBER, according to another embodiment of the present disclosure.

According to FIG. 26, a device may receive a random access (RA) preamble from another device (S2610).

The device may transmit a random access response (RAR) to another device in response to the RA preamble (S2620). As more specific details thereof are described above and/or hereinafter, repetitive descriptions will be omitted for ease of explanation.

The device may perform a radio resource control (RRC) connection procedure with another device (S2630). As more specific details thereof are described above and/or hereinafter, repetitive descriptions will be omitted for ease of explanation.

The device may receive data from another device (S2640). As more specific details thereof are described above and/or hereinafter, repetitive descriptions will be omitted for ease of explanation.

The device may decrypt the data based on the key information (S2650). Here, the key information may be determined based on an estimate of the QBER. Further, the device may perform the estimation of the QBER based on first two-dimensional parity information received from another device over a public channel. As more specific details thereof are described above and/or hereinafter, repetitive descriptions will be omitted for ease of explanation.

Hereinafter, embodiments of the present disclosure will be described in more detail with respect to those previously omitted.

The present specification describes a configuration of a QBER estimation technique, and provides a configuration using a QBER estimation method based on parity information to prevent direct leakage of key information. In this case, the problem that the estimation technique can only be applied when the system has a low QBER due to the failure to estimate the error when an even number of errors are included in a group consisting of a certain length of quantum key information used in the parity operation is extended to a two-dimensional parity comparison, and a method is presented to improve it so that it can have good accuracy even at a higher QBER.

In addition, in the parity-based QBER estimation technique, the shorter the length of the group, the more accurate the QBER estimation, but the larger the amount of leaked information, and the longer the length of the group, the smaller the amount of leaked information, but the less accurate the QBER estimation. Therefore, the present disclosure presents a method to minimize the amount of leaked group information by tabulating the longest length of the group that can guarantee the estimation accuracy according to the error rate caused by the imperfection of the quantum cryptographic communication system.

Hereinafter, the present disclosure presents a method for improving accuracy through a two-dimensional extension of other parity-based QBER estimation technique and a method for setting a maximum length that can guarantee the accuracy of the error rate of the key information estimated from the parity information based on the error rate contained in the sifted key, showing that the amount of leaked parity information can be minimized while maintaining high accuracy.

1. Setting a Maximal Group Length according to the Error Rate of the Sifted Key Information in the Parity-Based QBER Estimation Process In the parity-based QBER estimation technique, the parity value is obtained according to the error rate contained in the sifted key obtained after exchanging key information over the quantum channel. For accurate QBER estimation, it is recommended to keep the length of the group as short as possible.

This is because the longer the group, the more sifted key information is included to form the group, and therefore the more likely it is that there will be multiple errors in the group, which makes it difficult to estimate exactly how many of the sifted keys in the group have errors based on parity information alone.

However, when the length of the group is short, the amount of parity information leaked through the public channel during the QBER estimation process of the QKD technique increases, which also increases the likelihood that a third-party eavesdropper can learn the full key information. As such, parity-based QBER estimation techniques have a trade-off between accuracy and the amount of leaked information. Therefore, the present disclosure presents an efficient method to optimize the accuracy and the amount of leaked information by increasing the size of the group used to obtain one parity bit to the maximal length that can guarantee the accuracy of the QBER estimation and then obtaining the parity bit.

As previously described, in one example, the information of the length for each of the plurality of first bit groups may be shared between the device and another device.

In one example, the length for each of the plurality of first bit groups may be determined based on an estimate of the previous QBER. In one example, the device may determine a length for each of the plurality of second bit groups to be included in the next sifted key information based on an estimate of the QBER. In one example, the information of the length for each of the plurality of second bit groups may be shared between the device and another device.

More specifically, the group size used to obtain the value of the parity bit in the parity-based QBER estimation technique presented herein may be obtained by the following process.

(1) In a situation where the QKD system is not being eavesdropped, the error rate of the sifted key transmitted over the quantum channel is caused by the instability of the system and is generally known to be low, within 3-7%. Therefore, the error rate of the initial sifted key, e_sift^initial, is applied in the range of 3-7% (In a typical QKD system, before transmitting keys, the amount of error caused by the system's instability under stable conditions is tested in advance, and the value is used as the initial e_sift^initial.).

(2) The maximal group length L, which is applied to obtain the value of the initial parity bit at the transmitter and receiver of the QKD system, is obtained by the following equation, and the proof is as follows.

$$L=\text{round}[-1/\ln(1-2*e\_sift^\wedge initial)]$$

round(x) results in the integer of x+1, rounded to the first decimal place if the decimal part of x is greater than or equal to 0.5, or the integer of x if less, which is the discarded form of the integer.

The above process may be proved as follows.

In other parity-based QBER estimation techniques, the error rate of the sifted key bits, e_sift, is obtained from the error rate of the parity bits, e_parity^est, as follows. (The equation below is as described earlier).

$$e\_sift=(1-(1-2e\_parity^\wedge est)^\wedge(1/L))/2$$

Therefore, the estimation accuracy of e_sift as a function of group length L may be found by differentiating it with respect to a fixed e_parity^est, which is represented by e_sift'. The smaller e_sift' is, the higher the estimation accuracy.

$$e\_sift'=((1-(1-2*e\_parity^\wedge est)^\wedge(1/L))/2)'=(1-2e\_parity^\wedge est)^\wedge(1/L-1)/L=(1-2e\_parity^\wedge est)^\wedge(1/L)/(e\_parity^\wedge est)'$$

Expressing the estimation accuracy in terms of e_parity^est is equivalent to having a large value of (e_parity^est)', as shown in the above equation, and (e_parity^est)' may be represented as follows.

$$(e\_parity^\wedge est)'=((1-(1-2*e\_sift)^\wedge L)/2)'=L*(1-2*e\_sift)^\wedge(L-1)$$

To maximize the estimation accuracy, (e_parity^est)' has to be maximal, so if a value of L that causes the second order derivative (e_parity^est)''=0 is found, then that value may be estimated as the value of the maximal group length L that can guarantee the estimation accuracy for a fixed e_parity^est.

$$(e\_parity^\wedge est)''=(L(1-2*e\_sift^\wedge est)^\wedge(L-1))''=(1-2*e\_sift^\wedge est)^\wedge(L-1)+L*(1-2e\_sift^\wedge est)^\wedge(L-1)*\ln(1-2*e\_sift^\wedge est)=(1-2*e\_sift^\wedge est)^\wedge(L-1)*[1+L*\ln(1-2*e\_sift^\wedge est)]=0$$

Since $(1-2e\_sift^\wedge est)^\wedge(L-1)\geq 0$, it can be seen that the following value of L satisfying $[1+L*\ln(1-2*e\_sift^\wedge est)]=0$ can guarantee the estimation accuracy of the QKD system on a given QBER e_sift^est $$L=\text{round}[-1/\ln(1-2*e\_sift^\wedge est)]$$

Based on the above equation, the maximal group length L that can guarantee the QBER estimation accuracy according to the error rate of the sifted key in the QKD system is shown in the following table.

TABLE 4

| QBER(e_sift^est) | L (bits) |
|---|---|
| 2% | 24 |
| 4% | 12 |
| 6% | 7 |
| 8% | 5 |
| 10% | 4 |
| 12% | 3 |

Figure 27:
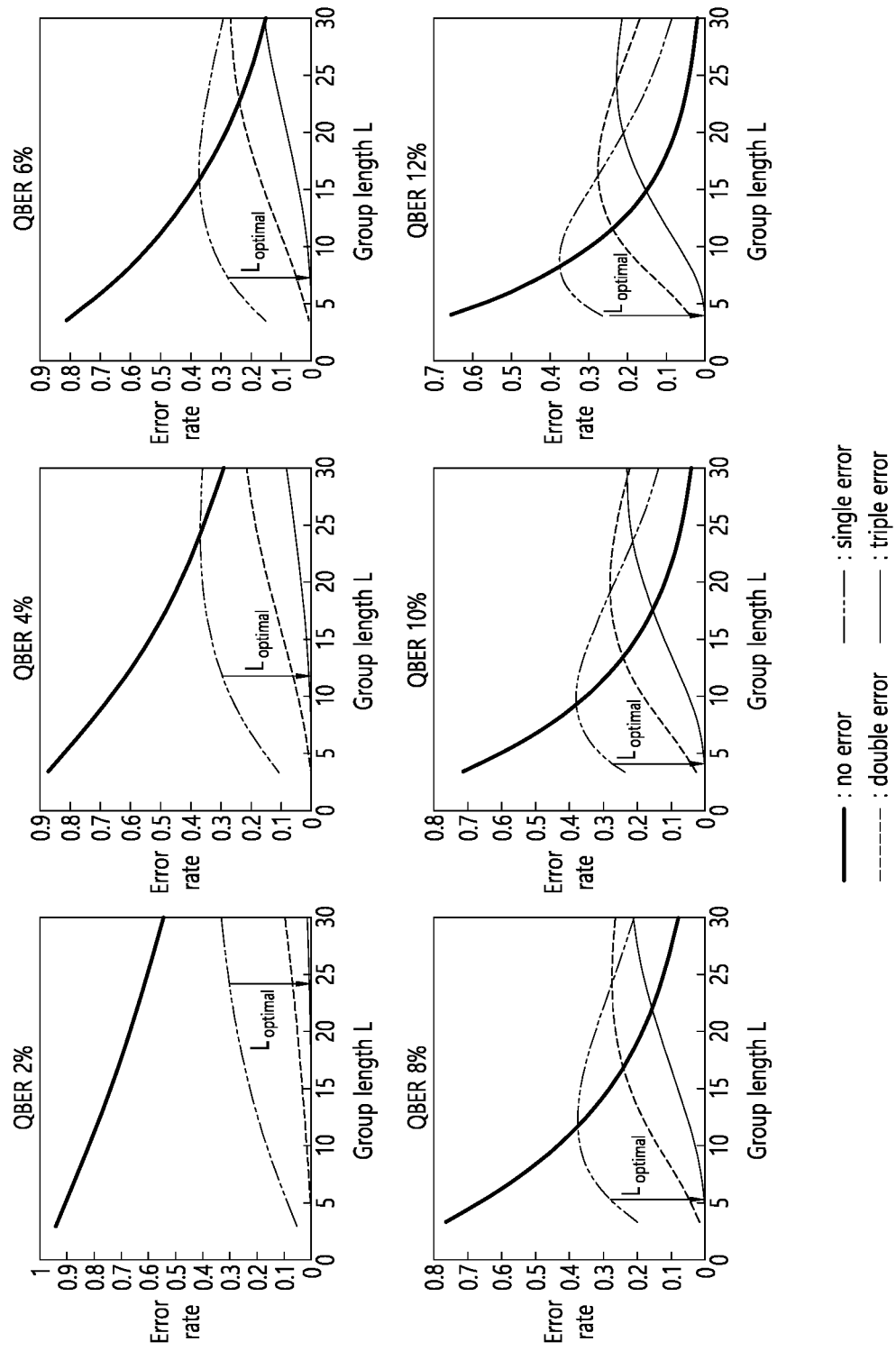
FIG. 27 schematically illustrates the error distribution in a group according to QBER in a QKD system and an example for a maximal group length L.

As can be seen from the above results, as the error rate contained in the sifted key increases, the length of the group that can guarantee accuracy becomes shorter and shorter, and the accuracy of QBER estimation can be guaranteed if the length of the group is less than or equal to the length of L in each QBER. To understand the validity of the results shown in Table 4, the distribution rate of errors in the group according to the error rate contained in the sifted key is shown in FIG. 27. FIG. 27 schematically illustrates the error distribution in a group according to QBER in a QKD system and an example for a maximal group length L.

Common to all results is that the likelihood of multiple errors within a group increases as the length of the group increases, and the likelihood of multiple errors decreases as the length decreases. Since the parity comparison method of deriving a sifted key error rate from the parity error rate makes it more likely that a parity group that is determined to have an odd number of errors during the parity comparison process at the transmitter and receiver actually has a single error, the more accurate the QBER estimate can be, the results in Table 4 indicate the maximal length for which the QBER estimation process can maximize the likelihood that the errors encountered during the parity comparison process at the transmitter and receiver are single errors.

In FIG. 27, the simulation results also show that triple errors begin to occur from the point where the length of L is determined, so it can be seen that the group length L estimated in the present disclosure represents the maximal group length that can guarantee that the parity error is a single error.

Figure 28:
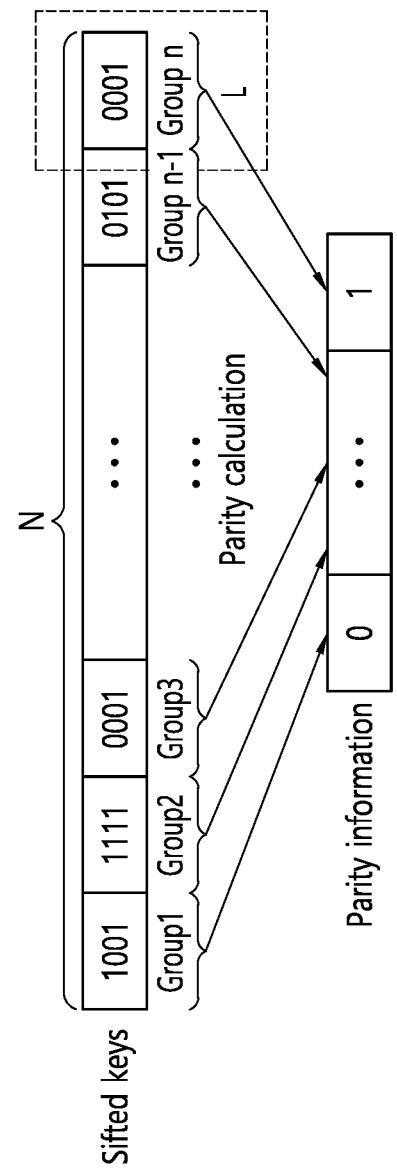
FIG. 28 schematically illustrates an example of a parity calculation process of a sifted key.

FIG. 28 schematically illustrates an example of a parity calculation process of a sifted key.

(3) Calculate the parity of N/L groups (length of sifted keys shared over the quantum channel: N) at the transmitter and receiver as shown in FIG. 28, and share the parity value over the public channel.

(4) Calculate the parity error rate e_parity^est at the transmitter and receiver.

(5) From e_parity^est, estimate the QBER e_sift^est using the following equation. If the receiver estimates the QBER from the current L and e_sift^est changes significantly compared to the previous QBER estimation result, the quantum key information shared between the transmitter and receiver is discarded due to the high probability of eavesdropping on the quantum key information, and the transmitter is requested to retransmit the quantum key information and start the process all over again. However, if the difference is not significant, the following process continues.

$$e\_sift^{\wedge}est=(1-(1-2*e\_parity^{\wedge}est)^{\wedge}(1/L))/2$$

(6) From the estimated e_sift^est, calculate the group length of the current QKD system.

$$L=\text{round}[-1/\ln(1-2*e\_sift^{\wedge}est)]$$

(7) In a quantum cryptographic system, the sifted keys shared over the quantum channel are periodically replaced to maximize security. Therefore, in the QBER estimation process of the new sifted key, the L estimated from the current sifted key is substituted for L in step (2) and the rest of the QBER estimation process is the same. This is because the most recently measured L value more accurately reflects the changed environmental conditions of the current QKD system compared to the initial L value.

2. Two-Dimensional Parity-Based QBER Estimation Method in QKD Systems

Compared with the random sampling method, the previously described transmitter-receiver parity comparison method has the advantage of not directly exposing the sifted key information and leaking less information. However, the accuracy of QBER estimation is high enough to replace random sampling only when the error rate contained in the sifted key is low.

Given that quantum cryptographic communication techniques may be used not only in wired channels, but also in satellite communications and wireless channels based on mobile devices, it is necessary to ensure the accuracy of the estimation even in situations where the QBER is higher due to changes in the quantum channel environment. Therefore, the present disclosure proposes a two-dimensional parity comparison method that can improve the limitation of the previously described parity-based QBER estimation technique, which is that the parity group containing an even number of errors is not detected at all, and the QBER estimation accuracy decreases rapidly as the QBER increases.

In one example, the device may receive sifted key information from another device over a quantum channel.

In one example, the sifted key information may comprise a plurality of bits, and the plurality of bits may be grouped into a plurality of first bit groups. In one example, the device may obtain second two-dimensional parity information from the sifted key information, and the device may perform an estimation of the QBER based on the first two-dimensional parity information and the second two-dimensional parity information. In one example, the plurality of first bit groups may be arranged in a two-dimensional form, and the device may obtain the second two-dimensional parity information based on parity information for rows of the two-dimensional form and parity information for columns of the two-dimensional form. Hereinafter, the present content will be described in more detail.

Figure 29:
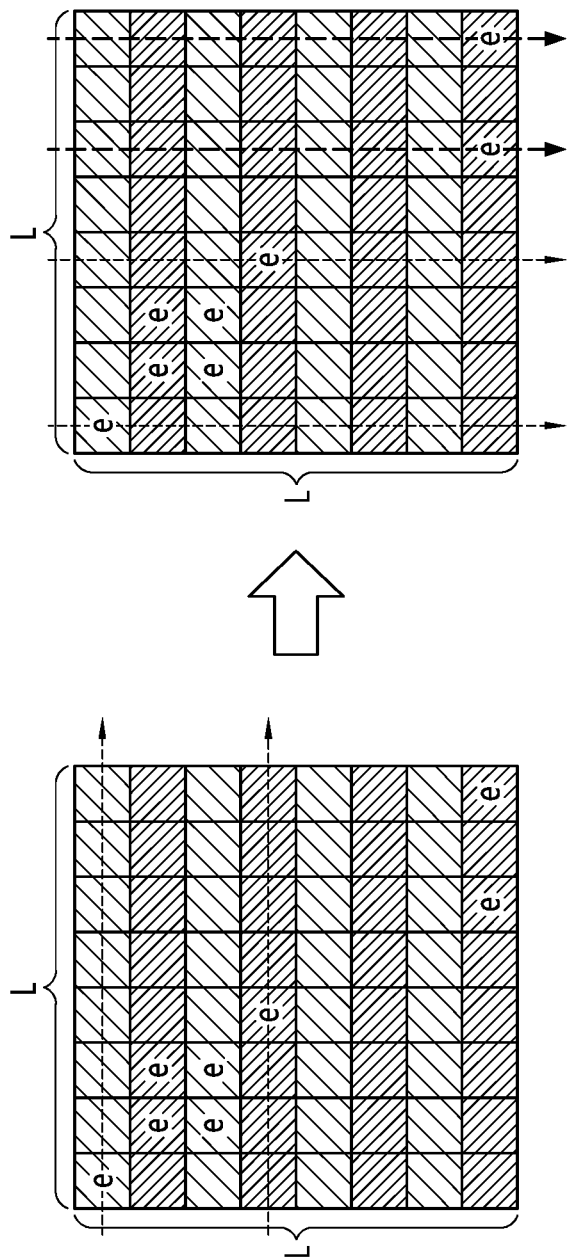
FIG. 29 schematically illustrates an example of the advantages of a two-dimensional parity comparison technique over a one-dimensional one.

FIG. 29 schematically illustrates an example of the advantages of a two-dimensional parity comparison technique over a one-dimensional one.

The advantages of the two-dimensional parity comparison error estimation technique may be explained with reference to FIG. 29. First of all, in the unidirectional one-dimensional parity error estimation method (left side of FIG. 29), it is not possible to identify errors in parity groups with an even number of errors, such as columns 2, 3, and 8 in the horizontal direction, and it is only possible to identify errors in columns 1 and 4 with an odd number of errors.

However, if it is extended to a two-dimensional parity comparison, not only the odd errors in rows 1 and 4 can be detected, but also some of the forms of errors that were not detected because they were even errors in the column direction can be detected, because they were recognized as odd errors. Based on this improved detectability of multi-error, the proposed method can have better QBER estimation accuracy.

The QBER estimation process in the present disclosure proceeds as follows.

Figure 30:
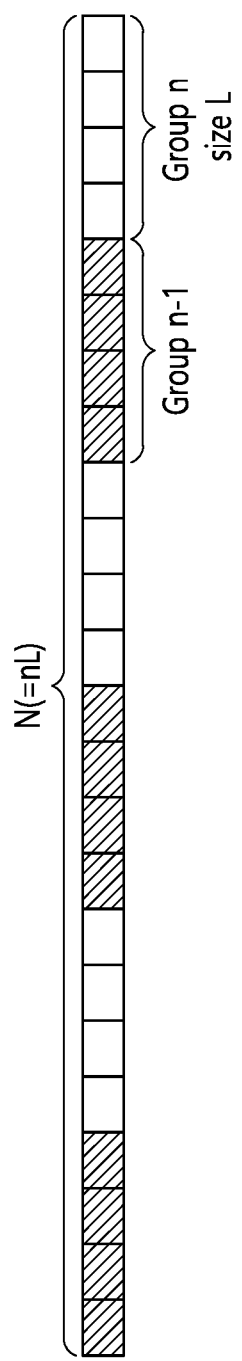
FIG. 30 schematically illustrates of the configuration of a sifted key(s) of N bits comprised into n groups of length L.

FIG. 30 schematically illustrates the configuration of a sifted key(s) of N bits comprised into n groups of length L.

(1) The length of the group size L as shown in FIG. 30 is obtained by a method such as the first technique.

Figure 31:
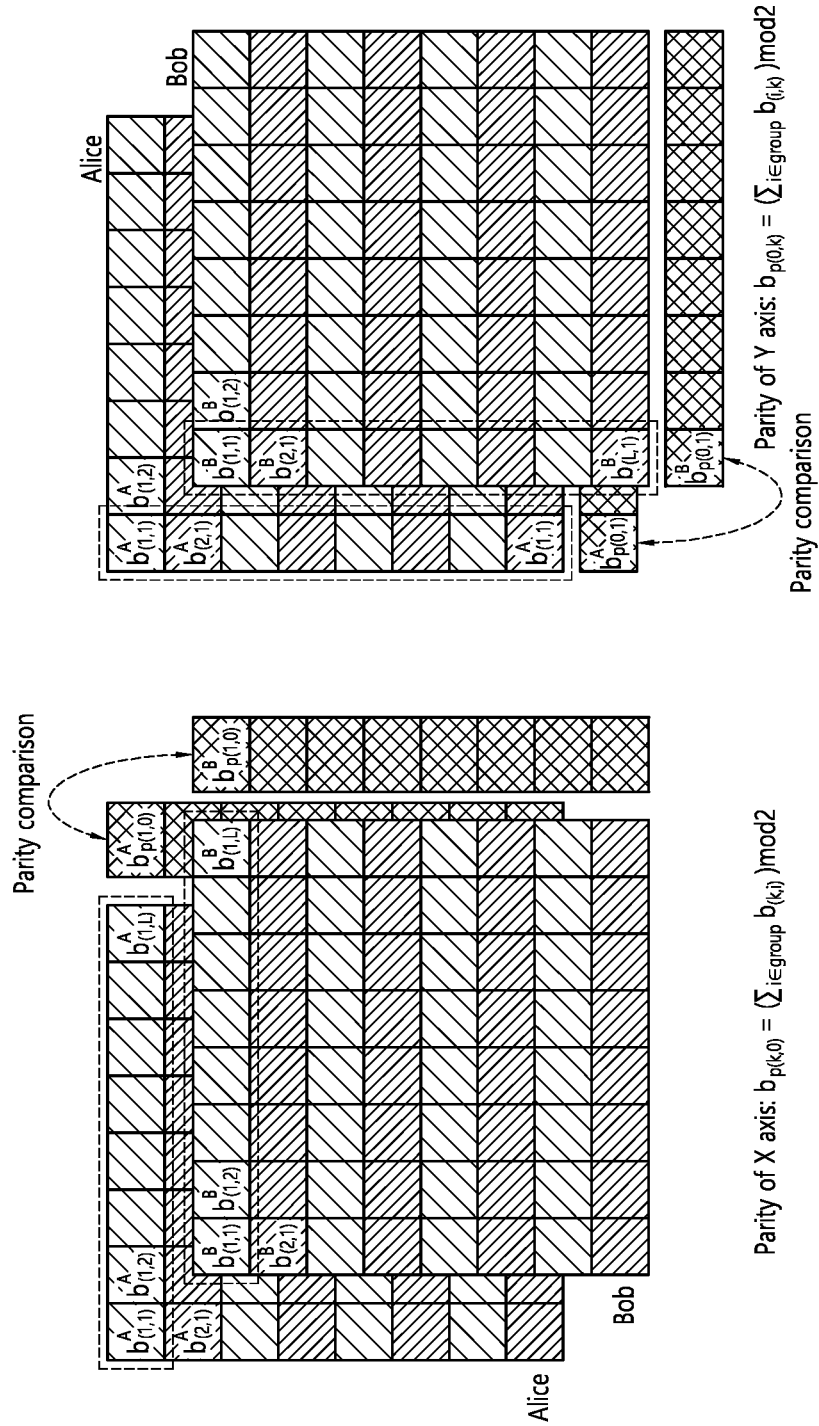
FIG. 31 schematically illustrates an example of a two-dimensional parity comparison method.

FIG. 31 schematically illustrates an example of a two-dimensional parity comparison method.

(2) As shown in the left side of FIG. 31, the sifted keys of the transmitter and receiver are divided into L pieces in the X-axis direction to compare the parity values, and then the parity values are shared through a public channel.

(3) Get the parity error rate e_parity^row by comparing the parity of each group b_(p(i,0))^A, b_(p(i,0))^B of the transmitter and receiver.

e_parity^row=(n_e^row)/(N/L), where n_e^row is the number of parities {b_(p(i,0))^B|b_(p(i,0))^B≠b_(p(i,0))^A, i∈{1, . . . , N/L}}.

(4) As shown in the right side of FIG. 31, the sifted keys of the transmitter and receiver are divided into L pieces in the Y-axis direction to compare the parity values, and then the parity values are shared through a public channel.

(5) Get the parity error rate e_parity^column by comparing the parity of each group of the transmitter and receiver.

e_parity^column=(n_e^column)/(N/L), where n_e^column is the number of parities {b_(p(0,i))^B|b_(p(0,i))^B≠b_(p(0,i))^A, i∈{1, . . . , N/L}}.

(6) From e_parity^est=(n_e^column+n_e^row)/(2N/L), get QBER e_sift^est=(1−(1−2*e_parityA^est)^(1/L))/2.

Embodiments of the present disclosure may have the following expected effects.

The present disclosure addresses two problems with parity-based QBER estimation techniques. First, a method for optimizing the size of the group that determines the performance of the parity-based method is presented to minimize the amount of leaked information while ensuring QBER estimation accuracy. Next, a two-dimensional parity comparison technique is applied to improve the accuracy of QBER estimation by addressing the problem that parity-based methods fail to identify the presence of errors when an even number of errors are included in the group.

1. Effectiveness of Maximal Group Size Optimization Technique for Parity Comparison As shown in the results in FIG. 27, the accuracy of the parity-based QBER estimation technique is determined by the length of the groups.

There is a trade-off between shorter lengths of groups used for parity comparisons, where the QBER estimation is accurate but the amount of leakage information increases because a lot of parity information is used, and longer lengths, where the amount of leakage information is smaller but the accuracy decreases because the probability of multiple errors in the group increases.

Therefore, in the present technique, a method to estimate and use the maximal group length that does not show a decrease in accuracy during the QBER estimation process according to the error rate contained in the sifted key is applied to improve the efficiency of the parity-based QBER estimation technique by blocking the use of excessively short group lengths to increase the amount of leakage information or the use of long groups with low accuracy to estimate the QBER.

2. Effectiveness of Two-Dimensional Parity-Based QBER Estimation Technique

The effectiveness of the two-dimensional parity comparison technique is verified by comparing it to the two previously described techniques, random sampling and parity comparison, and comparing the effects of matching the parity group size and the amount of leaked information.

A. Performance Comparison when Parity Group Lengths are the Same

Figure 32:
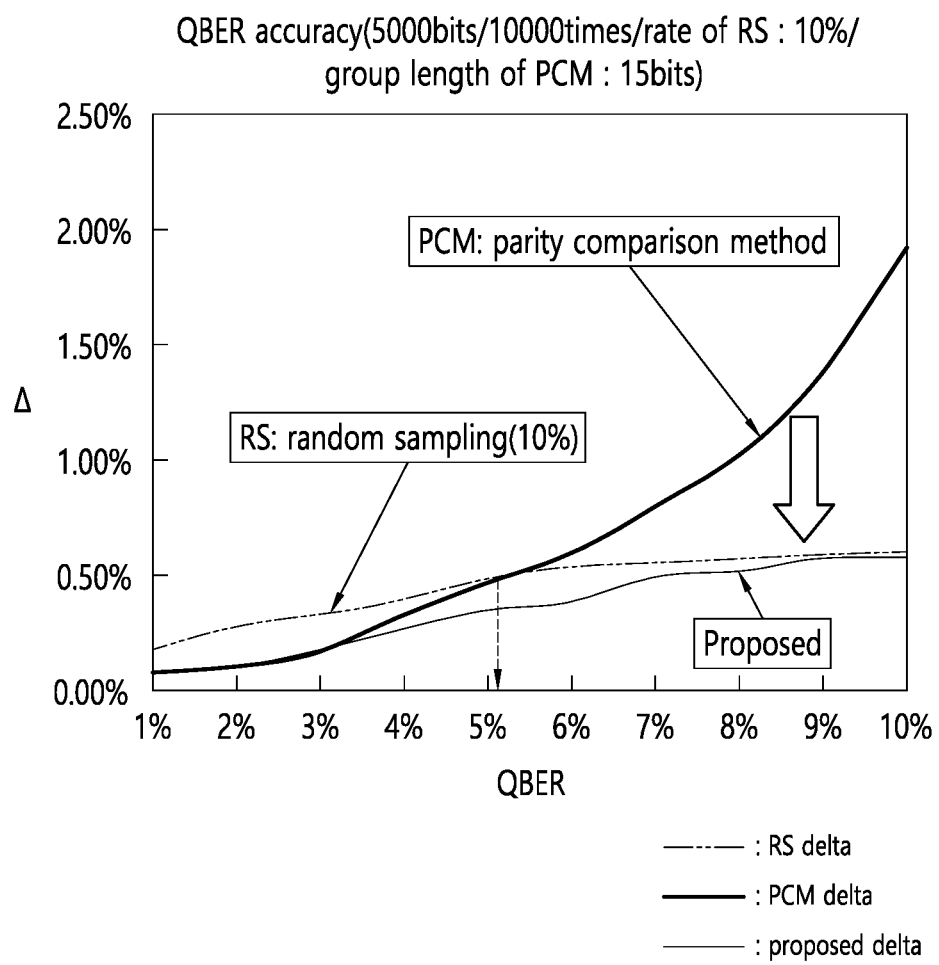
FIG. 32 schematically illustrates an example of an accuracy comparison between the two-dimensional technique and other QBER estimation techniques.

FIG. 32 schematically illustrates an example of an accuracy comparison between the two-dimensional technique and other QBER estimation techniques.

The length of the sifted key N: 5000 bits, random sampling rate: 10%, and group size of the parity comparison technique: 15 bit(s) were fixed and simulated to compare the results. FIG. 32 shows the measurement error $\Delta=|e\_sift\hat{}est-e\_sift|$ of the three techniques according to QBER. In the equation for the measurement error, e_sift refers to the percentage of actual errors that occur in all sifted keys, and e_sift^est refers to the estimated error rate for each technique.

Figure 33:
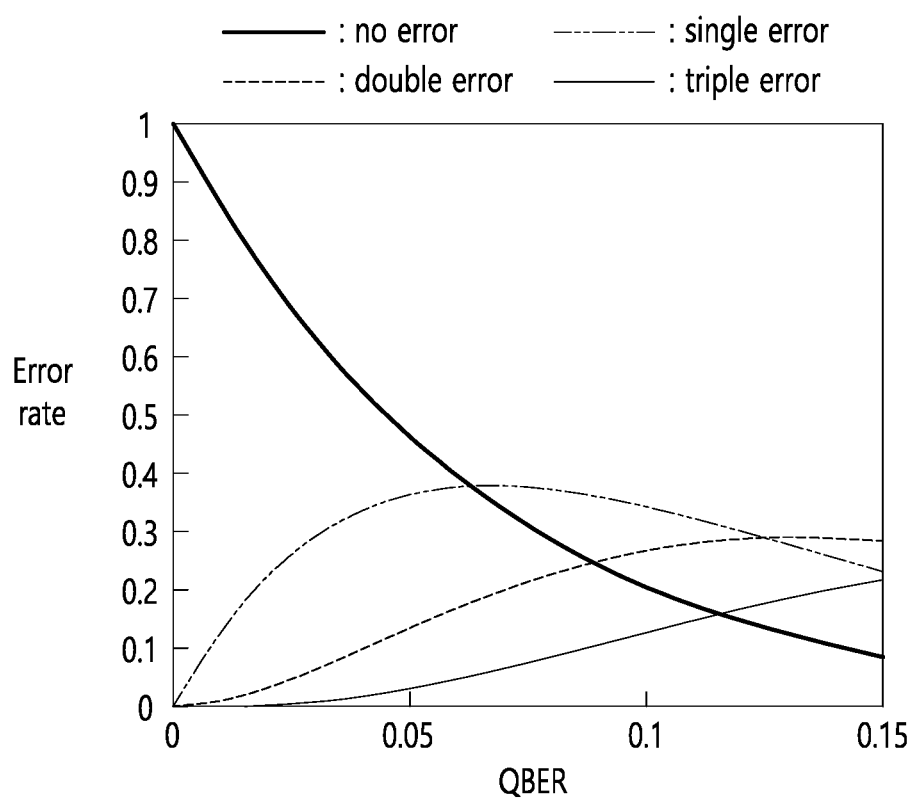
FIG. 33 schematically illustrates the probability of occurrence by number of errors in a group when L=15 for the parity-based QBER estimation technique.

FIG. 33 schematically illustrates the probability of occurrence by number of errors in a group when L=15 for the parity-based QBER estimation technique.

First, comparing the accuracy of the three techniques when the lengths of the groups used in the parity-based QBER estimation are the same, it can be seen that the random sampling (RS) technique performs the most accurately for large error rates above 10% of the QBER, as shown in FIG. 33, because the higher the error rate of the sifted keys, the greater the probability of multiple errors in the sifted key group, making the estimation of the QBER from parity increasingly inaccurate.

However, given that typical QKD systems have QBERs in the range of 3-7%, parity-based techniques have good QBER estimation accuracy in this range and are therefore suitable for application. The one-dimensional parity comparison technique becomes progressively less accurate as the QBER increases due to the increasing proportion of triple errors and the increasing proportion of groups that fail to detect the presence of double errors, as shown in FIG. 33, and becomes less accurate than RS from a QBER of 5%. However, since the technique with two-dimensional parity comparison can further estimate the groups containing an even number of multiple errors, the most accurate QBER estimation is possible even in the range of 10% error rate. In other words, the present disclosure shows that the technique that extends one-dimensional parity comparison to two dimensions can maintain high accuracy of QBER estimation compared to other techniques even at higher error rates.

On the other hand, in terms of the amount of information leaked, the RS technique leaks 10%, 500 bits of sifted key information and 500 bits of position information of each bit, totaling 1000 bits of information during the QBER estimation process, while the PCM technique leaks only 333 bits of parity information, making it the most efficient in terms of the amount of information leaked compared to the RS technique.

Finally, the present technique with two-dimensional parity comparison leaks 666 bits of information because it uses twice the parity information as leakage information due to the increased comparison dimension compared to PCM. However, since PCM leaks less information than RSM, the amount of information in the removed key can be reduced by the same ratio. This is advantageous for high key rate QKD systems.

B. Performance Comparison when the Amount of Leaked Information is the Same

Figure 34:
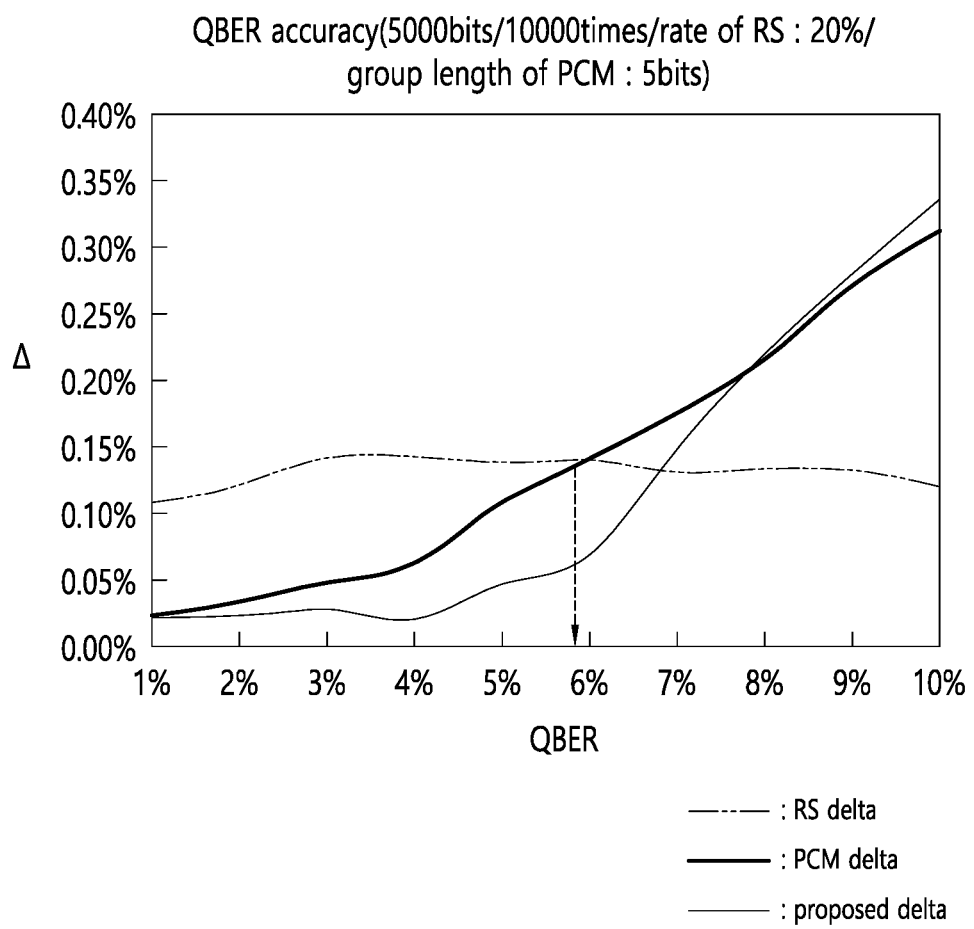
FIG. 34 schematically illustrates an example of a comparison of the QBER estimation accuracy of the two-dimensional technique and other techniques.

FIG. 34 schematically illustrates an example of a comparison of the QBER estimation accuracy of the two-dimensional technique and other techniques.

A comparison of the QBER estimation accuracy after matching the amount of leaked information for the three comparison techniques yields the results shown in FIG. 34. The length of the sifted key N: 5000 bits, random sampling rate: 20%, group size of the one-dimensional parity comparison technique: 5 bit(s), and group size of the two-dimensional parity comparison technique: 10 bit(s) were set and simulated to compare the results.

All three techniques are parameterized to have the same amount of leakage information of 1000 bits, and as can be seen from the results in FIG. 34, at low QBERs, the parity-based technique is more accurate in estimating the QBER, but as previously described, as the error rate with sifted key information increases, the accuracy of the parity-based error estimation technique decreases. Therefore, the PCM technique is less accurate than the RS technique above a QBER of 6%.

However, although the length of the groups used for parity comparison is twice as long in the present technique as in the PCM technique, it is possible to estimate groups containing multiple errors, which leads to the best accuracy even at an error rate of 7%, which is an improvement over PCM.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

So far, various examples of how to estimate QBER were described. Hereinafter, the QBER estimation method from the perspective of various subjects will be described.

Hereinafter, for a better understanding of the examples of the present disclosure, the disclosure will be described with reference to the drawings. The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 35:
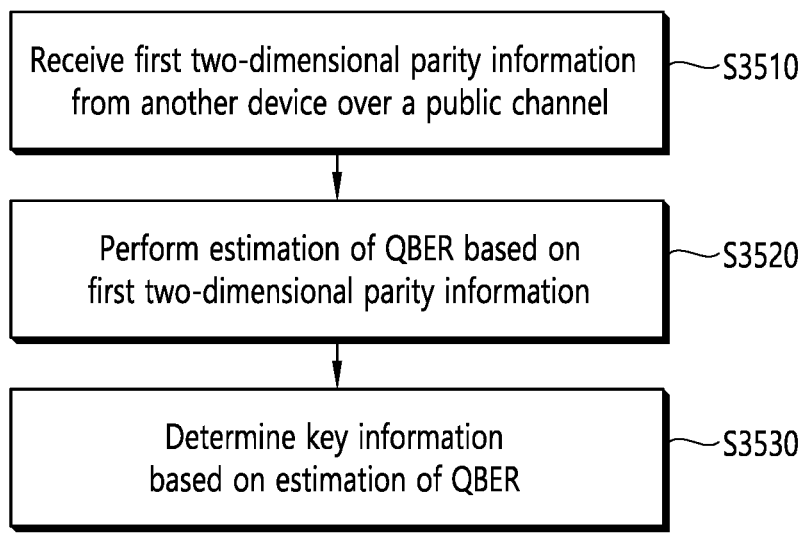
FIG. 35 is a flowchart of a method for estimating a QBER by a device, according to one embodiment of the present disclosure.

FIG. 35 is a flowchart of a method for estimating a QBER by a device, according to one embodiment of the present disclosure.

The device may receive first two-dimensional parity information from another device over a public channel (S3510). As more specific details thereof are described above and/or hereinafter, repetitive descriptions will be omitted for ease of explanation.

The device may perform an estimation of the QBER based on the first two-dimensional parity information (S3520). As more specific details thereof are described above and/or hereinafter, repetitive descriptions will be omitted for ease of explanation.

The device may determine key information based on the estimation of the QBER (S3530). As more specific details thereof are described above and/or hereinafter, repetitive descriptions will be omitted for ease of explanation.

Figure 36:
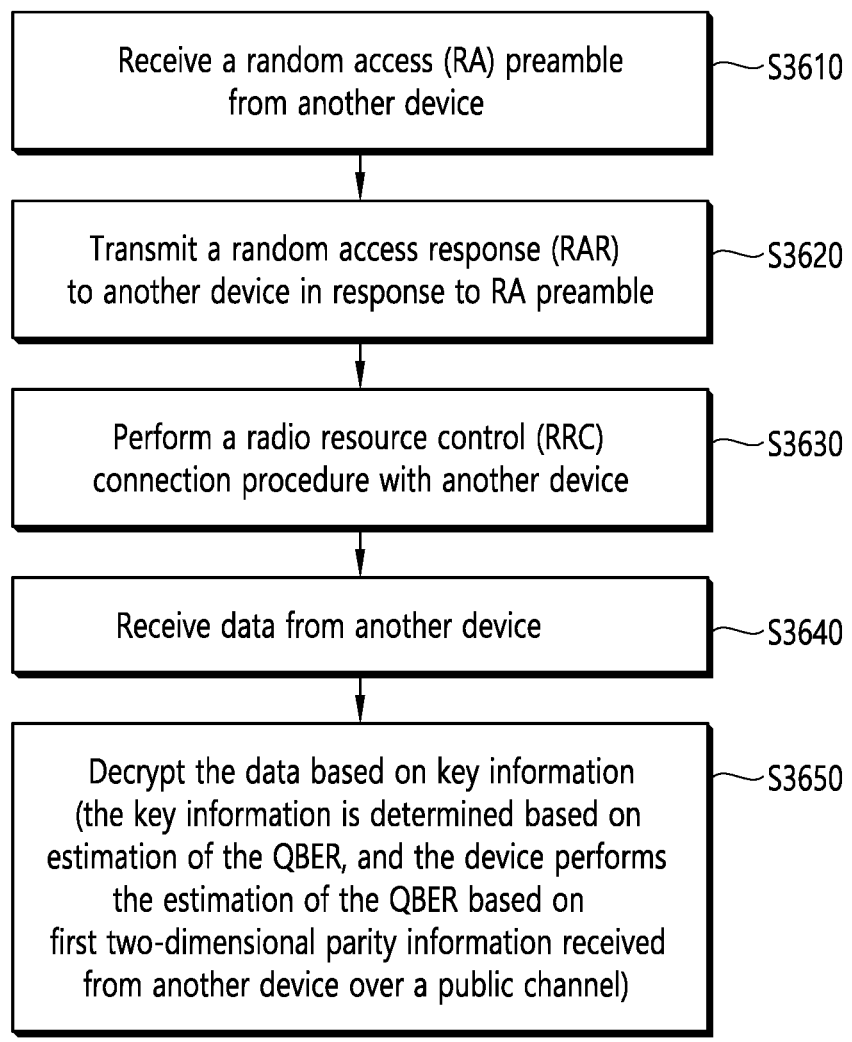
FIG. 36 is a flowchart of a method of estimating a QBER by a device, according to another embodiment of the present disclosure.

FIG. 36 is a flowchart of a method of estimating a QBER by a device, according to another embodiment of the present disclosure.

The device may receive a random access (RA) preamble from another device (S3610). As more specific details thereof are described above and/or hereinafter, repetitive descriptions will be omitted for ease of explanation.

The device may transmit a random access response (RAR) to another device in response to the RA preamble (S3620). As more specific details thereof are described above and/or hereinafter, repetitive descriptions will be omitted for ease of explanation.

The device may perform a radio resource control (RRC) connection procedure with another device (S3630). As more specific details thereof are described above and/or hereinafter, repetitive descriptions will be omitted for ease of explanation.

The device may receive data from another device (S3640). As more specific details thereof are described above and/or hereinafter, repetitive descriptions will be omitted for ease of explanation.

The device may decrypt the data based on the key information (S3650). As more specific details thereof are described above and/or hereinafter, repetitive descriptions will be omitted for ease of explanation.

Here, the key information may be determined based on estimation of the QBER, and the device may perform the estimation of the QBER based on the first two-dimensional parity information received from another device via a public channel. As more specific details thereof are described above and/or hereinafter, repetitive descriptions will be omitted for ease of explanation.

Figure 37:
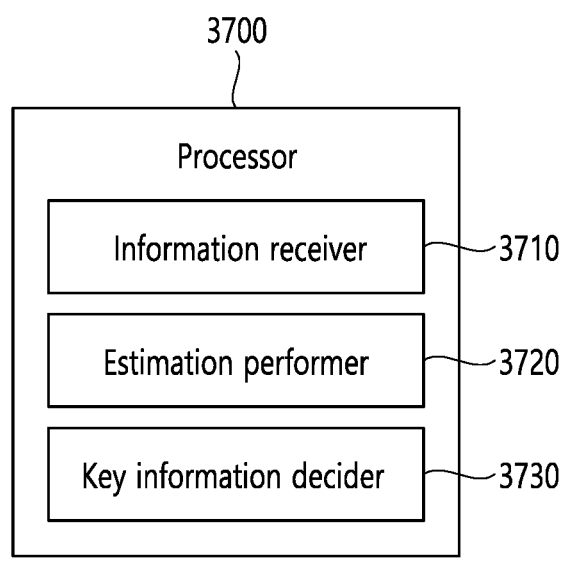
FIG. 37 is a block diagram of an example of an estimation device of a QBER, according to one embodiment of the present disclosure.

FIG. 37 is a block diagram of an example of an estimation device of a QBER, according to one embodiment of the present disclosure.

According to FIG. 37, a processor 3700 may include an information receiver 3710, an estimation performer 3720, and a key information decider 3730. Here, the processor 3700 may correspond to any of the previously described and/or later described processors.

The information receiver 3710 may be configured to control a receiver to receive first two-dimensional parity information from another device over a public channel. As more specific details thereof are described above and/or hereinafter, repetitive descriptions will be omitted for ease of explanation.

The estimation performer 3720 may be configured to perform estimation of the QBER based on the first two-dimensional parity information. As more specific details thereof are described above and/or hereinafter, repetitive descriptions will be omitted for ease of explanation.

The key information decider 3730 may be configured to decide the key information based on the estimation of the QBER. As more specific details thereof are described above and/or hereinafter, repetitive descriptions will be omitted for ease of explanation.

Figure 38:
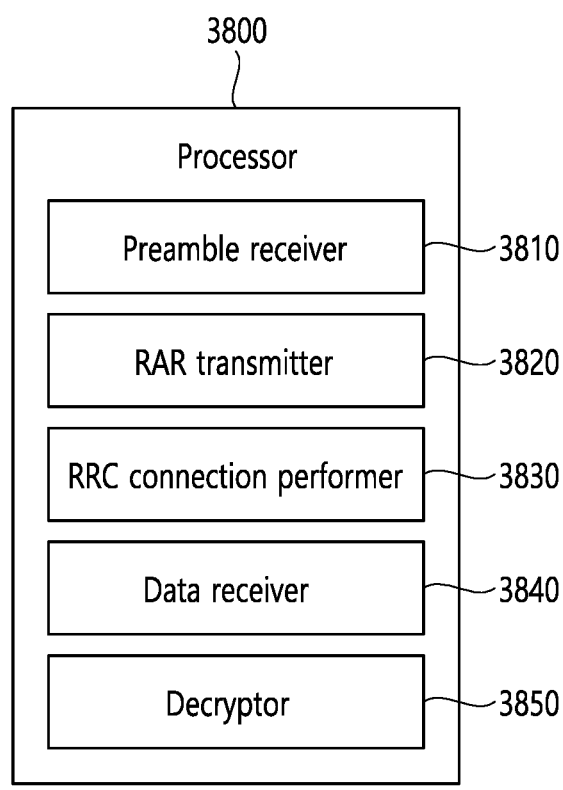
FIG. 38 is a block diagram of an example of an estimation device of a QBER, according to another embodiment of the present disclosure.

FIG. 38 is a block diagram of an example of an estimation device of a QBER, according to another embodiment of the present disclosure.

According to FIG. 38, a processor 3800 may include a preamble receiver 3810, a RAR transmitter 3820, an RRC connection performer 3830, a data receiver 3840, and a decryptor 3850. Here, processor 3800 may correspond to any of the processors previously described and/or to be described later.

The preamble receiver 3810 may be configured to control a receiver to receive a random access (RA) preamble from another device. As more specific details thereof are described above and/or hereinafter, repetitive descriptions will be omitted for ease of explanation.

The RAR transmitter 3820 may be configured to control a transmitter to transmit a random access response (RAR) to another device in response to the RA preamble. As more specific details thereof are described above and/or hereinafter, repetitive descriptions will be omitted for ease of explanation.

The RRC connection performer 3830 may be configured to perform a radio resource control (RRC) connection procedure with another device. As more specific details thereof are described above and/or hereinafter, repetitive descriptions will be omitted for ease of explanation.

The data receiver 3840 may be configured to control a receiver to receive data from another device. As more specific details thereof are described above and/or hereinafter, repetitive descriptions will be omitted for ease of explanation.

The decryptor 3850 may be configured to decrypt the data based on the key information. As more specific details thereof are described above and/or hereinafter, repetitive descriptions will be omitted for ease of explanation.

Here, the key information may be determined based on estimation of the QBER, and the device may perform the estimation of the QBER based on the first two-dimensional parity information received from another device via a public channel. As more specific details thereof are described above and/or hereinafter, repetitive descriptions will be omitted for ease of explanation.

Although not shown, according to one embodiment of the present disclosure, a device may include at least one memory and at least one processor operatively coupled to the at least one memory, and the processor may be configured to control a transceiver to receive a random access (RA) preamble from another device, and to control the transceiver to transmit a random access response (RAR) to another device in response to the RA preamble, to perform a radio resource control (RRC) connection procedure with another device, to control the transceiver to receive data from another device, and to decrypt the data based on the key information, wherein the key information is determined based on estimation of a quantum bit error rate (QBER), and the device is characterized in that it performs the estimation of the QBER based on the first two-dimensional parity information received from another device over a public channel.

According to one embodiment of the present disclosure, at least one computer readable medium comprising instructions based on execution by at least one processor, may be configured to control a transceiver to receive a random access (RA) preamble from another device, and to control the transceiver to transmit a random access response (RAR) to another device in response to the RA preamble, to perform a radio resource control (RRC) connection procedure with another device, to control the transceiver to receive data from another device, and to decrypt the data based on the key information, wherein the key information is determined based on estimation of a quantum bit error rate (QBER), and the device is characterized in that it performs the estimation of the QBER based on the first two-dimensional parity information received from another device over a public channel.

Figure 39:
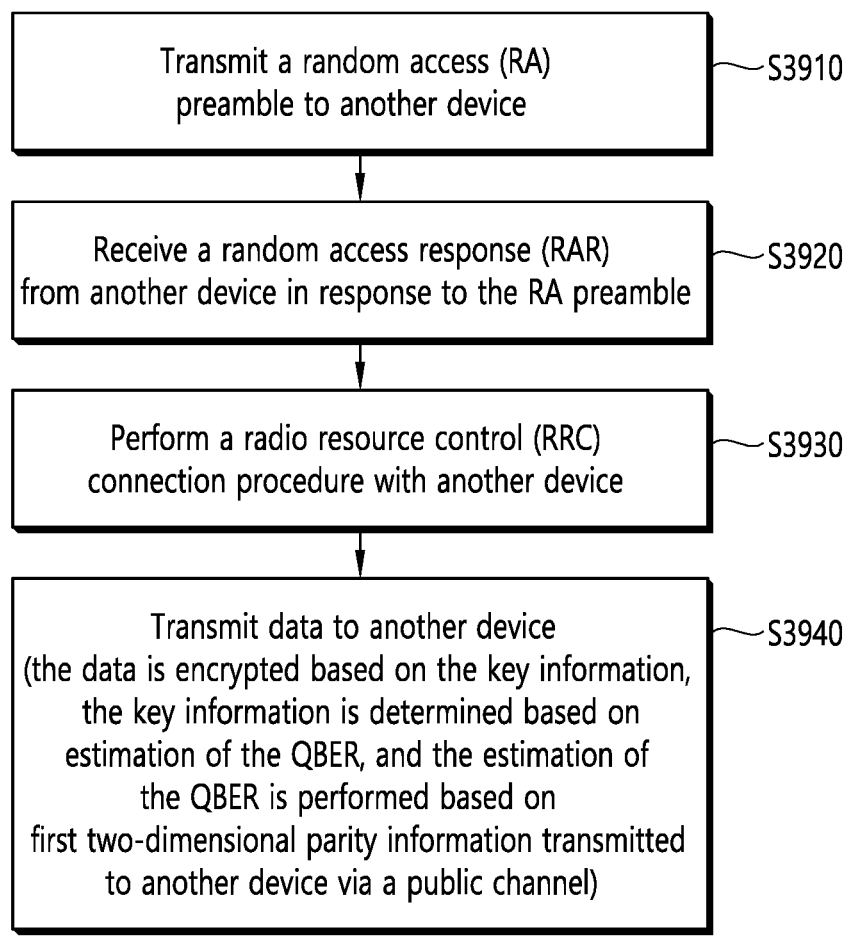
FIG. 39 is a flowchart of a method for transmitting two-dimensional parity information, according to one embodiment of the present disclosure.

FIG. 39 is a flowchart of a method for transmitting two-dimensional parity information, according to one embodiment of the present disclosure.

A device may transmit a random access (RA) preamble to another device (S3910). As more specific details thereof are described above and/or hereinafter, repetitive descriptions will be omitted for ease of explanation.

The device may receive a random access response (RAR) from another device in response to the RA preamble (S3920). As more specific details thereof are described above and/or hereinafter, repetitive descriptions will be omitted for ease of explanation.

The device may perform a radio resource control (RRC) connection procedure with another device (S3930). As more specific details thereof are described above and/or hereinafter, repetitive descriptions will be omitted for ease of explanation.

The device may transmit data to another device (S3940). As more specific details thereof are described above and/or hereinafter, repetitive descriptions will be omitted for ease of explanation.

Here, the device may encrypt the data based on the key information. As more specific details thereof are described above and/or hereinafter, repetitive descriptions will be omitted for ease of explanation.

Here, the key information may be determined based on estimation of the QBER, and the estimation of the QBER may be performed based on the first two-dimensional parity information transmitted to another device via a public channel. As more specific details thereof are described above and/or hereinafter, repetitive descriptions will be omitted for ease of explanation.

Figure 40:
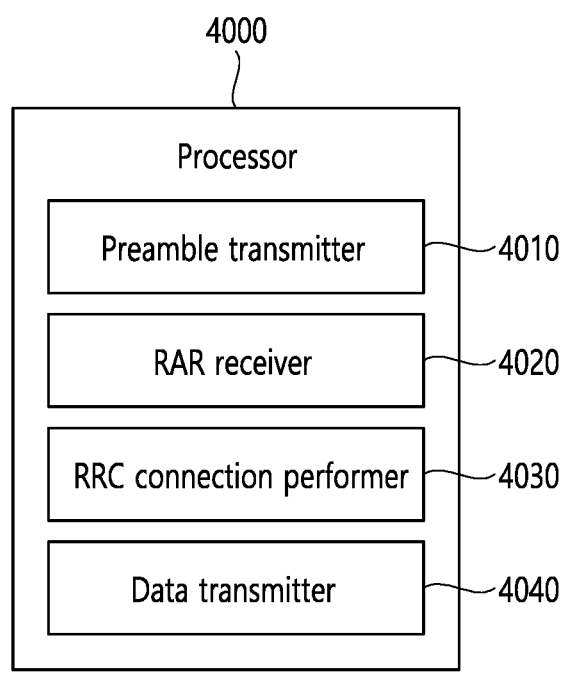
FIG. 40 is a block diagram of an example of a device for transmitting two-dimensional parity information, according to one embodiment of the present disclosure.

FIG. 40 is a block diagram of an example of a device for transmitting two-dimensional parity information, according to one embodiment of the present disclosure.

A processor 4000 may include a preamble transmitter 4010, a RAR receiver 4020, an RRC connection performer 4030, and a data transmitter 4040.

The preamble transmitter 4010 may be configured to control a transmitter to transmit a random access (RA) preamble to another device. As more specific details thereof are described above and/or hereinafter, repetitive descriptions will be omitted for ease of explanation.

The RAR receiver 4020 may be configured to control a receiver to receive a random access response (RAR) from another device in response to the RA preamble. As more specific details thereof are described above and/or hereinafter, repetitive descriptions will be omitted for ease of explanation.

The RRC connection performer 4030 may be configured to perform a radio resource control (RRC) connection procedure with another device. As more specific details thereof are described above and/or hereinafter, repetitive descriptions will be omitted for ease of explanation.

The data transmitter 4040 may be configured to control a transmitter to transmit data to another device. As more specific details thereof are described above and/or hereinafter, repetitive descriptions will be omitted for ease of explanation.

Here, the device may encrypt the data based on the key information. As more specific details thereof are described above and/or hereinafter, repetitive descriptions will be omitted for ease of explanation.

Here, the key information may be determined based on estimation of the QBER, and the estimation of the QBER may be performed based on the first two-dimensional parity information transmitted to another device via a public channel. As more specific details thereof are described above and/or hereinafter, repetitive descriptions will be omitted for ease of explanation.

Figure 41:
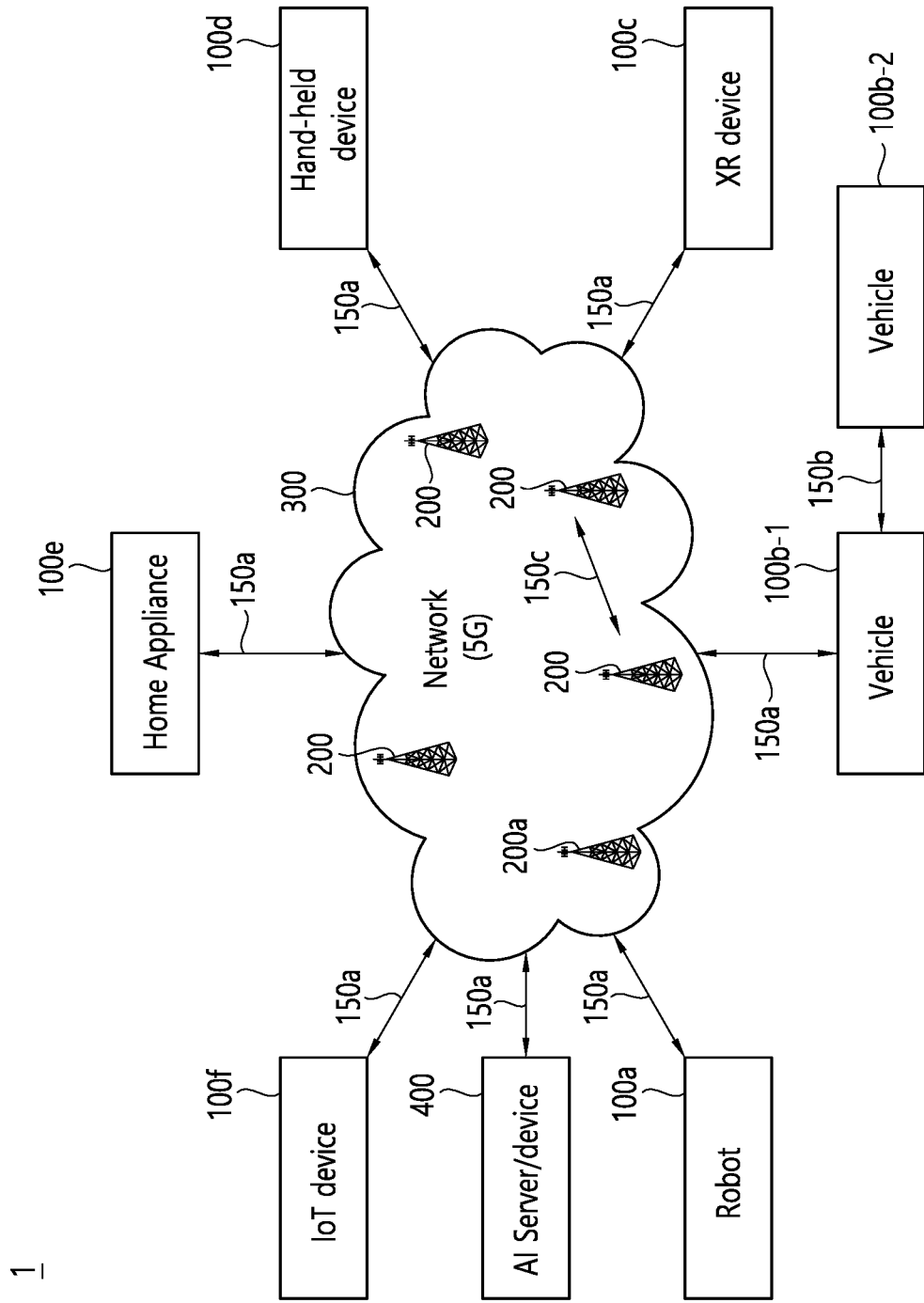
FIG. 41 illustrates a communication system 1 applied to the present disclosure.

FIG. 41 illustrates a communication system 1 applied to the present disclosure.

Referring to FIG. 41, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1, 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smart-glasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, the radio communication technologies implemented in the wireless devices in the present disclosure may include NarrowBand IoT (NB-IoT) technology for low-power communication as well as LTE, NR and 6G. For example, NB-IoT technology may be an example of Low Power Wide Area Network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced MTC (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate Personal Area Networks (PANs) associated with small/low-power digital communication based on various specifications such as IEEE 802.15.4 and may be called various names.

The wireless devices 100a~100f may be connected to the network 300 via the BSs 200. An AI technology may be applied to the wireless devices 100a~100f and the wireless devices 100a~100f may be connected to the AI server 400 via the network 300. The network 300 may be configured using a 3G network, a 4G (e.g., LTE) network, or a 5G (e.g., NR) network. Although the wireless devices 100a~100f may communicate with each other through the BSs 200/network 300, the wireless devices 100a~100f may perform direct communication (e.g., sidelink communication) with each other without passing through the BSs/network. For example, the vehicles 100b-1, 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a~100f.

Wireless communication/connections 150a, 150b, 150c may be established between the wireless devices 100a~100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a, 150b. For example, the wireless communication/connections 150a, 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Meanwhile, NR supports a number of numerologies (or subcarrier spacing (SCS)) to support various 5G services. For example, when the SCS is 15 kHz, it supports a wide area in traditional cellular bands, when SCS is 30 kHz/60 kHz, it supports dense-urban, lower latency and wider carrier bandwidth, for SCS of 60 kHz or higher, bandwidths greater than 24.25 GHz are supported to overcome phase noise.

The NR frequency band may be defined as a frequency range of two types (FR1 and FR2). The number of frequency ranges may be changed, and for example, the frequency ranges of the two types (FR1 and FR2) may be shown in Table 5 below. For convenience of explanation, among the frequency ranges used in the NR system, FR1 may mean "sub 6 GHz range" and FR2 may mean "above 6 GHz range" and may be called millimeter wave (mmW).

TABLE 5

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As described above, the number of frequency ranges of the NR system can be changed. For example, FR1 may include a band of 410 MHz to 7125 MHz as shown in Table 6 below. That is, FR1 may include a frequency band of 6 GHz (or 5850, 5900, 5925 MHz, etc.) or higher. For example, a frequency band of 6 GHz (or 5850, 5900, 5925 MHz, etc.) or higher included in FR1 may include an unlicensed band. The unlicensed band may be used for various purposes, and may be used, for example, for vehicle communication (e.g., autonomous driving).

TABLE 6

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 42:
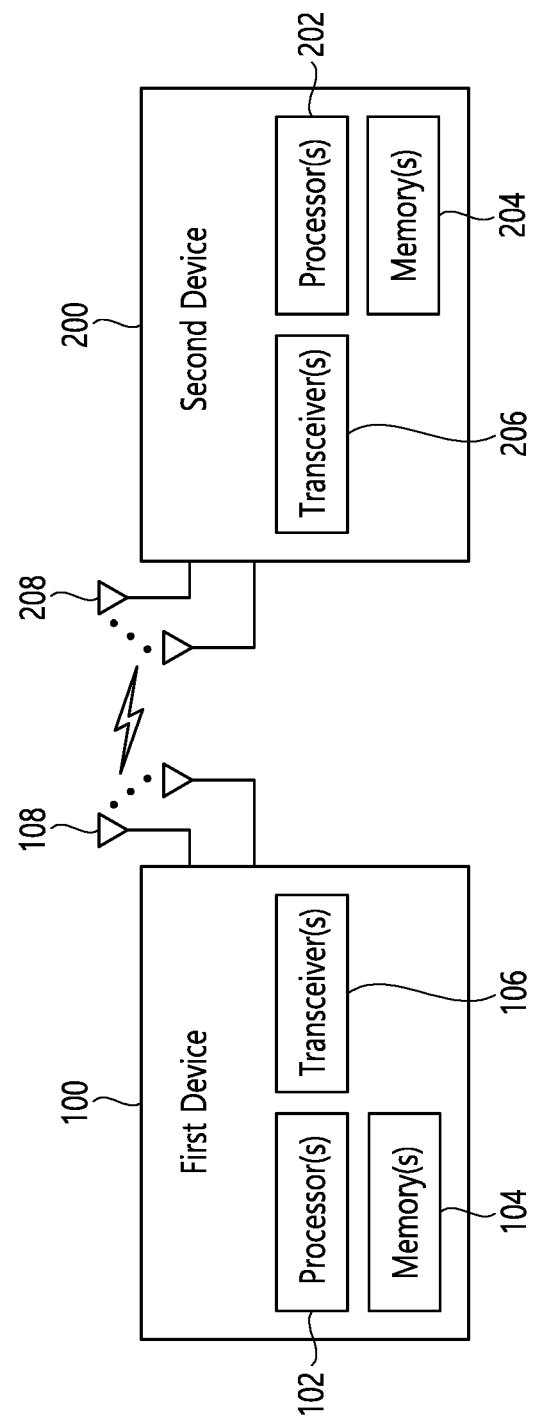
FIG. 42 illustrates an example of a wireless device that may be applicable to the present disclosure.

Hereinafter, an example of a wireless device to which the present specification is applied will be described. FIG. 42 illustrates an example of a wireless device that may be applicable to the present disclosure.

Referring to FIG. 42, a first wireless device 100 and a second wireless device 200 may transmit radio signals through a variety of RATs (e.g., LTE and NR). Herein, {the first wireless device 100 and the second wireless device 200} may correspond to {the wireless device 100x, the BS 200} and/or {the wireless device 100x, the wireless device 100x} of FIG. 41.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100, 200 will be described more specifically. One or more protocol layers may be implemented by, without being limited to, one or more processors 102, 202. For example, the one or more processors 102, 202 may implement one or more layers (e.g., functional layers such as PHY, MAC, RLC, PDCP, RRC, and SDAP). The one or more processors 102, 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102, 202 may generate messages, control information, data, or information according to the descriptions, functions, procedures, proposals, methods, and/or operational flowcharts disclosed in this document. The one or more processors 102, 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106, 206. The one or more processors 102, 202 may receive the signals (e.g., baseband signals) from the one or more transceivers 106, 206 and obtain the PDUs, SDUs, messages, control information, data, or information according to the descriptions, functions, procedures, proposals, methods, and/or operational flowcharts disclosed in this document.

The one or more processors 102, 202 may be referred to as controllers, microcontrollers, microprocessors, or microcomputers. The one or more processors 102, 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102, 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102, 202 or stored in the one or more memories 104, 204 so as to be driven by the one or more processors 102, 202. The descriptions, functions, procedures, proposals, methods, and/or operational flowcharts disclosed in this document may be implemented using firmware or software in the form of code, commands, and/or a set of commands.

The one or more memories 104, 204 may be connected to the one or more processors 102, 202 and store various types of data, signals, messages, information, programs, code, instructions, and/or commands. The one or more memories 104, 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104, 204 may be located at the interior and/or exterior of the one or more processors 102, 202. The one or more memories 104, 204 may be connected to the one or more processors 102, 202 through various technologies such as wired or wireless connection.

The one or more transceivers 106, 206 may transmit user data, control information, and/or radio signals/channels, mentioned in the methods and/or operational flowcharts of this document, to one or more other devices. The one or more transceivers 106, 206 may receive user data, control information, and/or radio signals/channels, mentioned in the descriptions, functions, procedures, proposals, methods, and/or operational flowcharts disclosed in this document, from one or more other devices. For example, the one or more transceivers 106, 206 may be connected to the one or more processors 102, 202 and transmit and receive radio signals. For example, the one or more processors 102, 202 may perform control so that the one or more transceivers 106, 206 may transmit user data, control information, or radio signals to one or more other devices. The one or more processors 102, 202 may perform control so that the one or more transceivers 106, 206 may receive user data, control information, or radio signals from one or more other devices. The one or more transceivers 106, 206 may be connected to the one or more antennas 108, 208 and the one or more transceivers 106, 206 may be configured to transmit and receive user data, control information, and/or radio signals/channels, mentioned in the descriptions, functions, procedures, proposals, methods, and/or operational flowcharts disclosed in this document, through the one or more antennas 108, 208. In this document, the one or more antennas may be a plurality of physical antennas or a plurality of logical antennas (e.g., antenna ports). The one or more transceivers 106, 206 may convert received radio signals/channels, and so on, from RF band signals into baseband signals in order to process received user data, control information, radio signals/channels, and so on, using the one or more processors 102, 202. The one or more transceivers 106, 206 may convert the user data, control information, radio signals/channels, and so on, processed using the one or more processors 102, 202 from the base band signals into the RF band signals. To this end, the one or more transceivers 106, 206 may include (analog) oscillators and/or filters.

Figure 43:
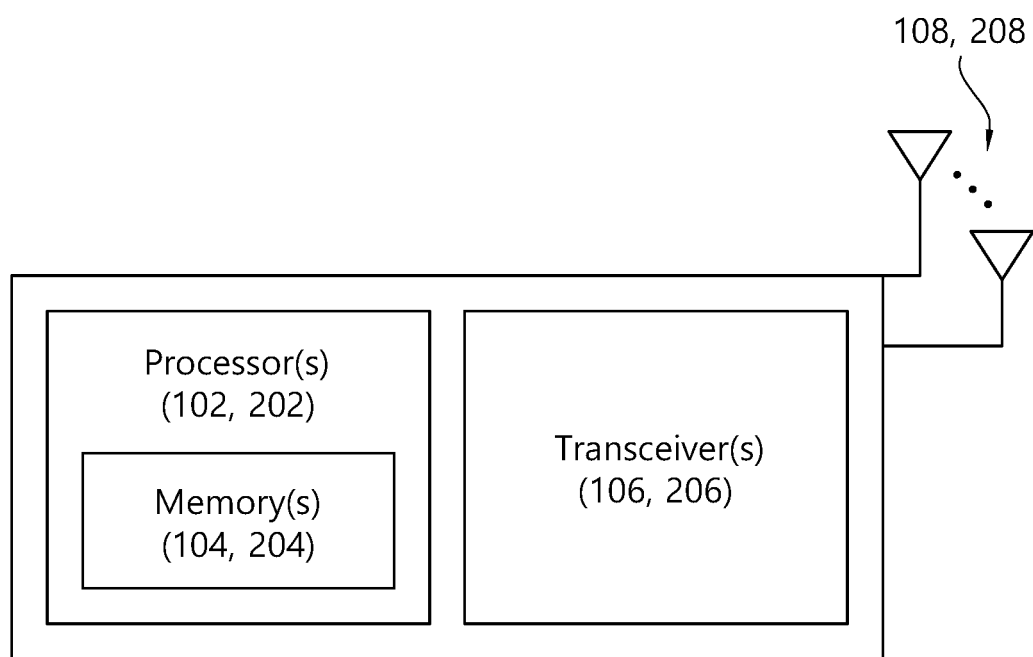
FIG. 43 illustrates another example of a wireless device that may be applicable to the present disclosure.

FIG. 43 illustrates another example of a wireless device that may be applicable to the present disclosure.

According to FIG. 43, a wireless device may include at least one processor 102, 202, at least one memory 104, 204, at least one transceiver 106, 206, and one or more antennas 108, 208.

As a difference between the example of the wireless device described above in FIG. 42 and the example of the wireless device in FIG. 43, in FIG. 42, the processors 102 and 202 and the memories 104 and 204 are separated, but in the example of FIG. 43, the memory 104, 204 is included in the processor 102, 202.

Here, the detailed description of the processors 102 and 202, the memories 104 and 204, the transceivers 106 and 206, and one or more antennas 108 and 208 is as described above, in order to avoid unnecessary repetition of description, description of repeated description is omitted.

Hereinafter, an example of a signal processing circuit to which the present specification is applied will be described.

Figure 44:
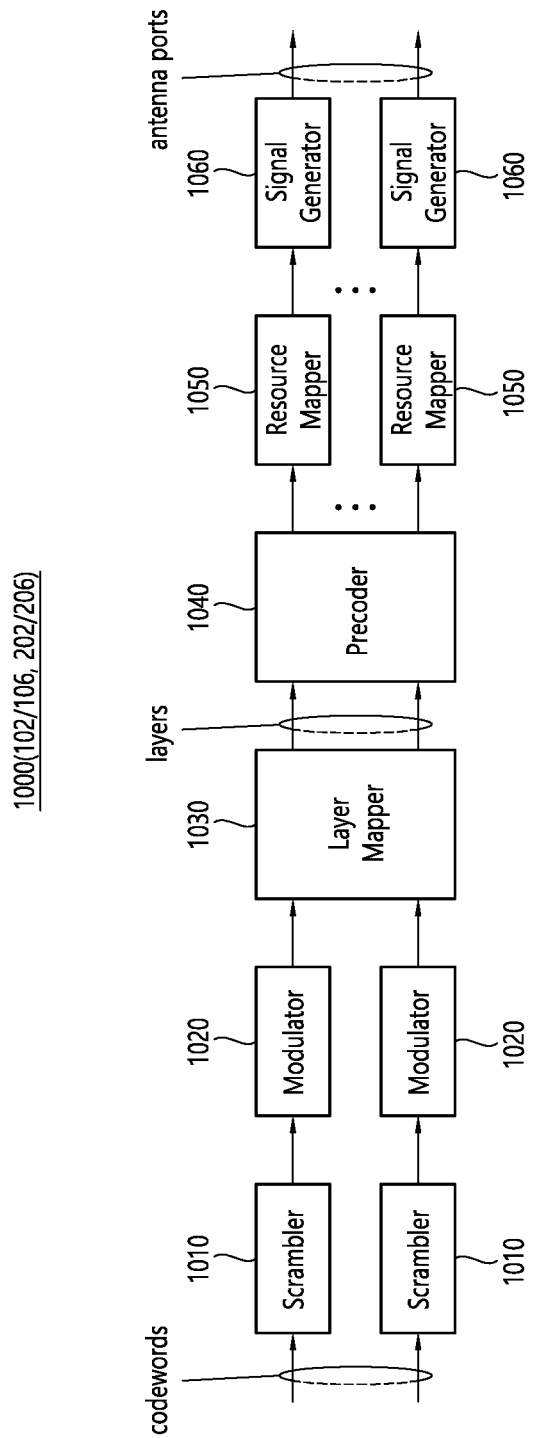
FIG. 44 illustrates an example of a signal processing circuit for a transmission signal.

FIG. 44 illustrates an example of a signal processing circuit for a transmission signal.

Referring to FIG. 44, a signal processing circuit 1000 may include scramblers 1010, modulators 1020, a layer mapper 1030, a precoder 1040, resource mappers 1050, and signal generators 1060. An operation/function of FIG. 44 may be performed, without being limited to, the processors 102, 202 and/or the transceivers 106, 206 of FIG. 42.

Hardware elements of FIG. 44 may be implemented by the processors 102, 202 and/or the transceivers 106, 206 of FIG. 42. For example, blocks 1010~1060 may be implemented by the processors 102, 202 of FIG. 42. Alternatively, the blocks 1010~1050 may be implemented by the processors 102, 202 of FIG. 42 and the block 1060 may be implemented by the transceivers 106, 206 of FIG. 42.

Codewords may be converted into radio signals via the signal processing circuit 1000 of FIG. 44. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010~1060 of FIG. 44. For example, the wireless devices (e.g., 100, 200 of FIG. 42) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Hereinafter, an example of using a wireless device to which the present disclosure is applied will be described.

Figure 45:
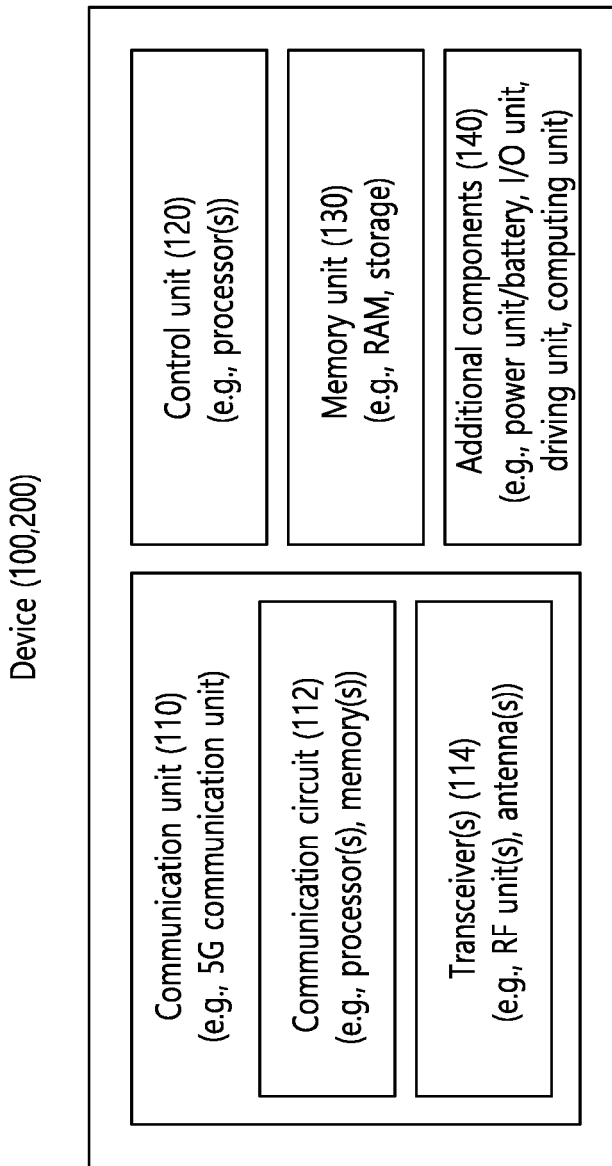
FIG. 45 illustrates another example of a wireless device applied to the present disclosure.

FIG. 45 illustrates another example of a wireless device applied to the present disclosure. The wireless device may be implemented in various forms according to a use-case/service (refer to FIG. 41).

Referring to FIG. 45, wireless devices 100, 200 may correspond to the wireless devices 100, 200 of FIG. 42 and may be configured by various elements, components, units/portions, and/or modules. For example, each of the wireless devices 100, 200 may include a communication unit 110, a control unit 120, a memory unit 130, and additional components 140. The communication unit may include a communication circuit 112 and transceiver(s) 114. For example, the communication circuit 112 may include the one or more processors 102, 202 and/or the one or more memories 104, 204 of FIG. 42. For example, the transceiver(s) 114 may include the one or more transceivers 106, 206 and/or the one or more antennas 108, 208 of FIG. 42. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 41), the vehicles (100b-1, 100b-2 of FIG. 41), the XR device (100c of FIG. 41), the hand-held device (100d of FIG. 41), the home appliance (100e of FIG. 41), the IoT device (100f of FIG. 41), a digital broadcast terminal, a hologram device, a public safety device, an MTC device, a medicine device, a fintech device (or a finance device), a security device, a climate/environment device, the AI server/device (400 of FIG. 41), the BSs (200 of FIG. 41), a network node, and so on. The wireless device may be used in a mobile or fixed place according to a use-example/service.

In FIG. 45, the entirety of the various elements, components, units/portions, and/or modules in the wireless devices 100, 200 may be connected to each other through a wired interface or at least a part thereof may be wirelessly connected through the communication unit 110. For example, in each of the wireless devices 100, 200, the control unit 120 and the communication unit 110 may be connected by wire and the control unit 120 and first units (e.g., 130, 140) may be wirelessly connected through the communication unit 110. Each element, component, unit/portion, and/or module within the wireless devices 100, 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 45 will be described in detail with reference to the drawings.

Figure 46:
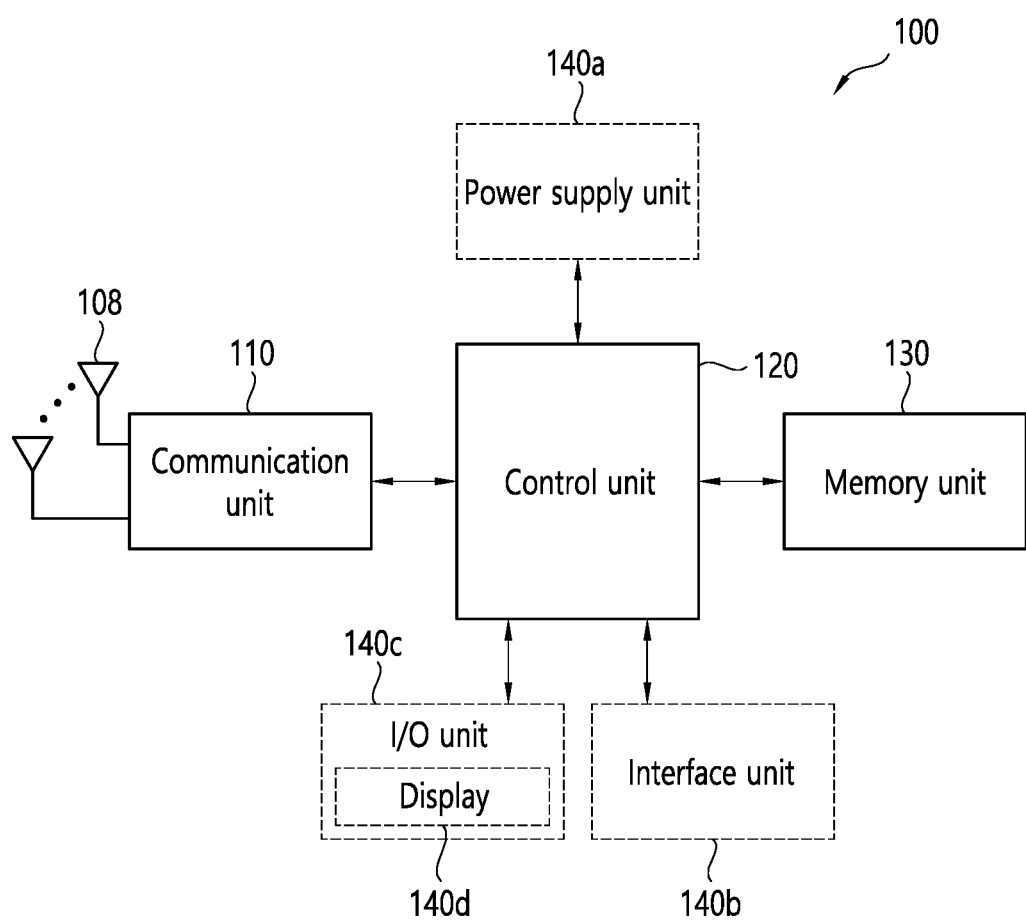
FIG. 46 illustrates an example of a hand-held device applied to the present disclosure.

FIG. 46 illustrates an example of a hand-held device applied to the present disclosure. The hand-held device may include smartphones, smartpads, wearable devices (e.g., smartwatches, smartglasses), and portable computers (e.g., laptops). A hand-held device may be referred to as a Mobile Station (MS), User Terminal (UT), Mobile Subscriber Station (MSS), Subscriber Station (SS), Advanced Mobile Station (AMS), or Wireless Terminal (WT).

Referring to FIG. 46, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110~130/140a~140c correspond to the blocks 110~130/140 of FIG. 45, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, and so on. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may obtain information/signals (e.g., touch, text, voice, images, or video) input by a user and the obtained information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 47:
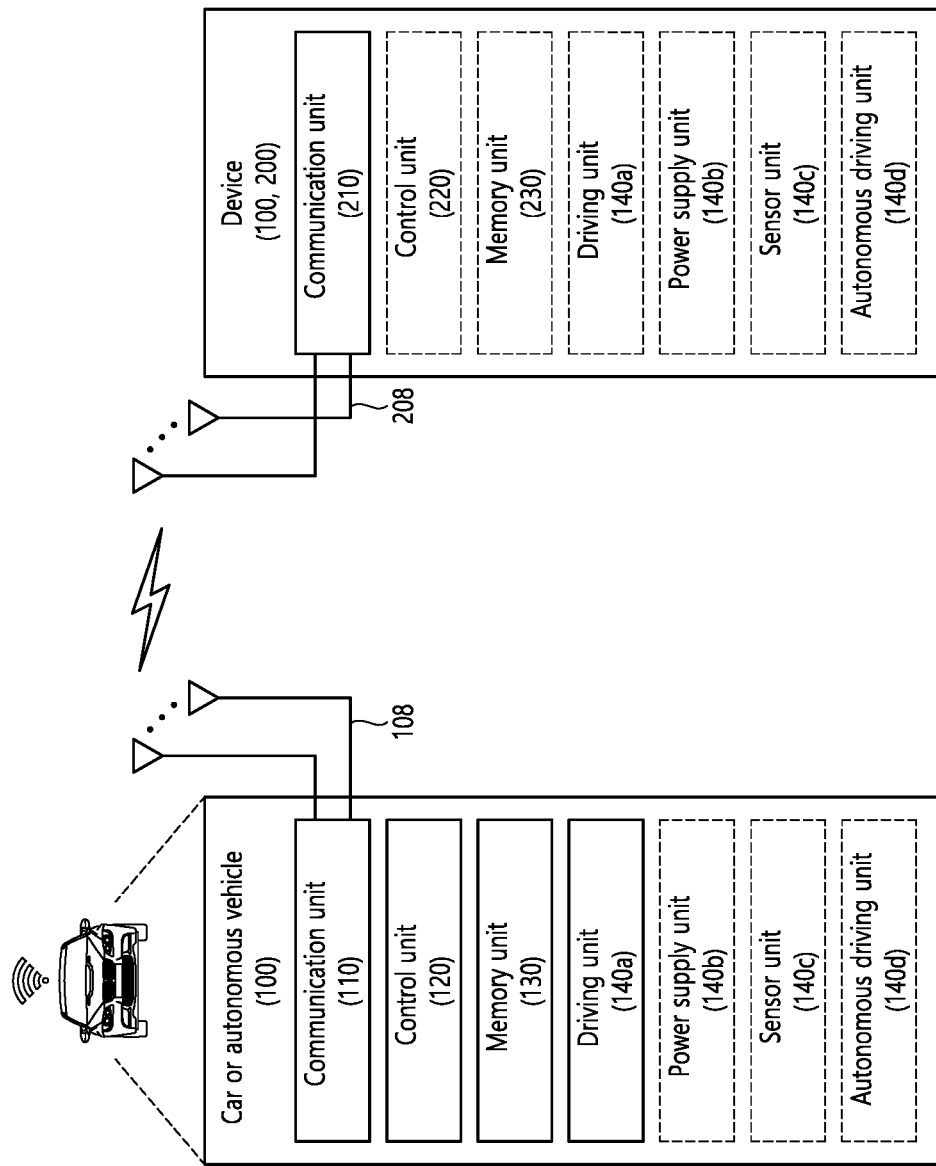
FIG. 47 illustrates an example of a vehicle or autonomous vehicle applied to the present disclosure.

FIG. 47 illustrates an example of a vehicle or autonomous vehicle applied to the present disclosure.

The vehicle or autonomous vehicle may be implemented by a mobile robot, a car, a train, a manned/unmanned Aerial Vehicle (AV), a ship, and so on.

Referring to FIG. 47, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a~140d correspond to the blocks 110/130/140 of FIG. 45, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, and so on. The power supply unit 140b may supply power to the vehicle or the autonomous vehicle 100 and include a wired/wireless charging circuit, a battery, and so on. The sensor unit 140c may obtain a vehicle state, ambient environment information, user information, and so on. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, and so on, from an external server. The autonomous driving unit 140d may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically obtain recent traffic information data from the external server and obtain surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Figure 48:
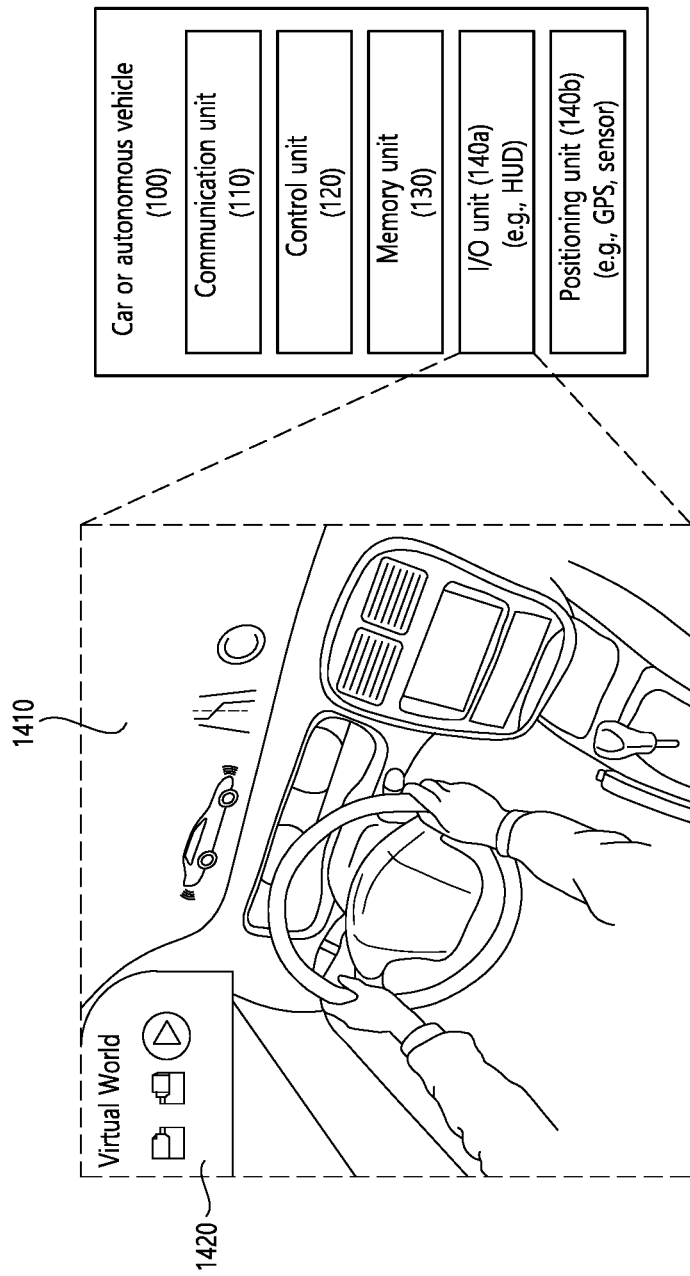
FIG. 48 illustrates an example of a vehicle applied to the present disclosure.

FIG. 48 illustrates an example of a vehicle applied to the present disclosure. The vehicle may be implemented as a transport means, an aerial vehicle, a ship, and so on.

Referring to FIG. 48, a vehicle 100 may include a communication unit 110, a control unit 120, a memory unit 130, an I/O unit 140*a*, and a positioning unit 140*b*. Herein, the blocks 110~130/140*a*~140*b* correspond to blocks 110~130/140 of FIG. 45.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140*a* may output an AR/VR object based on information within the memory unit 130. The I/O unit 140*a* may include an HUD. The positioning unit 140*b* may obtain information on the position of the vehicle 100. The position information may include information on an absolute position of the vehicle 100, information on the position of the vehicle 100 within a traveling lane, acceleration information, and information on the position of the vehicle 100 from a neighboring vehicle. The positioning unit 140*b* may include a GPS and various sensors.

As an example, the communication unit 110 of the vehicle 100 may receive map information and traffic information from an external server and store the received information in the memory unit 130. The positioning unit 140*b* may obtain the vehicle position information through the GPS and various sensors and store the obtained information in the memory unit 130. The control unit 120 may generate a virtual object based on the map information, traffic information, and vehicle position information and the I/O unit 140*a* may display the generated virtual object in a window in the vehicle 1410, 1420. The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140*a*. In addition, the control unit 120 may broadcast a warning message regarding driving abnormality to neighboring vehicles through the communication unit 110. According to situation, the control unit 120 may transmit the vehicle position information and the information on driving/vehicle abnormality to related organizations.

Figure 49:
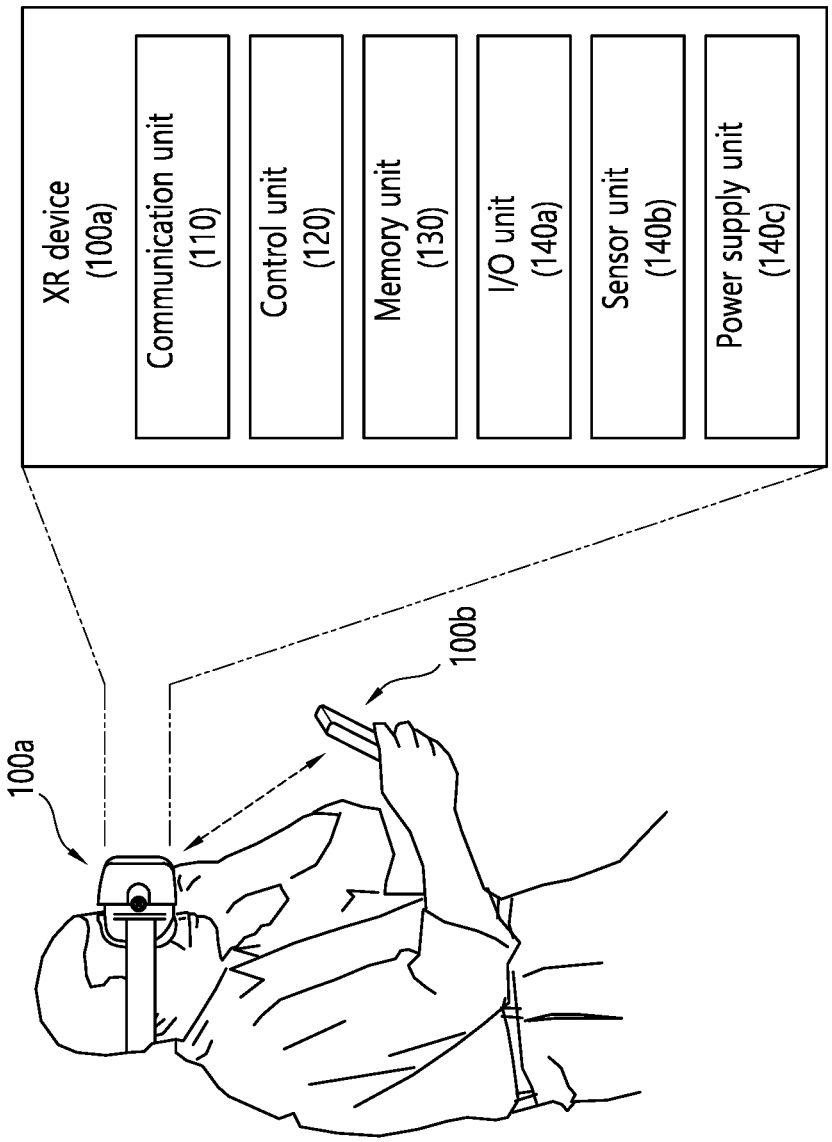
FIG. 49 illustrates an example of an XR device applied to the present disclosure.

FIG. 49 illustrates an example of an XR device applied to the present disclosure. The XR device may be implemented by an HMD, an HUD mounted in a vehicle, a television, a smartphone, a computer, a wearable device, a home appliance, a digital signage, a vehicle, a robot, and so on.

Referring to FIG. 49, an XR device 100*a* may include a communication unit 110, a control unit 120, a memory unit 130, an I/O unit 140*a*, a sensor unit 140*b*, and a power supply unit 140*c*. Herein, the blocks 110~130/140*a*~140*c* correspond to the blocks 110~130/140 of FIG. 45, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140*a* may include a camera, a microphone, a user input unit, a display unit, a speaker, and/or a haptic module. The sensor unit 140*b* may obtain an XR device state, surrounding environment information, user information, and so on. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a* and include a wired/wireless charging circuit, a battery, and so on.

For example, the memory unit 130 of the XR device 100*a* may include information (e.g., data) needed to generate the XR object (e.g., an AR/VR/MR object). The I/O unit 140*a* may receive a command for manipulating the XR device 100*a* from a user and the control unit 120 may drive the XR device 100*a* according to a driving command of a user. For example, when a user desires to watch a film or news through the XR device 100*a*, the control unit 120 transmits content request information to another device (e.g., a hand-held device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information on a surrounding space or a real object obtained through the I/O unit 140*a*/sensor unit 140*b*.

The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information on a 3D position of the hand-held device 100*b* and generate and output an XR object corresponding to the hand-held device 100*b*.

Figure 50:
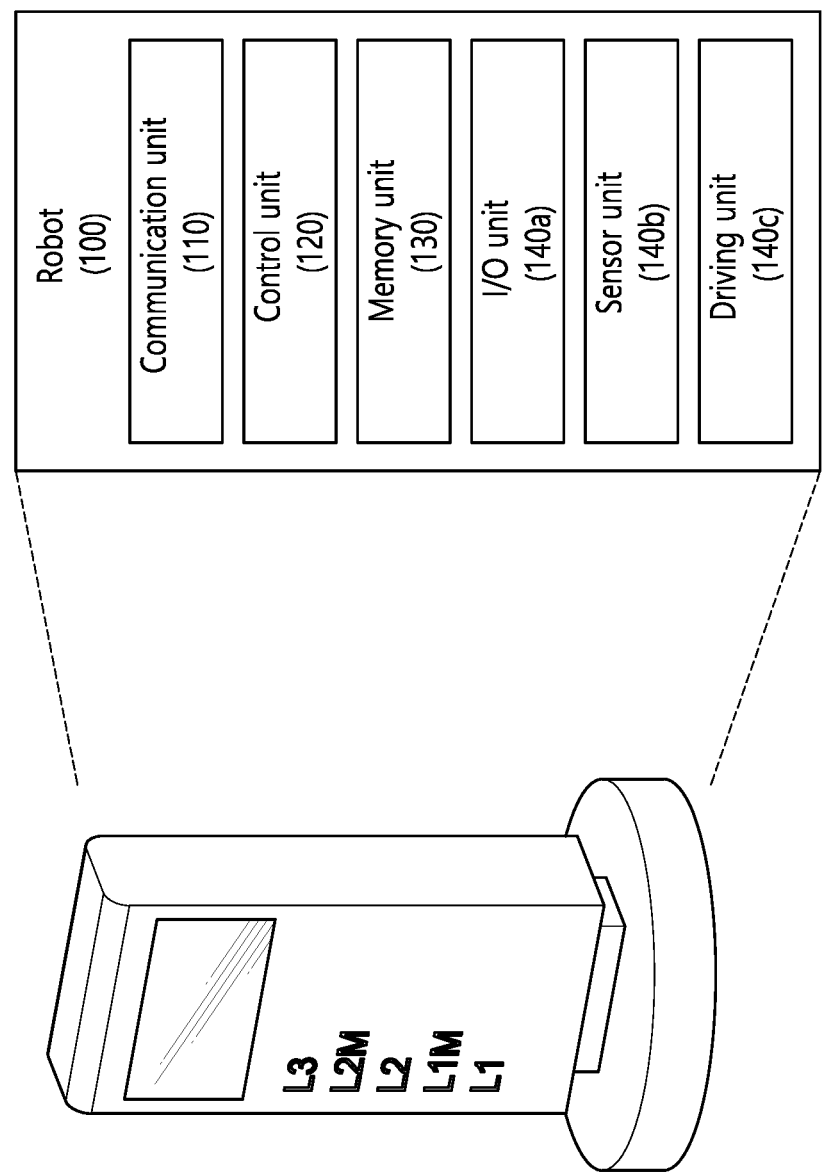
FIG. 50 illustrates an example of a robot applied to the present disclosure.

FIG. 50 illustrates an example of a robot applied to the present disclosure. The robot may be categorized into an industrial robot, a medical robot, a household robot, a military robot, and so on, according to a used purpose or field.

Referring to FIG. 50, a robot 100 may include a communication unit 110, a control unit 120, a memory unit 130, an I/O unit 140a, a sensor unit 140b, and a driving unit 140c. Herein, the blocks 110~130/140a~140c correspond to the blocks 110~130/140 of FIG. 45, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140a may obtain information from the exterior of the robot 100 and output information to the exterior of the robot 100. The I/O unit 140a may include a camera, a microphone, a user input unit, a display unit, a speaker, and/or a haptic module. The sensor unit 140b may obtain internal information of the robot 100, surrounding environment information, user information, and so on. The sensor unit 140b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, and so on. The driving unit 140c may perform various physical operations such as movement of robot joints. In addition, the driving unit 140c may cause the robot 100 to travel on the road or to fly. The driving unit 140c may include an actuator, a motor, a wheel, a brake, a propeller, and so on.

Figure 51:
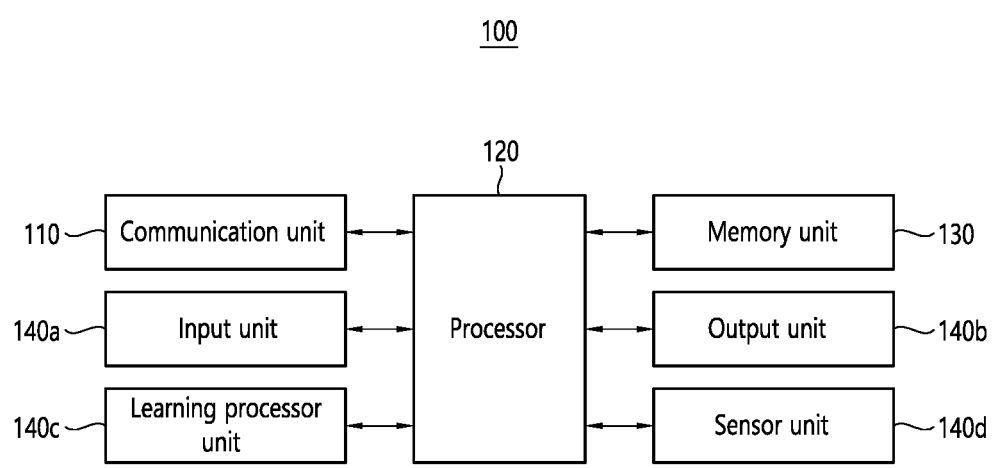
FIG. 51 illustrates an example of an AI device applied to the present disclosure.

FIG. 51 illustrates an example of an AI device applied to the present disclosure.

The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, and so on.

Referring to FIG. 51, an AI device 100 may include a communication unit 110, a control unit 120, a memory unit 130, an I/O unit 140a/140b, a learning processor unit 140c, and a sensor unit 140d. The blocks 110~130/140a~140d correspond to blocks 110~130/140 of FIG. 45, respectively.

The communication unit 110 may transmit and receive wired/radio signals (e.g., sensor information, user input, learning models, or control signals) to and from external devices such as other AI devices (e.g., 100x, 200, 400 of FIG. 41) or an AI server 200 using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 41). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may obtain various types of data from the exterior of the AI device 100. For example, the input unit 140a may obtain learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 41). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

The claims set forth herein can be combined in a variety of ways. For example, the technical features of the method claims of this specification may be combined to be implemented as a device, and the technical features of the device claims of this specification may be combined to be implemented as a method. In addition, the technical features of the method claims of the present specification and the technical features of the device claims may be combined to be implemented as a device, and the technical features of the method claims of the present specification and the technical features of the device claims may be combined to be implemented as a method.

What is claimed is:

1. A method comprising:
   receiving, by a first device, a random access preamble from a second device;
   transmitting, by the first device, a random access response to the second device in response to the random access preamble;
   performing, by the first device, a radio resource control connection procedure with the second device;
   receiving, by the first device, data from the second device;
   receiving, by the first device, first two-dimensional parity information from the second device over a public channel;

obtaining, by the first device, second two-dimensional parity information from sifted key information, wherein sifted key information comprises a plurality of first bit groups, and wherein a length for each of the plurality of first bit groups is maximized for guaranteeing quantum bit error rate (QBER) estimation accuracy;

performing, by the first device, an estimation of a QBER based on the first two-dimensional parity information and the second two-dimensional parity information;

determining, by the first device, key information based on the estimation of the QBER; and decrypting, by the first device, the data based on the key information.

2. The method of claim 1, wherein the sifted key information is received from the second device over a quantum channel.

3. The method of claim 1, wherein the plurality of first bit groups is arranged in a two-dimensional form, and wherein the second two-dimensional parity information is obtained based on parity information for rows of the two-dimensional form and parity information for columns of the two-dimensional form.

4. The method of claim 1, wherein information related to the length for each of the plurality of first bit groups is shared between the first device and the second device.

5. The method of claim 4, wherein the length for each of the plurality of first bit groups is determined based on an estimation of a previous QBER.

6. The method of claim 4, wherein the method further comprises determining a length for each of a plurality of second bit groups to be included in a next sifted key information based on the estimation of the QBER.

7. The method of claim 6, wherein information related to the length for each of the plurality of second bit groups is shared between the first device and the second device.

8. A first device comprising:

a transceiver;

at least one memory; and at least one processor operatively coupled to the at least one memory and the transceiver, wherein the at least one memory stores instructions that, based on being executed by the at least one processor, perform operations comprising:

receiving, via the transceiver, a random access preamble from the second device;

transmitting, via the transceiver, a random access response to the second device in response to the random access preamble;

performing a radio resource control connection procedure with the second device;

receiving, via the transceiver, data from the second device;

receiving, via the transceiver, first two-dimensional parity information from the second device over a public channel;

obtaining second two-dimensional parity information from sifted key information, wherein sifted key information comprises a plurality of first bit groups, and wherein a length for each of the plurality of first bit groups is maximized for guaranteeing quantum bit error rate (QBER) estimation accuracy;

performing an estimation of a QBER based on the first two-dimensional parity information and the second two-dimensional parity information;

determining key information based on the estimation of the QBER; and decrypting the data based on key information.

* * * * *